(12) United States Patent
Takahashi et al.

(10) Patent No.: US 8,896,774 B2
(45) Date of Patent: Nov. 25, 2014

(54) OPTICAL FILM, POLARIZING PLATE AND IMAGE DISPLAY DEVICE

(71) Applicant: FUJIFILM Corporation, Tokyo (JP)

(72) Inventors: Yuta Takahashi, Kanagawa (JP); Hisato Nagase, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/707,986

(22) Filed: Dec. 7, 2012

(65) Prior Publication Data

US 2013/0093992 A1   Apr. 18, 2013

Related U.S. Application Data

(63) Continuation of application No. PCT/JP2011/063419, filed on Jun. 10, 2011.

(30) Foreign Application Priority Data

Jun. 10, 2010   (JP) ................................ 2010-133006
Jun. 9, 2011    (JP) ................................ 2011-129560

(51) Int. Cl.
  *G02F 1/1335*   (2006.01)
  *G02B 5/30*     (2006.01)
  *G02B 27/26*    (2006.01)

(52) U.S. Cl.
  CPC ............ *G02B 5/3083* (2013.01); *G02B 5/3016* (2013.01); *G02B 27/26* (2013.01)
  USPC .............................. 349/15; 349/117; 349/194

(58) Field of Classification Search
  USPC .......... 252/299.01, 299.62; 428/1.1; 349/117, 349/15, 194
  See application file for complete search history.

(56) References Cited

U.S. PATENT DOCUMENTS

| | | |
|---|---|---|
| 6,569,502 B1 | 5/2003 | Ito et al. |
| 2006/0216440 A1 | 9/2006 | Nishikawa et al. |
| 2008/0204644 A1 | 8/2008 | Toyama et al. |

FOREIGN PATENT DOCUMENTS

| | | |
|---|---|---|
| CN | 101206349 | 6/2008 |
| JP | 09-292522 A | 11/1997 |

(Continued)

OTHER PUBLICATIONS

English translation by computer for JP 2007-108,732; http://www4.ipdl.inpit.go.jp/Tokujitu/PAJdetail.ipdl?N0000=60&N0120=01&N2001=2&N3001=2007-108732.*

(Continued)

*Primary Examiner* — Shean C Wu
(74) *Attorney, Agent, or Firm* — Jean C. Edwards, Esq.; Edwards Neils PLLC

(57) ABSTRACT

To provide an optical film which may be used as a λ/4 plate and may provide a display device which has specific optical characteristics, may be manufactured with high productivity and has an excellent 3D-display performance. To provide a 3D-display device having a physical properties having excellent antireflective property and light fastness with high productivity. An optical film having at least one optically anisotropic layer, wherein an in-plane retardation. Re at an arbitrary wavelength in a visible light region is 80 nm to 201 nm, an Nz value represented by the following equation is 0.1 to 0.9, and when the in-plane retardations at wavelengths of 450 nm, 550 nm and 650 nm are referred to as Re450, Re550 and Re650, respectively, Re450/Re550 is 1.18 or less and Re650/Re550 is 0.93 or more.

$Nz=0.5+Rth/Re$ (Rth: a retardation in a thickness direction)

8 Claims, 2 Drawing Sheets

A schematic view illustrating examples of the optical film of the present invention

(56) References Cited

FOREIGN PATENT DOCUMENTS

| | | |
|---|---|---|
| JP | 2000-056310 A | 2/2000 |
| JP | 2000-104073 A | 4/2000 |
| JP | 2000-105316 A | 4/2000 |
| JP | 2001-004837 A | 1/2001 |
| JP | 2004-053841 A | 2/2004 |
| JP | 2006-301614 A | 11/2006 |
| JP | 2007-108732 A | 4/2007 |
| JP | 2009-282424 A | 12/2009 |

OTHER PUBLICATIONS

Chinese First Office Action issued by SIPO on Aug. 4, 2014 in connection with corresponding Chinese Patent Application No. 201180028594.1.

* cited by examiner

A schematic view illustrating examples of the optical film of the present invention

FIG.2

Schematic view illustrating examples of the polarizing plate of the present invention

| ANTIREFLECTION LAYER |
|---|
| HARDCOAT LAYER |
| OPTICALLY ANISOTROPIC LAYER |
| SUPPORT |
| POLARIZING FILM |
| PROTECTIVE FILM |

| ANTIREFLECTION LAYER |
|---|
| HARDCOAT LAYER |
| OPTICALLY ANISOTROPIC LAYER |
| SUPPORT |
| POLARIZING FILM |
| OPTICALLY-COMPENSATORY FILM |

| ANTIREFLECTION LAYER |
|---|
| HARDCOAT LAYER |
| SUPPORT |
| OPTICALLY ANISOTROPIC LAYER |
| POLARIZING FILM |
| PROTECTIVE FILM |

| ANTIREFLECTION LAYER |
|---|
| HARDCOAT LAYER |
| SUPPORT |
| OPTICALLY ANISOTROPIC LAYER |
| POLARIZING FILM |
| OPTICALLY-COMPENSATORY FILM |

OPTICAL FILM, POLARIZING PLATE AND IMAGE DISPLAY DEVICE

CROSS-REFERENCE TO RELATED APPLICATIONS AND PRIORITY CLAIMS

This application is a Continuation of International Application No. PCT/JP2011/063419 filed on Jun. 10, 2011, which was published under PCT Article 21(2) in Japanese, which is based upon and claims the benefit of priority from Japanese Patent Applications Nos. 2010-133006 filed on Jun. 10, 2010, and 2011-129560, which was filed Jun. 9, 2011, the contents of all of which are incorporated herein by reference in their entirety.

TECHNICAL FIELD

The present invention relates to an optical film having a phase difference of substantially ¼ wavelength. The present invention also relates to a liquid display device or 3D display device using the same.

BACKGROUND ART $\lambda/4$ plates have been used for many applications and are already in use for reflection type LCDs, semi-transmission type LCDs, luminance improving films, pick-ups for optical discs or PS conversion devices. Most of the $\lambda/4$ plates currently used are phase difference plates in which optical anisotropy is developed by stretching a polymer film. The slow axis direction of a polymer film generally corresponds to the longitudinal direction or transverse direction of a sheet-type or roll-type film, and it is very difficult to prepare a polymer film having a slow axis at an oblique direction of the sheet or roll. In most cases where an optically anisotropic layer is used, the slow axis of the phase difference plate is disposed at an angle which is neither parallel nor orthogonal to the transmission axis of the polarizing plate. Further, each of the slow axes of two or more phase difference plates and the transmission axis of a polarizing plate is disposed at an angle which is not parallel to or orthogonal to each other in many cases. In general, the transmission axis of the polarizing plate is in a orthogonal direction to the longitudinal direction of the roll-type film, and thus in order to bond the phase difference plate with the polarizing plate, it is necessary to bond a chip obtained by cutting each film so as to become a predetermined angle. When a laminate of the phase difference plate and the polarizing plate is to be prepared by bonding the chip, a coating process of an adhesive, or a chip cutting or chip bonding process is required, making the treatment complicated, the deterioration in quality is easily caused by axial shift, reducing the yield and increasing costs, and foreign materials are also easily incorporated. In addition, in the polymer film, the development of the refractive index anisotropy in the 3-D direction is affected by various conditions such as stretching ratio, temperature, stretching speed and molecular weight of a polymer. Accordingly, it is also difficult to precisely control the optical anisotropy of the polymer film.

In order to solve the problem, proposed are phase difference plates having a slow axis at an angle which is neither parallel nor orthogonal to a roll-type film, in which an optical anisotropy is developed by coating a coating solution containing a discotic liquid crystal compound or a rod-like liquid crystal compound on the roll-type film to be arranged in a predetermined direction (Patent Documents 1 and 2). Furthermore, disclosed are phase difference plates which are aligned and fixed, such that the disc plane of the discotic liquid crystal molecule becomes substantially vertical to the film surface (Patent Documents 3, 4, 5, 6 and 7).

Further, although a configuration, in which an phase difference plate is used on the forefront as the phase difference plate on the forefront plane in an organic EL, a touch panel, a 3D display device and the like, has been proposed, in an phase difference plate in the related art, there are problems in that scratches easily occur, strength is insufficient, the reflection intensity of external light is high, light resistance is weak, foreign materials are easily attached and are not well detached, and the like, and thus it is not appropriate for the phase difference plate to be used on the forefront plane.

RELATED ART

Patent Document

Patent Document 1: Japanese Patent Application Laid-Open No. 2001-4837
Patent Document 2: Japanese Patent Application Laid-open No. 2004-53841
Patent Document 3: Japanese Patent Application Laid-Open No. H9-292522
Patent Document 4: Japanese Patent Application Laid-Open No. 2000-56310
Patent Document 5: Japanese Patent Application Laid-Open No. 2000-104073
Patent Document 6: Japanese Patent Application Laid-Open No. 2000-105316
Patent Document 7: Japanese Patent Application Laid-Open No. 2007-108732

DISCLOSURE OF INVENTION

Problems to Be Solved by the Invention

The present invention has been made in consideration of the above-mentioned problems, and an object thereof is to provide an optical film which has specific optical characteristics capable of being used as a $\lambda/4$ plate, may be manufactured with high productivity, and may provide a display device having an excellent 3D-display performance.

In addition, another object of the present invention is to solve the above-mentioned problems and provide a 3D-display device having a physical performance which may be used on the forefront plane of the display device, excellent antireflection properties and excellent light resistance with high productivity.

SUMMARY OF INVENTION

[1] An optical film including at least one optically anisotropic layer, wherein an in-plane retardation Re at an arbitrary wavelength, in a visible light region is 80 nm to 200 nm, an Nz value represented by the following equation is 0.1 to 0.9, and when the in-plane retardations at wavelengths of 450 nm, 550 nm and 650 nm are referred to as Re450, Re550 and Re650, respectively, Re450/Re550 is 1.18 or less and Re650/Re530 is 0.93 or more:

$$Nz = 0.5 + Rth/Re$$

wherein Rth represents a retardation in a thickness direction.

[2] The optical, film according to [1], including the optically anisotropic layer formed on a support, wherein the optically anisotropic layer contains at least one liquid crystalline compound.

[3] The optical film according to [2], wherein the liquid crystalline compound is a discotic liquid crystalline compound, and the discotic liquid crystalline compound is fixed in order that an alignment state thereof is substantially vertical to a plane of the optically anisotropic layer.

[4] The optical film according to [3], wherein the optically anisotropic layer is formed from a composition containing at least one of discotic liquid crystalline compounds represented by the following Formula (I).

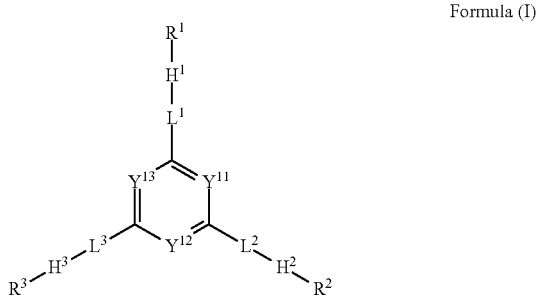

Formula (I)

In the formula, each of $Y^{11}$, $Y^{12}$ and $Y^{13}$ independently represents a methine which may be substituted, or a nitrogen atom; each of $L^1$, $L^2$ and $L^3$ independently represents a single bond or a divalent linking group; and each of $H^1$, $H^2$ and $H^3$ independently represents Formula (I-A) or Formula (I-B).

Formula (I-A)

In Formula (I-A), each of $YA^1$ and $YA^2$ independently represents a methine which may have a substituent, or a nitrogen atom; XA represents an oxygen atom, a sulfur atom, and methylene or imino; * represents a position, bonding to a side of $L^1$ to $L^3$ in Formula (I); and ** represents a position bonding to a side of $R^1$ to $R^3$ in Formula (I).

Formula (I-B)

In Formula (I-B), each of $YB^1$ and $YB^2$ independently represents a methane which may have a substituent, or a nitrogen atom; XB represents an oxygen atom, a sulfur atom, and methylene or imino; * represents a position bonding to a side of $L^1$ to $L^3$ in Formula (I); ** represents a position bonding to a side of $R^1$ to $R^3$ in Formula (I)); and each or $R^1$, $R^2$ and $R^3$ independently represents the following Formula (I-R):

*—(-$L^{21}$-$Q^2$)$_{n1}$-$L^{22}$-$L^{23}$-$Q^1$   Formula (I-R)

wherein in Formula (I-R), * represents a position bonding to a side of $H^1$ to $H^3$ in Formula (I); $L^{21}$ represents a single bond or a divalent linking group; $Q^2$ represents a divalent group having at least one cyclic structure; n1 represents an integer of 0 to 4, $L^{22}$ represents —O—, —O—CO—, —CO—O—, —O—CO—O—, —S—, —N($R^{101}$)—, —SO$_2$, —CH$_2$—, —CH=CH— or —C≡C—, $R^{101}$ represents an alkyl group having 1 to 5 carbon atoms, and ** represents a position bonding to a $Q^2$ side; $L^{23}$ represents a divalent linking group selected from the group consisting of —O—, —S—, —C(=O)—, —SO$_2$—, —NH—, —CH$_2$—, —CH=CH—, —C≡C— and a combination thereof; and $Q^1$ represents a polymerizable group or a hydrogen atom.

[5] The optical film according to any one of [2] to [4], wherein the optically anisotropic layer is formed from a composition containing at least one of pyridinium compounds represented by the following Formula (II).

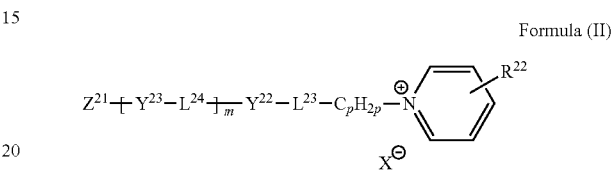

Formula (II)

In the formula, each of $L^{23}$ and $L^{24}$ is a divalent linking group; $R^{22}$ is a hydrogen atom, an unsubstituted amino group or a substituted amino group having 1 to 20 carbon atoms; X is an anion; each of $Y^{22}$ and $Y^{23}$ is a divalent linking group having a 5- or 6-membered ring which may be substituted as a partial, structure; $Z^{21}$ is a monovalent group selected from the group consisting of a halogen-substituted phenyl, a nitro-substituted phenyl, a cyano-substituted phenyl, a phenyl substituted with an alkyl group having 1 to 25 carbon atoms, a phenyl substituted with an alkoxy group having 1 to 25 carbon atoms, an alkyl group having 1 to 25 carbon atoms, an alkynyl group having 2 to 25 carbon atoms, an alkoxy group having 1 to 25 carbon atoms, an alkoxycarbonyl group having 2 to 25 carbon atoms, an aryloxycarbonyl group having 7 to 26 carbon atoms, and an arylcarbonyloxy group having 7 to 26 carbon atoms; p is a number of 1 to 10; and m is 1 or 2.

[6] The optical film according to any one of [2] to [5], wherein the optically anisotropic layer is a layer continuously formed on a long support, and an angle formed by a slow axis of the optically anisotropic layer and a longer side of the support is 5° to 85°.

[7] The optical film according to [6], wherein the optically anisotropic layer is a layer formed after performing a rubbing treatment on an alignment film provided on the support, and an angle formed by the slow axis of the optically anisotropic layer and a rubbing direction is substantially 90°.

[8] The optical film according to [6], wherein the optically anisotropic layer is a layer formed after performing a rubbing treatment on an alignment film provided on the support, and an angle formed by the slow axis of the optically anisotropic layer and a rubbing direction is substantially 0°.

[9] An optical film including a hardcoat layer stacked directly or through another layer on at least one surface of the optical film according to any one of [1] to [8].

[10] An optical film including at least one optical interference layer functioning as an antireflection layer stacked directly or through another layer on at least one surface of the optical film according to any one of [1] to [9].

[11] An optical film including at least one optical interference layer functioning as a hardcoat layer and an antireflection layer stacked directly or through another layer in this order on the optical film according to any one of [1] to [8].

[12] The optical film according to [10] or [11], wherein at least one layer of the optical interference layer is a low refractive index layer, and the low refractive index layer is disposed on a side of the outermost surface of the optical film.

[13] The optical film according to any one of [10] to [12], wherein the optical interference layer is a layer in which a medium, refractive index layer, a high refractive index layer and a low refractive index, layer are stacked in this order, and the low refractive index layer is disposed on a side of the outermost surface thereof.

[14] The optical film according to any one of [2] to [13], wherein at least one layer of the support, the optically anisotropic layer, the hardcoat layer and the optical interference layer contains an ultraviolet absorbent.

[15] A polarizing plate in which all of the optical, film according to any one of [1] to [14] and a polarizing film are continuously stacked in a long state.

[16] A polarising plate in which all of the optical film according to any one of [1] to [14], a polarizing film and an optically-compensatory film are continuously stacked in this order in a long state.

[17] An image display device in which the optical film or polarizing plate according to any one of [1] to [16] is disposed on an outermost surface thereof.

[18] The image display device according to [17], wherein the image display device is a stereoscopic image display device.

According to the present invention, it is possible to provide a phase difference plate which may be manufactured with high productivity and has excellent physical performance. Further, according to the present invention. It is possible to provide a 3D display device which may be manufactured with high productivity and has excellent display performance.

BRIEF DESCRIPTION OF DRAWINGS

FIG. 2 is a cross-sectional schematic view illustrating an example of a polarizing plate of the present invention.

DESCRIPTION OF EMBODIMENTS

Figure 1:
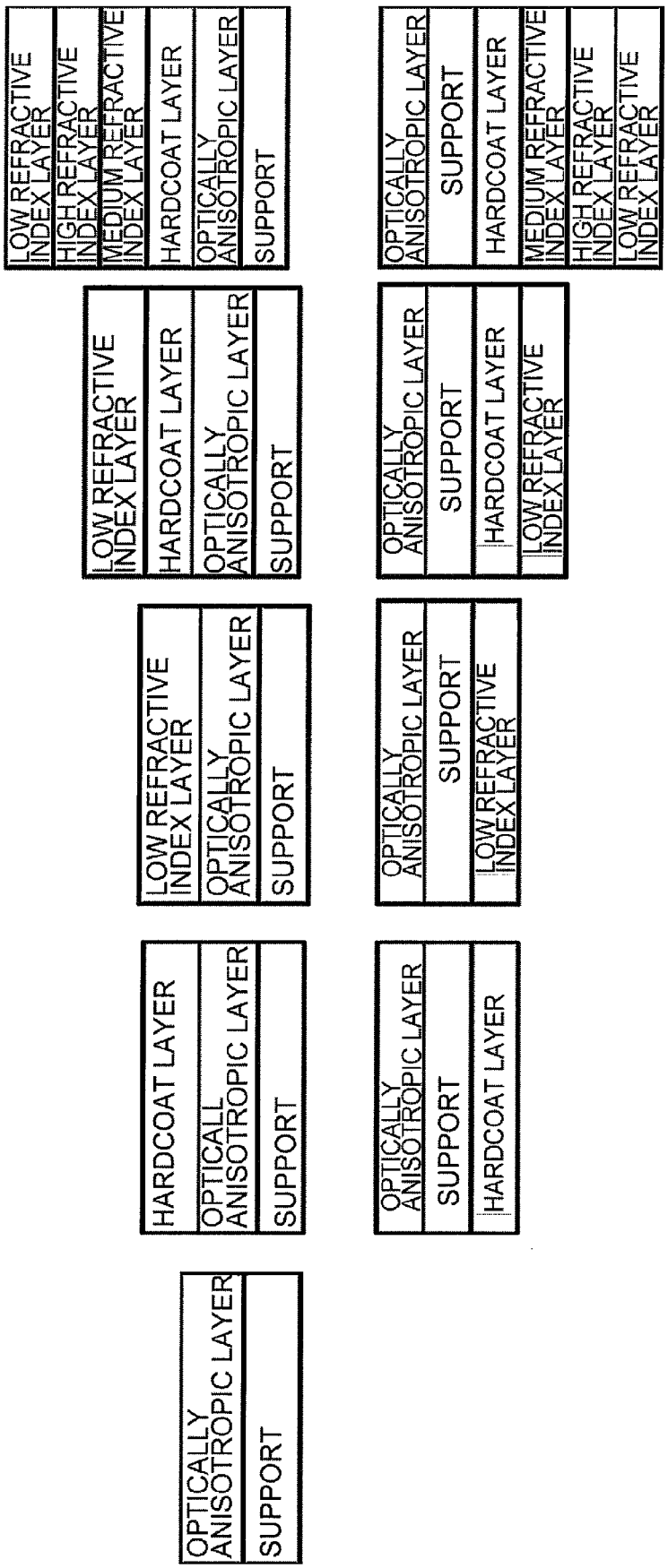
FIG. 1 is a cross-sectional schematic view illustrating an example of an optical film of the present invention.

Hereinafter, the present invention will be described in detail.

Meanwhile, in the description of present embodiment, "parallel" or "orthogonal" means a range within, an exact angle±less than 5°. An error with the exact angle is preferably less than 4°, and snore preferably less than 3°.

Furthermore, about the angle, "+" means a clockwise direction, and "−" means a counterclockwise.

In addition, the "slow axis" means the direction where the refractive index becomes the maximum, and unless otherwise described, the measurement wavelength of the refractive index is a value in the visible light region (λ=550 nm).

Furthermore, in the description of the present embodiment, unless specifically described, the "polarizing plate" is used as a meaning to include both a long polarizing plate and a polarizing plate cut into a size suitable for being incorporated into a display device. Meanwhile, "cutting" as mentioned herein also includes "punching", "clipping" and the like. Further, in the description of the present embodiment, the "polarization film" and "polarizing plate" are used differentially, but the "polarizing plate" means a laminate having, on at least one side of a "polarizing film", a transparent protective film to protect the polarizing film.

In addition, in the description of the present embodiment, the "molecular symmetry axis" indicates, when a molecule has a rotational-symmetry axis, the symmetry axis thereof, but it is not required that the molecule satisfies rotational symmetry in the strict sense. In general, in a discotic liquid crystalline compound, the molecular symmetry axis coincides with an axis vertical to the disc plane passing through the center of the disc plane, and in a rod-like liquid crystalline compound, the molecular symmetry axis coincides with a major axis of the molecule.

Furthermore, in the present specifications Re (λ) and Rth (λ) represent an in-plane retardation and a retardation in a thickness direction at a wavelength of λ, respectively. Re (λ) is measured by irradiating with an incident light having a wavelength of λ nm in the normal direction of the film in KOBRA 21ADH or WR (manufactured by Oji Scientific Instruments Co., Ltd.). In selecting the measurement wavelength λ nm, measurement may be performed by exchanging a wavelength selective filter manually or converting measured values into & program or the like. When a film to be measured is represented by a uniaxial or biaxial refractive index ellipsoid, Rth (λ) is calculated by the following method. Meanwhile, this measurement method is used partially in the measurement of the mean tilt angle on the side of the alignment film of discotic liquid crystal molecules in an optically anisotropic layer as described below or on the side opposite to the same.

A total of six points of the Re (λ) are measured by irradiating with an incident light having a wavelength of λ nm from each of the inclined directions at an angle increasing in 10° step increments up to 50° in one direction from the normal direction of the film by using the in-plane slow axis (decided by KOBRA 21ADH or WR) as an inclined axis (rotation axis) (when, there is no slow axis, any in-plane direction of the film is used as a rotation axis), and then Rth (λ) is calculated by KOBRA 21ADH or WR based on the retardation value measured, a hypothetical value of the average refractive index, and the inputted film thickness value. In the description, in the case of a film having a direction in which a retardation value is zero at a certain tilt angle about the in-plane slow axis from the normal direction as an axis of rotation, a retardation value at a tilt angle greater than the tilt angle is changed into a minus sign, and then is calculated by KOBRA 21ADH or WR. Meanwhile, with the slow axis as an inclined axis (rotation axis) (when there is no slow axis, any in-plane direction of the film is used as a rotation axis), retardation values may be measured from any two inclined directions and Rth may also be calculated from the following equations (A) and (III) based on the values, a hypothetical value of an average refractive index and an inputted film thickness value.

$$Re(\theta) = \left[ nx - \frac{(ny \times nz)}{\left( \sqrt{\left( ny \ \sin\left(\sin^{-1}\left(\frac{\sin(-\theta)}{nx}\right)\right)\right)^2 + \left( nz \ \cos\left(\sin^{-1}\left(\frac{\sin(-\theta)}{nx}\right)\right)\right)^2} \right)} \right] \times \frac{d}{\cos\left(\sin^{-1}\left(\frac{\sin(-\theta)}{nx}\right)\right)} \quad \text{Equation (A)}$$

Meanwhile, the Re (θ) represents a retardation value in a direction inclined by an angle (θ) from the normal direction. Further, in Equation (A), nx represents a refractive index in an in-plane slow axis direction, ny represents a refractive index in an in-plane direction orthogonal to nx, and nz represents a refractive index in a direction orthogonal to nx and ny. d represents a film thickness.

$$Rth=((nx+ny)/2-nz)\times d \quad \text{Equation (III)}$$

In the case where a film to be measured may not be represented by a uniaxial or biaxial refractive index ellipsoid, a so-called film having no optic axis, Rth (λ) is calculated by the following method. Eleven points of the Re (λ) are measured by irradiating with an incident light having a wavelength of λ nm from each of the inclined directions at an angle increasing from −50° to +50° in 10° step increments with respect to the normal direction of the film by using the in-plane slow axis (decided by KOBRA 21ADH or WR) as an inclined axis (rotation axis), and then Rth (λ) is calculated by KOBRA 21ADB or WR based on the retardation value measured, a hypothetical value of an average refractive index and an inputted film thickness value. In addition, in the above-described measurements, values described in Polymer Handbook (John Wiley & Sons, Inc.) and catalogues of various optical films may be used as the hypothetical value of the average refractive index. The average refractive index of which value is not already known may be measured by an Abbe refractometer. Values of average refractive indices of main optical films are illustrated below: Cellulose acylate (1.48), cycloolefin polymer (1.52), polycarbonate (1.59), polymethyl methacrylate (1.49) and polystyrene (1.59). By inputting these hypothetical values of average refractive index and the film thickness, nx, ny and nz are calculated by KOBRA 21ADH or WR. From these calculated nx, ny, and nz, Nz=(nx−nz)/nx−ny) is further calculated.

(Measurement of Tilt Angle)

In an optically anisotropic layer in which a discotic liquid crystalline compound or a rod-like liquid crystalline compound is aligned, it is difficult to directly and exactly measure a tilt angle (an angle of a physical target axis in the discotic liquid crystalline compound or the rod-like liquid crystalline compound with the interface of the optically anisotropic layer is referred to as a tilt angle) (θ1) on one side of the optically anisotropic layer and a tilt angle (θ2) on the other side. Thus, in the present specification, θ1 and θ2 are calculated by the following technique. The technique does not exactly express the actual alignment state of the present invention, but is effective as a means for showing the relative relationship of apart of the optical characteristics possessed by an optical film.

In order to case the calculation in the technique, the following two points are assumed as tilt angles at the two interfaces of the optically anisotropic layer.

1. The optically anisotropic layer is assumed to be a multilayered body composed of a layer including a discotic liquid crystalline compound or a rod-like liquid crystalline compound. Further, the layer of the smallest unit constituting the same (assuming that the tilt angles of the discotic liquid crystalline compound or the rod-like liquid crystalline compound are uniform in the layer) is assumed to be optically uniaxial.

2. The tilt angle in each layer is assumed to monotonously change as a linear function along the thickness direction of the optically anisotropic layer.

The specific calculation method is as follows.

(1) Within a plane in which the tilt angle of each layer monotonously changes as a linear function along the thickness direction of the optically anisotropic layer, the retardation values are measured at 3 or more measurement angles by changing the incident angle of a measurement light on the optically anisotropic layer. For simplification of the measurement and the calculation, it is preferred that the normal direction to the optically anisotropic layer is set at 0°, and the retardation values are measured at 3 measurement angles of −40°, 0° and +40°. These measurements may be performed by KOBRA-21ADH and KOBRA-WR (manufactured by Oji Scientific Instruments Co., Ltd.), and transmission type ellipsometers AEP-100 (manufactured by Shimadzu Corporation), M150 and M520 (manufactured by JASCO Corporation), and ABRIOA (manufactured by Uniopt Corporation).

(2) in the model, the refractive index of an ordinary light of each layer is represented by no, the refractive index of an extraordinary light is represented by ne (ne is the same value for all the layers, and the same applies to no), and the thickness of the whole multilayered body is represented by d. Further, on the assumption that the tilt direction at each layer coincides with the uniaxial optical axis direction of the layer, fitting is performed with the tilt angle (θ1) on one side of the optically anisotropic layer and the tilt angle (θ2) on the other side thereof as variables to calculate θ1 and θ1, such that the calculation of the angle dependency of the retardation value of the optically anisotropic layer coincides with the measured value.

Herein, for no and ne, known values such as bibliographic values and catalogue values may be used. When the value is unknown, the value may also be measured by using an Abbe refractometer. The thickness of the optically anisotropic layer may be measured by an optical interference thickness meter, a cross-sectional photograph of a scanning electron microscope and the like.

Hereinafter, various materials, preparation methods and the like used for the manufacture of the optical film, the polarising plate and the image display device of the present invention will be described in detail.

[Optical Film]

The optical film of the present invention is an optical film having at least one optically anisotropic layer, and when an in-plane retardation at any wavelength in the visible light region is 80 nm to 200 nm, an Nx value represented by the following equation is 0.1 to 0.9, each of the in-plane retardations at wavelengths of 450 nm, 550 nm and 650 nm is Re450, Re550 and Re650, Re450/Re550 is 1.18 or less and Re650/Re650 is 0.93 or more.

Nz=0.5+Rth/Re (Rth; retardation in the thickness direction at the same wavelength as the wavelength at which Re is measured)

In the present specification, the visible light region may be represented by a wavelength of 550 nm.

It is preferred that the optical film of the present invention includes an optically anisotropic layer having a refractive index anisotropy developed by the molecular alignment of a constituting material. The constituting material, of the optically anisotropic layer is not particularly limited, and the optically anisotropic layer may be a layer formed from a composition containing a liquid crystalline compound and showing an optical anisotropy developed by the molecular alignment of the liquid crystalline compound or a layer having an optical anisotropy developed by stretching a polymer film to arrange a polymer in a film, and may have both the layers. The optically anisotropic layer preferably includes at least one of a layer formed from a composition containing a liquid crystalline compound or includes a polymer film, and more preferably includes both the layer and the polymer film. In the case of a laminate composed of a polymer film and an optically anisotropic layer formed from a composition containing a liquid crystalline compound, the polymer film may be a layer developing the optical anisotropy by stretching the polymer film, or a layer which is not stretched and is close to the isotropy.

The in-plane retardation (Re550) of the optical film of the present invention is preferably 100 nm to 175 nm. The value is more preferably 110 nm to 165 nm, and still more preferably 120 nm to 155 nm.

The retardation in the thickness direction is preferably −400 nm to 260 nm, more preferably −200 nm to 160 nm, and still more preferably −90 nm to 80 nm.

Nz is more preferably 0.2 to 0.8, and still more preferably 0.3 to 0.7.

When the optical film is composed of a laminate of an optically anisotropic layer formed from a composition containing a liquid crystalline compound and a polymer film, the Nz may be adjusted to a desired value by controlling each optical anisotropy.

It is preferred that Re450/Re550 is 1.18 or less and Re650/Re550 is 0.03 or more. By setting the value in the ranges, it is possible to obtain, an optical film functioning as λ/4 plate, in which light has a small dependence on a wavelength or a small dependence on incident angle.

[Optically Anisotropic Layer Including Liquid Crystalline Compound]

It is preferred that the optical film of the present invention is composed of an optically anisotropic layer provided on a support and the optically anisotropic layer contains at least one liquid crystalline compound.

The type of liquid crystalline compound used in the formation of the optically anisotropic layer which the optical film of the present invention has is not particularly limited. For example, it is also possible to use an optically anisotropic layer obtained by forming a low molecular liquid crystalline compound in a nematic alignment in a liquid crystal state and then fixing the compound by photo-crosslinking or thermal crosslinking, or an optically anisotropic layer obtained by forming a polymer liquid crystalline compound in a nematic alignment in a liquid crystal state and then cooling the compound to fix the alignment. Meanwhile, in the present invention, even when a liquid crystalline compound is used in an optically anisotropic layer, the optically anisotropic layer is a layer formed by fixation through polymerization and the like of the liquid crystalline compound, and it is not necessary to show liquid crystallinity after the layer is formed. A polymerizable liquid crystalline compound may be a polyfunctional polymerizable liquid crystal or a monofunctional polymerizable liquid crystalline compound. In addition, the liquid crystalline compound may be a discotic liquid crystalline compound or a rod-like liquid crystalline compound.

In the optically anisotropic layer, it is preferred that molecules of the liquid crystal compound are fixed in one alignment state of a vertical alignment, a horizontal alignment a hybrid alignment and an inclined alignment. In order to manufacture, a phase difference plate having a symmetric viewing angle dependence, it is preferred that the disc plane of the discotic liquid crystalline compound is substantially vertical to the film surface (a plane of the optically anisotropic layer) or the major axis of the rod-like liquid crystalline compound is substantially horizontal to the film surface (a plane of the optically anisotropic layer). In the optical film of the present invention, it is particularly preferred that the alignment state is fixed such that the discotic liquid crystalline compound is substantially vertical to the plane of the optically anisotropic layer.

The fact that the discotic liquid crystalline compound is substantially vertical means that the average value of an angle formed by the film surface (a plane of the optically anisotropic layer) and the disc plane of the discotic liquid crystalline compound is within a range of 70° to 90°. The angle is more preferably 80° to 90°, and still more preferably 85° to 90°.

The fact that the rod-like liquid crystalline compound is substantially horizontal means that an angle formed by the film surface (a plane of the optically anisotropic layer) and the director of the rod-like liquid crystalline compound is within a range of 0° to 20°. The angle is more preferably 0° to 10°, and still more preferably 0° to 5°.

When an optically-compensatory film with an asymmetric viewing angle dependence is manufactured by aligning molecules of the liquid crystal compound in a hybrid alignment, the director of the liquid crystal compound has an average tilt angle of preferably 5° to 85°, more preferably 10° to 80°, and still more preferably 15° to 75°.

The optical film preferably includes an optically anisotropic layer containing a liquid crystalline compound, and the optically anisotropic layer may be composed of only one layer or a laminate of optically anisotropic layers having two or more layers.

The optically anisotropic layer may be formed by coating a liquid crystalline compound such as a rod-like liquid crystalline compound or a discotic liquid crystalline compound, and if desired, a coating solution containing a polymerization initiator, an alignment controlling agent or other additives as described below, on a support. It is preferred that an alignment film is formed on a support and then the optically anisotropic layer is formed by coating the coating solution on the surface of the alignment film.

[Discotic Liquid Crystalline Compound]

In the present invention, it is preferred that a discotic liquid crystalline compound is used for forming the optically anisotropic layer that the optical film has. The discotic liquid crystalline compound is described in various documents (C. Destrade et al., Mol. Cryst. Liq. Cryst., vol. 71, page 111 (1981); Quarterly Survey of Chemistry, No. 22, Chemistry of Liquid Crystal Chap. 5, Chap. 10 Section 2 (1994) published by Chemical Society of Japan; B. Kohne et al., Angew. Chem. Soc. Chem. Comm., page 1794 (1985); and J. Zhang et al., J. Am. Chem. Soc. vol. 116, page 2655 (1994)). The polymerization of discotic liquid crystalline compounds is described in Japanese Patent Application Laid-Open No. H8-27284.

It is preferred that the discotic liquid crystalline compound has a polymerizable group to allow the compound to be fixed by polymerization. For example, a structure may be contemplated, in which a polymerizable group as a substituent is bonded to the disc type core of the discotic liquid crystalline compound. However, when the polymerizable group is directly bonded to the disc type core, it is difficult to maintain the alignment state in the polymerization reaction. Thus, a structure is preferred, in which a linking group is interposed between the disc type core and the polymerizable group. That is, the discotic liquid crystalline compound having a polymerizable group is preferably a compound represented by the following formula.

D(-L-P)$_n$

In the formula, D is a disc type core, L is a divalent linking group, P is a polymerizable group, and n is an integer of 1 to 12. Specifically preferred examples of the disc type core (D), the divalent linking group (L) and the polymerizable group (P) in the formula are (D1) to (D15), (L1) to (L25) and (P1) to (P18), each described in the official gazette of Japanese Patent Application Laid-Open No. 2001-4837, and the contents described, in the same official gazette may be preferably used. Meanwhile, the discotic nematic liquid crystal phase-solid phase transition temperature of the liquid crystalline compound is preferably 30° C. to 300° C., and more preferably 30° C. to 170° C.

The discotic liquid crystalline compound represented by the following Formula (I) has a low wavelength dispersibility of the in-plane retardation, and thus, a high, in-plane retardation may be developed. Furthermore, a vertical alignment having excellent uniformity at a high average tilt angle may be achieved without using a special alignment film or additives, and thus, the compound is preferably used for forming an optically anisotropic layer. Further, a coating solution containing the liquid crystalline compound has a tendency that the viscosity thereof is relatively decreased, and is preferred from the viewpoint of good applicability.

(1)-1 Discotic Liquid Crystal Compound Represented by Formula (I)

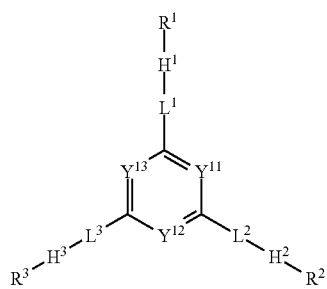

Formula (I)

In the formula, each of $Y^{11}$, $Y^{12}$ and $Y^{13}$ independently represents a methine which may be substituted, or a nitrogen atom.

When $Y^{11}$, $Y^{12}$ and $Y^{13}$ are a methine, the hydrogen atom in the methine may be substituted with a substituent. Preferred examples of the substituent which the methane may have include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom and a cyano group. Among these substituents, an alkyl group, an alkoxy group, an alkoxycarbonyl group, an acyloxy group, a halogen atom and a cyano group are more preferred, and an alkyl group having 1 to 12 carbon atoms, an alkoxy group having 1 to 12 carbon atoms, an alkoxycarbonyl group having 2 to 12 carbon atoms, an acyloxy group having 2 to 12 carbon atoms, a halogen atom and a cyano group are more preferred.

It is more preferred that all of $Y^{11}$, $Y^{12}$ and $Y^{13}$ are a methine in terms of readiness and costs of the compound synthesis, and it is still more preferred that the methine is unsubstituted.

Each of $L^1$, $L^2$ and $L^3$ independently represents a single bond or a divalent linking group.

When $L^1$, $L^2$ and $L^3$ are a divalent linking group, it is preferred that each of $L^1$, $L^2$ and $L^3$ is independently a divalent linking group selected front the group consisting of —O—, —S—, —C(=O)—, —NR$^7$—, —CH=CH—, —C≡C—, a divalent cyclic group and a combination thereof. $R^7$ is an alkyl group having 1 to 7 carbon atoms or a hydrogen atom, preferably an alkyl group having 1 to 4 carbon atoms or a hydrogen atom, more preferably a methyl group, an ethyl group or a hydrogen atom, and most preferably a hydrogen atom.

The divalent cyclic group in $L^1$, $L^2$ and $L^3$ is a divalent linking group having at least one cyclic structure (hereinafter referred to as a cyclic group in some cases). The cyclic group is preferably a 5-, 6- or 7-membered ring, more preferably a 5- or 6-membered ring, and most preferably a 6-membered ring. The ring included in the cyclic ring may be a condensed ring. However, a monocycle is more preferred than a condensed ring. Furthermore, the ring included in the cyclic group may be any of an aromatic ring, an aliphatic ring and a heterocyclic ring. Preferred examples of the aromatic ring include a benzene ring and a naphthalene ring. Preferred examples of the aliphatic ring include a cyclohexane ring. Preferred examples of the heterocyclic ring include a pyridine ring and a pyrimidine ring. The cyclic group is more preferably an aromatic ring or a heterocyclic ring. Meanwhile, the divalent cyclic group in the present invention is more preferably a divalent linking group composed of only a cyclic structure (however, including substituents) (hereinafter the same).

Among the divalent cyclic groups represented by $L^1$, $L^2$ and $L^3$, the cyclic group having a benzene ring is preferably a 1,4-phenylene group. The cyclic group having a naphthalene ring is preferably a naphthalene-1,5-diyl group or a naphthalene-2,6-diyl group. The cyclic group having a cyclohexane ring is preferably a 1,4-cyclohexylene group. The cyclic group having a pyridine ring is preferably a pyridine-2,5-diyl group. The cyclic group having a pyrimidine ring is preferably a pyrimidine-2,5-diyl group.

The divalent cyclic group represented by $L^1$, $L^2$ and $L^3$ may have a substituent. Examples of the substituent include a halogen atom (preferably a fluorine atom and a chlorine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group substituted having 2 to 16 carbon atoms, and an acylamino group having 2 to 16 carbon atoms.

Preferred examples of $L^1$, $L^2$ and $L^3$ include a single bond, *—O—CO—, *—CO—O—, *—CH=CH—, *—C≡C—, *-divalent cyclic group-, *—O—CO-a divalent group-, *—CO—O-divalent cyclic group-, *—CH=CH-divalent cyclic group-, *—C≡C-divalent cyclic group-, *-divalent cyclic group-O—CO—, *-divalent cyclic group-CO—O—, *-divalent cyclic group-CH=CH—, and *-divalent cyclic group-C≡C—. A single bond, *—CH=CH—, *—C≡C—, *—CH=CH-divalent cyclic group- and *—C≡C-divalent cyclic group- are particularly preferred, and a single bond is most preferred. Here, * represents a position bonding to the 6-membered ring side including $Y^{11}$, $Y^{12}$ and $Y^{13}$ in Formula (I).

In Formula (I), each of $H^1 H^2$ and $H^3$ independently represents a group of Formula (I-A) or Formula (I-B).

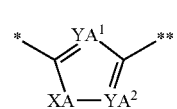

Formula (I-A)

In Formula (I-A), each of $YA^1$ and $YA^2$ independently represents a methine which may have a substituent, or a nitrogen atom; XA represents art oxygen atom, a sulfur atom and methylene or imino; * represents a position bonding to the side of $L^1$ to $L^3$ in Formula (I); and ** represents a position bonding to the side of $R^1$ to $R^3$ in Formula (I).

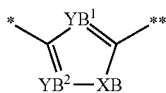

Formula (I-B)

In Formula (I-B), each of $YB^1$ and $YB^2$ independently represents a methine which may have a substituent, or a nitrogen atom; XB represents an oxygen atom, a sulfur atom and methylene or imino; * represents a position bonding to the side of $L^1$ to $L^3$ in Formula (I); and ** represents a position bonding to the side of $R^1$ to $R^5$ in Formula (I).

In Formula (I), each of $R^1$, $R^2$ and $R^3$ independently represents me following Formula (I-R).

Formula (I-R)

In Formula (I-R), * represents a position bonding to the side of $H^1$ to $H^3$ Formula (I).

$L^{21}$ represents a single bond or a divalent linking group. When $L^{21}$ is a divalent linking group, $L^{21}$ is preferably a divalent linking group selected from the group consisting of —O—, —S—, —C(=O)—, —NR$^8$—, —CH=CH—, —C≡C— and a combination thereof. $R^8$ is an alkyl group having 1 to 7 carbon atoms or a hydrogen atom, preferably an alkyl group having 1 to 4 carbon atoms or a hydrogen atom, more preferably a methyl group, an ethyl group or a hydrogen atom, and most preferably a hydrogen atom.

$L^{21}$ is preferably any of a single bond, *—O—CO—, *—CO—O—, *—CH=CH— and *—C≡C— (wherein, *** represents the * side in Formula (I-R)), and more preferably a single bond.

$Q^2$ represents a divalent group (cyclic group) having at least one cyclic structure. Preferred examples of the cyclic group include a cyclic group having a 5-, 6- or 7-membered ring, more preferred example thereof include a cyclic group having a 5- or 6-membered ring, and still more preferred example include a cyclic group having a 6-membered ring. The cyclic structure included in the cyclic group may be a condensed ring. However, a monocycle is more preferred than a condensed ring. Furthermore, the ring included in the cyclic group may be any of an aromatic ring, an aliphatic ring and a heterocyclic ring. Preferred examples of the aromatic ring, include a benzene ring, a naphthalene ring, an anthracene ring and a phenanthrene ring. Preferred examples of the aliphatic ring include a cyclohexane ring. Preferred examples of the heterocyclic ring include a pyridine ring and a pyrimidine ring.

Among the groups represented by $Q^2$, the cyclic group having a benzene ring is preferably a 1,3-phenylene group and a 1,4-phenylene group. The cyclic group having a naphthalene ring is preferably a naphthalene-1,4-diyl group, a naphthalene-1,5-diyl group, a naphthalene-1,6-diyl group, a naphthalene-2,5-diyl group and a naphthalene-2,6-diyl, naphthalene-2,7-diyl group. The cyclic group having a cyclohexane ring is preferably a 1,4-cyclohexylene group. The cyclic group having a pyridine ring is preferably a pyridine-2,5-diyl group. The cyclic group having a pyrrolidine ring is preferably a pyrimidine-2,5-dilyl group. Among them, a 1,4-phenylene group, a naphthalene-2,6-diyl group and a 1,4-cyclohexylene group are particularly preferred.

Among the groups represented by $Q^2$, the cyclic group having a 5-membered ring is preferably a 1,2,4-oxadiazole-2,5-diyl group, a 1,3,4-oxadiazole-2,5-diyl group, a 1,2,4-thiadiazole-2,5-diyl group and a 1,3,4-thiadiazole-2,5-diyl group.

$Q^2$ may have a substituent. Examples of the substituent include a halogen atom (preferably a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. Among them, a halogen atom, a cyano group, an alkyl group having 1 to 6 carbon atoms and a halogen-substituted, alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms and a trifluoromethyl group are still more preferred.

n1 represents an integer of 0 to 4. n1 is preferably an integer of 1 to 3, and more preferably 1 or 2.

$L^{22}$ represents —O—, —O—CO—, —CO—O—, —O—CO—O, —S—, —N(R$^{101}$)—, —SO$_2$—, —CH$_2$—, —CH=CH— or —C≡C—, R$^{101}$ represents an alkyl group having 1 to 5 carbon atoms, and ** indicates a position bonding to $Q^2$ side.

$L^{22}$ is preferably —O—, —O—CO—, —CO—O—, —O—CO—O—, —CH$_2$—, —CH=CH— and —C≡C—, and more preferably —O—, —O—CO—, —O—CO—O— and **—CH$_2$—. When $L^{22}$ is a group including a hydrogen atom, the hydrogen atom may be substituted with a substituent. Preferred examples of the substituent include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms and an acylamino group having 2 to 6 carbon atoms, and a halogen atom and an alkyl group having 1 to 6 carbon atoms are more preferred.

$L^{23}$ represents a divalent linking group selected from the group consisting of —O—, —S—, —C(=O)—, —SO$_2$—, —NH—, —CH$_2$—, —CH=CH—, —C≡C— and a combination thereof. Here, a hydrogen atom in —NH—, —CH$_2$— and —CH=CH— may be substituted with a substituent. Preferred examples of the substituent include a halogen atom, a cyano group, a nitro group, an alkyl group having 1 to 6 carbon atoms, an acyl group having 1 to 6 carbon atoms, an alkoxy group having 1 to 6 carbon atoms, an acyl group having 2 to 6 carbon atoms, an alkythio group having 1 to 6 carbon atoms, an acyloxy group having 2 to 6 carbon atoms, an alkoxycarbonyl group having 2 to 6 carbon atoms, a carbonyl group, a an alkyl-substituted carbamoyl group having 2 to 6 carbon atoms and a acylamino group having 2 to 6 carbon atoms, and a halogen atom and an alkyl group having 1 to 6 carbon atoms are more preferred. By being substituted with these substituents, when a liquid crystalline composition is prepared with the liquid crystalline compound of the present invention, the solubility to the solvent used may be improved.

$L^{23}$ is preferably selected, from the group consisting of —O—, —C(=O)—, —CH$_2$—, —CH=CH—, —C≡C— and a combination thereof. $L^{23}$ contains preferably 1 to 20 carbon atoms, and more preferably 2 to 14 carbon atoms. Further, contains preferably 1 to 16 of —CH$_2$— and more preferably 2 to 12 of —CH$_2$—.

$Q^1$ represents a polymerizable group or a hydrogen atom. When the liquid crystalline compound in the present invention is used in an optical film and the like in which the magnitude of the phase difference is not preferably changed by heat, such as an optically-compensatory film, $Q^1$ is preferably a polymerizable group. The polymerizable group is preferably an addition polymerizable group (including a ring-opening polymerizable group) or a condensation polymerizable group. That is, the polymerizable group is preferably a functional group capable of an addition polymerization reaction or a condensation polymerization reaction. Examples of the polymerizable group will be shown below.

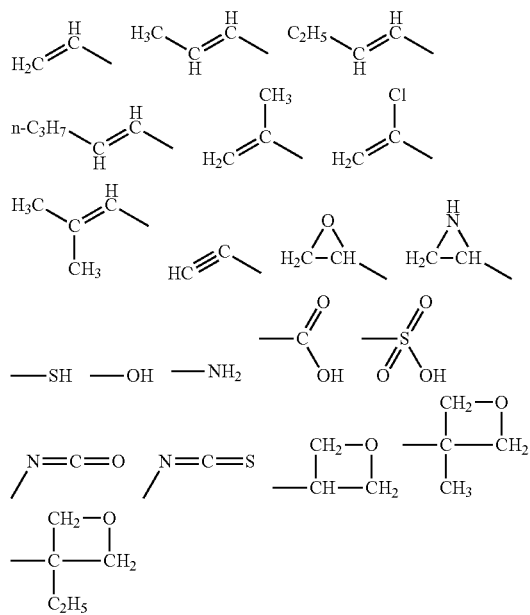

Further, the polymerizable group is particularly preferably a functional group capable of an addition polymerization reaction. Such a polymerizable group is preferably a ethylenically unsaturated polymerizable group or a ring-opening polymerizable group.

Examples of the ethylenically unsaturated polymerizable group include the following Formulas (M-1) to (M-6).

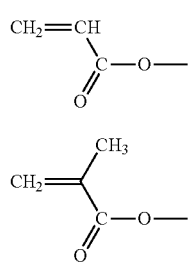
(M-1)

(M-2)

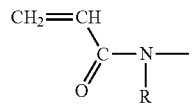
(M-3)

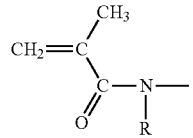
(M-4)

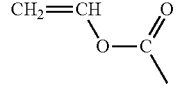
(M-5)

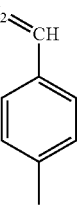
(M-6)

In Formulas (M-3) and (M-4), R represents a hydrogen atom or an alkyl group, and is preferably a hydrogen atom or a methyl group is preferred.

Among Formulas (M-1) to (M-6), (M-1) or (M-2) is preferred, and (M-1) is more preferred.

The ring-opening polymerizable group is preferably a cyclic ether group, and more preferably an epoxy group or an oxetanyl group.

Among the compounds of Formula (I), a compound represented by the following Formula (I') is more preferred.

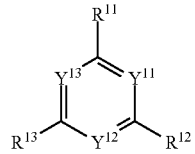
Formula (I')

In Formula (I'), each of $Y^{11}$, $Y^{12}$ and $Y^{13}$ independently represents a methine which may have a substituent, or a nitrogen atom, and is preferably a methine which may have a substituent, and the methine is preferably unsubstituted.

Each of $R^{11}$, $R^{12}$ and $R^{13}$ independently represents the following Formula (I'-A), the following Formula (I'-B) or the following Formula (I'-C). In order to reduce the wavelength dispersibility of the intrinsic birefringence, Formula (I'-A) or Formula (I'-C) is preferred, and Formula (I'-A) is more preferred. $R^{11}$, $R^{12}$ and $R^{13}$ are preferably $R^{11}$=$R^{12}$=$R^{13}$.

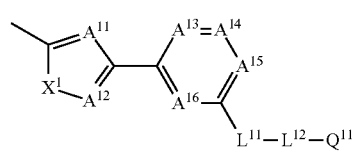
Formula (I'-A)

In Formula (I'-A), each of $A^{11}$, $A^{12}$, $A^{13}$, $A^{14}$, $A^{15}$ and $A^{16}$ independently represents a methine which may have a substituent, or a nitrogen atom.

At least one of $A^{11}$ and $A^{12}$ is preferably a nitrogen atom, and both of $A^{11}$ and $A^{12}$ are more preferably a nitrogen atom.

At least three of $A^{13}$, $A^{14}$, $A^{15}$ and $A^{16}$ are preferably a methine which may have a substituent, and all of $A^{13}$, $A^{14}$, $A^{15}$ and $A^{16}$ are more preferably a methine which may have a substituent. Further, the methine is preferably unsubstituted.

When $A^{11}$, $A^{12}$, $A^{13}$, $A^{14}$, $A^{15}$ or $A^{16}$ is a methine which may have a substituent, examples of the substituent include a halogen atom (a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. Among them, a halogen atom, a cyano group, an alkyl group having 1 to 6 carbon atoms and a halogen-substituted alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms and a trifluoromethyl group are still more preferred.

$X^1$ represents an oxygen atom, a sulfur atom, and methylene or imino, and is preferably an oxygen atom.

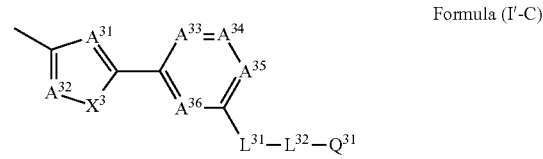

Formula (I'-B)

In Formula (I'-B), each of $A^{21}$, $A^{22}$, $A^{23}$, $A^{24}$, $A^{25}$ and $A^{26}$ independently represents a methine or a nitrogen atom, which may have a substituent.

At least one of $A^{21}$ and $A^{22}$ is preferably a nitrogen atom, and both of $A^{21}$ and $A^{22}$ are more preferably a nitrogen atom.

At least three of $A^{23}$, $A^{24}$, $A^{25}$ and $A^{26}$ are preferably a methine which may have a substituent, and all of $A^{23}$, $A^{24}$, $A^{25}$ and $A^{26}$ are more preferably a methine which may have a substituent. Further, the methine is preferably unsubstituted.

When $A^{21}$, $A^{22}$, $A^{23}$, $A^{24}$, $A^{25}$ or $A^{26}$ is a methine which may have a substituent, examples of the substituent include a halogen atom (a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, an alkyl-substituted carbamoyl group having 2 to 16 carbon atoms, and an acylamino group having 2 to 16 carbon atoms. Among them, a halogen atom, a cyano group, an alkyl group having 1 to 6 carbon atoms and a halogen-substituted alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms and a trifluoromethyl group are still more preferred.

$X^2$ represents an oxygen atom, a sulfur atom, and methylene or imino, and is preferably an oxygen atom.

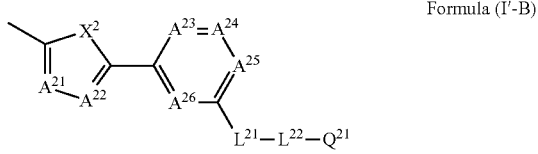

Formula (I'-C)

In Formula (I'-C), each of $A^{31}$, $A^{32}$, $A^{33}$, $A^{34}$, $A^{35}$ and $A^{36}$ independently represents a methine which may have a substituent, or a nitrogen atom.

At least one of $A^{31}$ and $A^{32}$ is preferably a nitrogen atom, and both of $A^{31}$ and $A^{32}$ are more preferably a nitrogen atom.

At least three of $A^{33}$, $A^{34}$, $A^{35}$ and $A^{36}$ are preferably a methine which may have a substituent, and all of $A^{33}$, $A^{34}$, $A^{35}$ and $A^{36}$ are more preferably a methine which may have a substituent. Further, the methine is preferably unsubstituted.

When $A^{31}$, $A^{32}$, $A^{33}$, $A^{34}$, $A^{35}$ or $A^{36}$ is a methine which may have a substituent, the methine may have a substituent. Examples of the substituent include a halogen atom (a fluorine atom, a chlorine atom, a bromine atom and an iodine atom), a cyano group, a nitro group, an alkyl group having 1 to 16 carbon atoms, an alkenyl group having 2 to 16 carbon atoms, an alkynyl group having 2 to 16 carbon atoms, a halogen-substituted alkyl group having 1 to 16 carbon atoms, an alkoxy group having 1 to 16 carbon atoms, an acyl group having 2 to 16 carbon atoms, an alkylthio group having 1 to 16 carbon atoms, an acyloxy group having 2 to 16 carbon atoms, an alkoxycarbonyl group having 2 to 16 carbon atoms, a carbamoyl group, a carbamoyl group substituted by an alkyl group having 2 to 16 carbon atoms, and an acylamino group having 2 to 16 carbon atoms. Among them, a halogen atom, a cyano group, an alkyl group having 1 to 6 carbon atoms and a halogen-substituted alkyl group having 1 to 6 carbon atoms are preferred, a halogen atom, an alkyl group having 1 to 4 carbon atoms, and a halogen-substituted alkyl group having 1 to 4 carbon atoms are more preferred, and a halogen atom, an alkyl group having 1 to 3 carbon atoms and a trifluoromethyl group are still more preferred.

$X^3$ represents an oxygen atom, a sulfur atom, and methylene or imino, and is preferably an oxygen atom.

Each of $L^{11}$ in Formula (I'-A), $L^{21}$ in Formula (I'-B) and $L^{31}$ in Formula (I'-C) independently represents —O—, —C(=O)—, —O—CO—, —CO—O—, —O—CO—O—, —S—, —NH—, —SO$_2$—, —CH$_2$—, —CH=CH— or —C≡C—, —O—, —C(=O)—, —O—CO—, —CO—O—, —O—CO—O—, —CH$_2$—, —CH=CH— and —C≡C— are preferred, and —O—, —O—CO—, —CO—O—, —O—CO—O— and —C≡C— are more preferred. In particular, the wavelength dispersibility of a small intrinsic birefringence may be expected, $L^{11}$ in Formula (I'-A) is particularly preferably —O—, —CO—O— and —C≡C—, and among them, —CO—O— is preferred because the discotic nematic phase may be developed at a higher temperature. When the above-described group is a group including a hydrogen atom, the hydrogen atom may be substituted with a substituent. Preferred examples of the substituent include a halogen atom, a cyano group, a nitro group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, a an alkyl-substituted carbamoyl group having 2 to 6 carbon atoms and an acyl amino group having 2 to 6 carbon atoms, and a halogen atom and an alkyl group having 1 to 6 carbon atoms are more preferred.

Each of $L^{12}$ in Formula (I'-A), $L^{22}$ in Formula (I'-B) and $L^{32}$ in Formula (I'-C) independently represents a divalent linking group selected from the group consisting of —O—, —S—, —C(=O)—, —SO$_2$—, —NH—, —CH$_2$—, —CH=CH—, —C≡C— and a combination thereof. Here, a hydrogen atom in —NH—, —CH$_2$— and —CH=CH— may be substituted with a substituent. Preferred examples of the substituent include a halogen atom, a cyano group, a nitro group, a hydroxyl group, a carboxyl group, an alkyl group having 1 to 6 carbon atoms, a halogen-substituted alkyl group having 1 to 6 carbon atoms, an alkoxy group having 1 to 6 carbon atoms, an acyl group having 2 to 6 carbon atoms, an alkylthio group having 1 to 6 carbon atoms, an acyloxy group having 2 to 6 carbon atoms, an alkoxycarbonyl group having 2 to 6 carbon atoms, a carbamoyl group, an alkyl-substituted carbamoyl group having 2 to 6 carbon atoms and an acylamino group having 2 to 6 carbon atom. Also, a halogen atom, a hydroxyl group and an alkyl group having 1 to 6 carbon atoms are more preferred, and a halogen atom, a methyl group and an ethyl group are particularly preferred.

Each of $L^{12}$, $L^{22}$ and $L^{32}$ is preferably independently selected from the group consisting of —O—, —C(=O)—, —CH=CH—, —C≡C— and a combination thereof.

Each of $L^{12}$, $L^{22}$ and $L^{32}$ independently has preferably 1 to 20 carbon atoms, and more preferably 2 to 14 carbon atoms. $L^{12}$, $L^{22}$ and $L^{32}$ have preferably 2 to 14 carbon atoms, more preferably 1 to 16 —CH$_2$—, and still more preferably 2 to 12 of —CH$_2$—.

The number of carbon atoms constituting $L^{12}$, $L^{22}$ and $L^{32}$ affects the phase transition temperature of a liquid crystal and the solubility of a compound in a solvent. In general, as the number of carbon atoms is increased, the transition temperature from discotic nematic phase (N$_D$ phase) to isotropic liquid tends to be decreased. In addition, as the number of carbon atoms is increased, the solubility in a solvent generally tends to be improved.

Each of $Q^{11}$ in Formula (I'-A), $Q^{21}$ in Formula (I'-B) and $Q^{31}$ in Formula (I'-C) independently represents a polymerizable group or a hydrogen atom. Furthermore, $Q^{11}$, $Q^{21}$ and $Q^{31}$ are preferably a polymerizable group. The polymerizable group is preferably an addition polymerizable group (including a ring-opening polymerizable group) or a condensation polymerizable group. That is, the polymerizable group is preferably a functional group capable of an addition polymerization reaction or a condensation polymerization reaction. Hereinafter, examples of the polymerizable group are the same as those described above, and preferred examples thereof are also the same as those described above.

Specific examples of the compound represented by Formula (I) include compounds described in [0038] to [0069] of the official gazette of Japanese Patent Application Laid-Open No. 2009-97002 or the following compounds, but the present invention is not limited thereto.

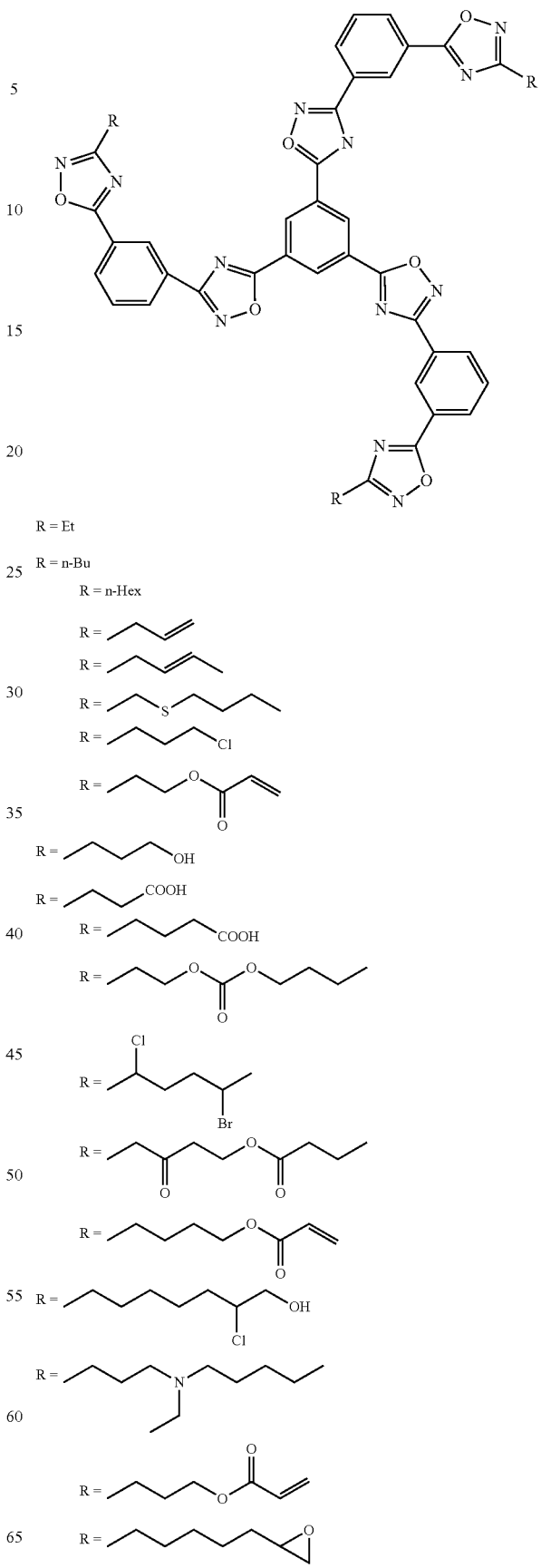

21
-continued
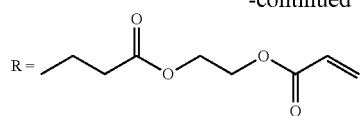
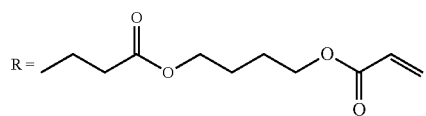
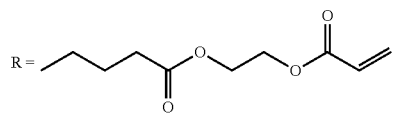
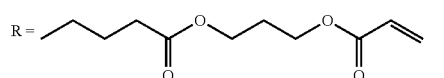
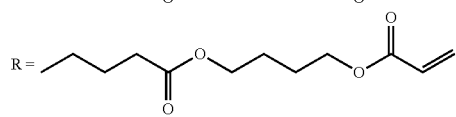
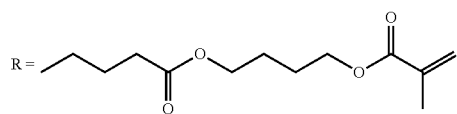
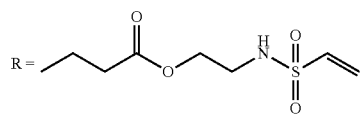
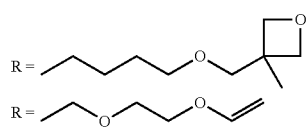
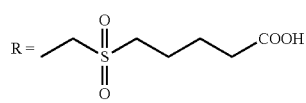
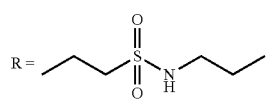
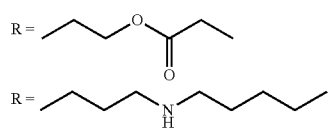
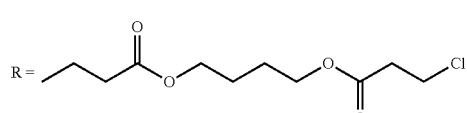
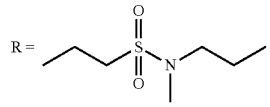
22
-continued
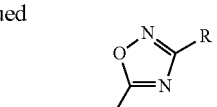
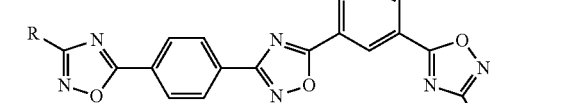
R = Et
R = n-Bu
R = n-Hex
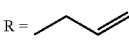
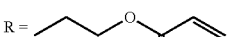
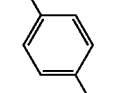
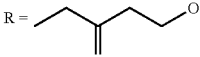
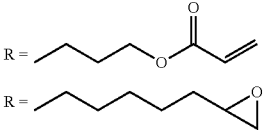

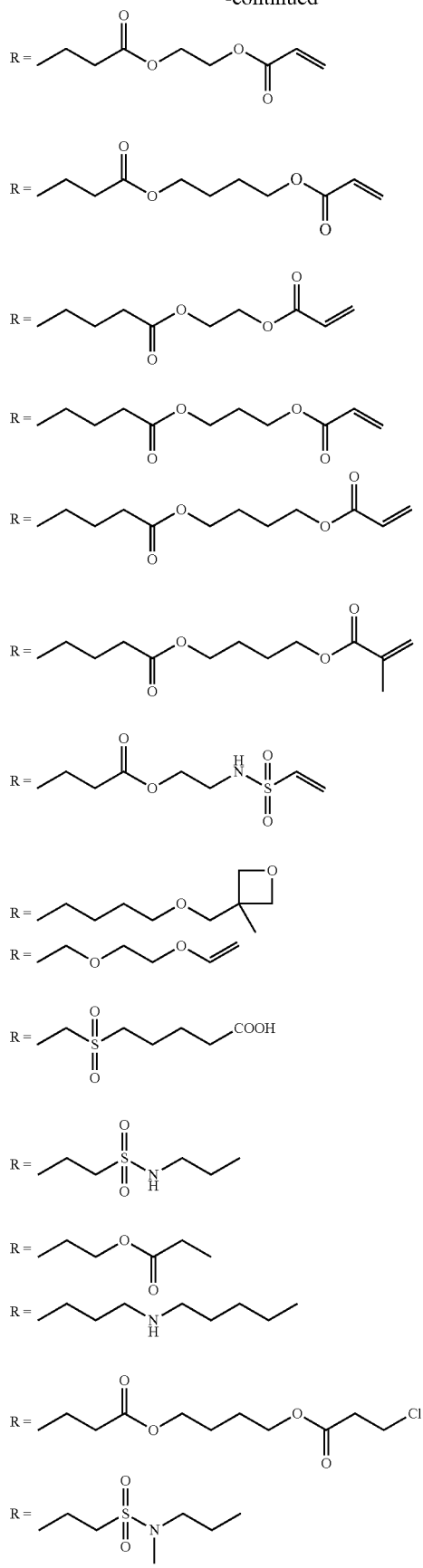
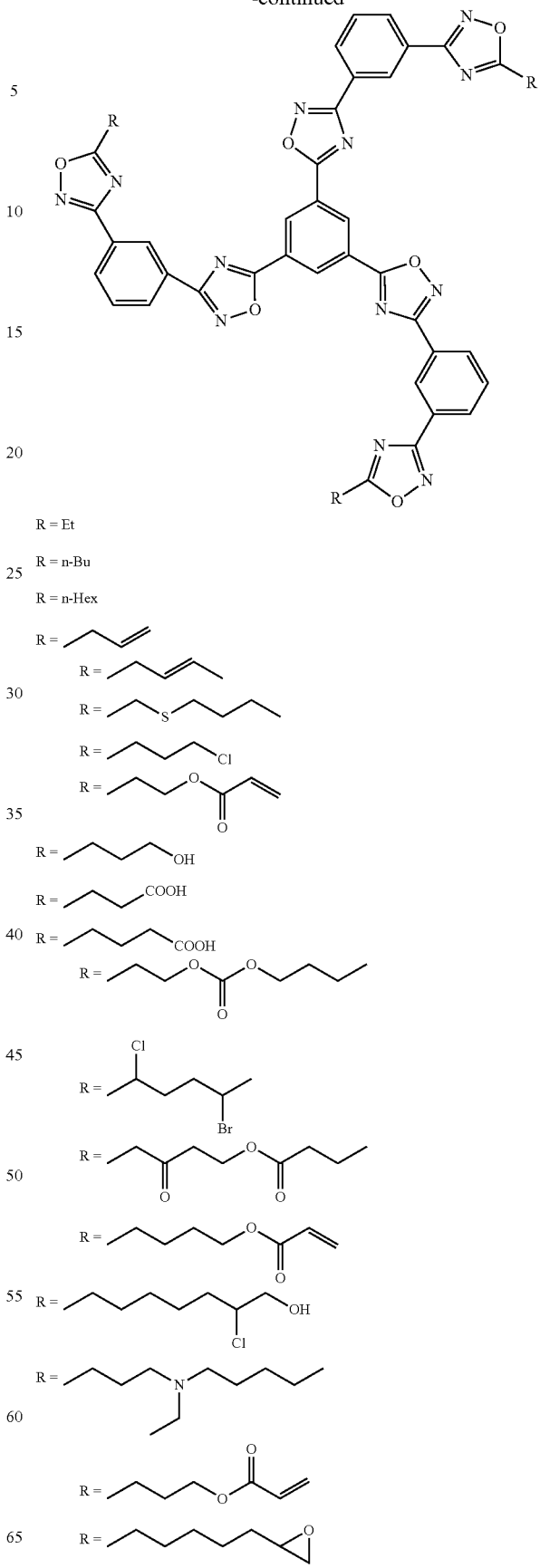

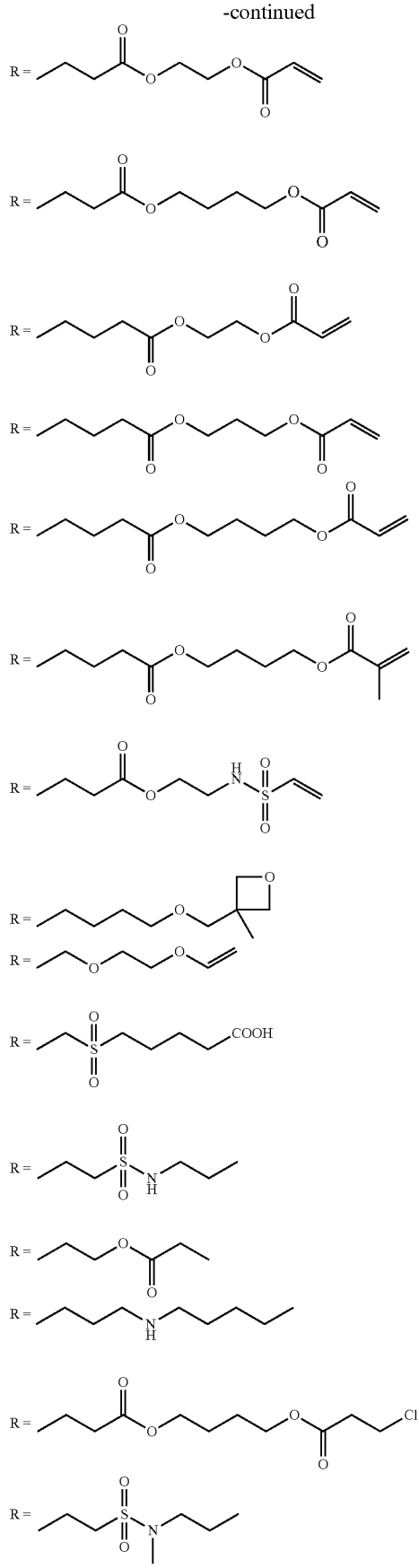
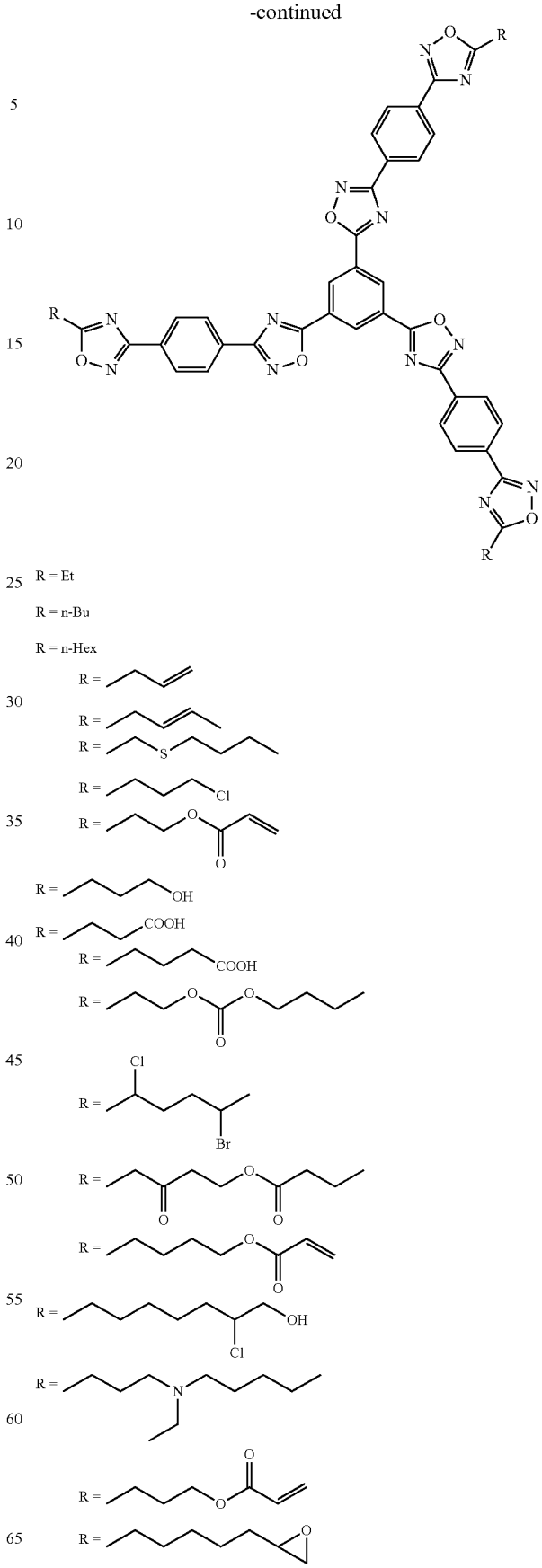

27
-continued
R = 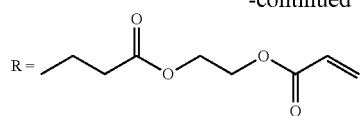
R = 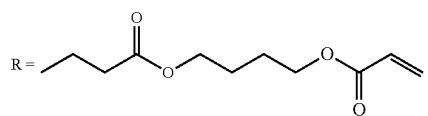
R = 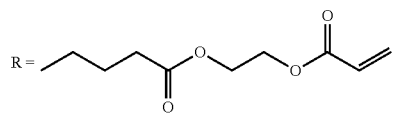
R = 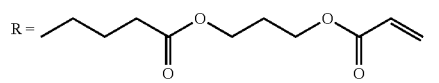
R = 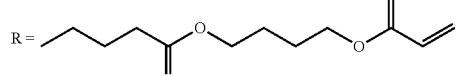
R = 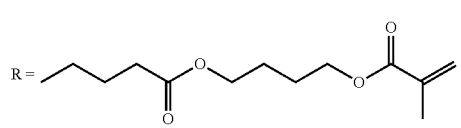
R = 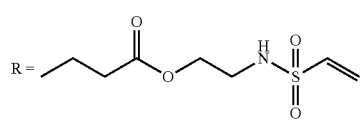
R = 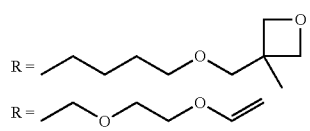
R = 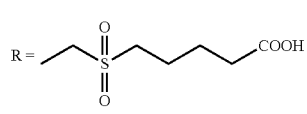
R = 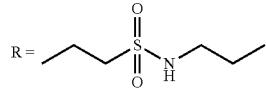
R = 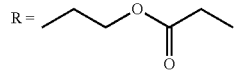
R = 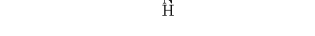
R = 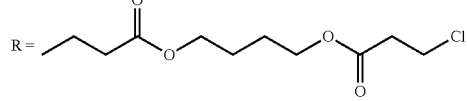
R = 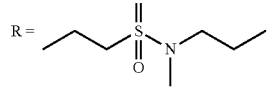
28
-continued
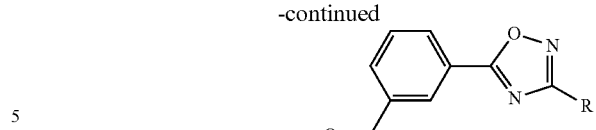
R = Et
R = n-Bu
R = n-Hex
R = 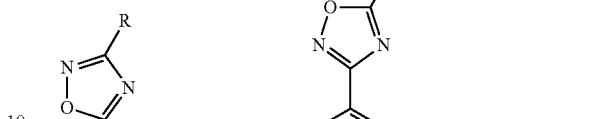
R = 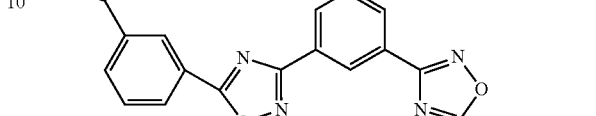
R = 
R = 
R = 
R = 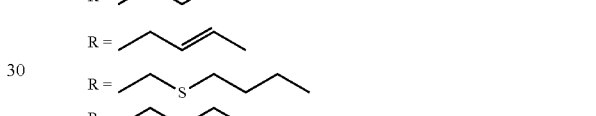
R = 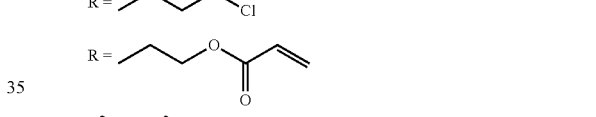
R = 
R = 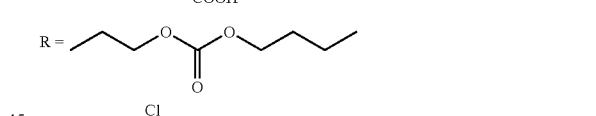
R = 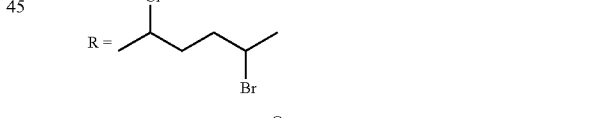
R = 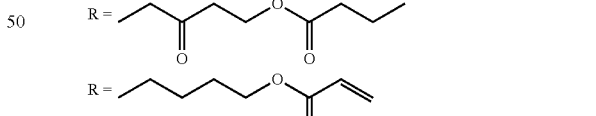
R = 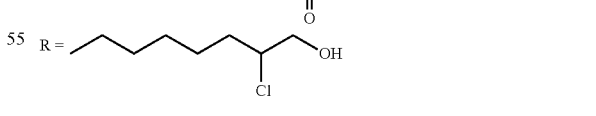

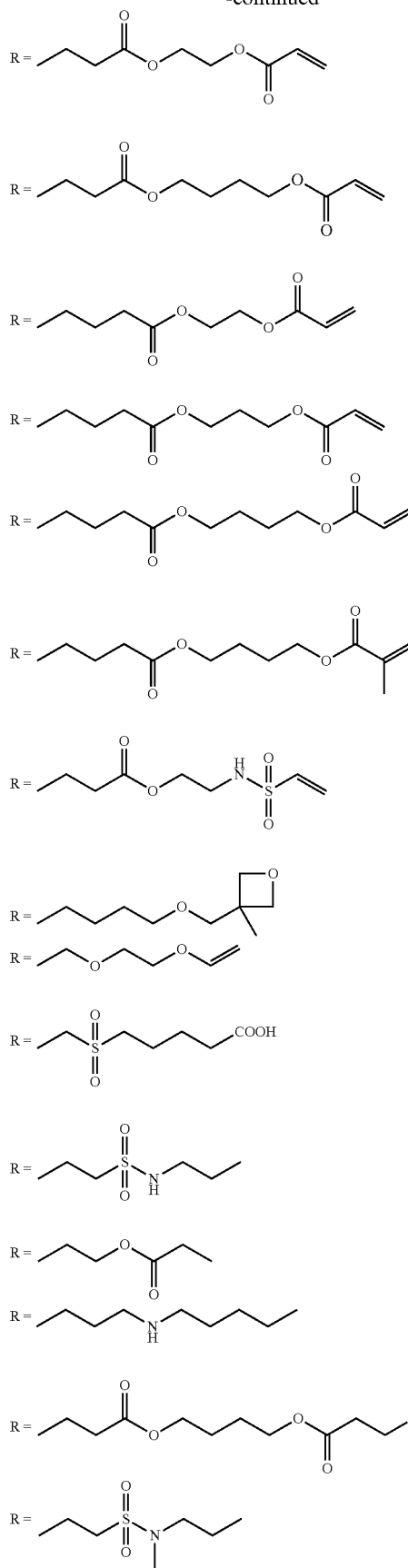
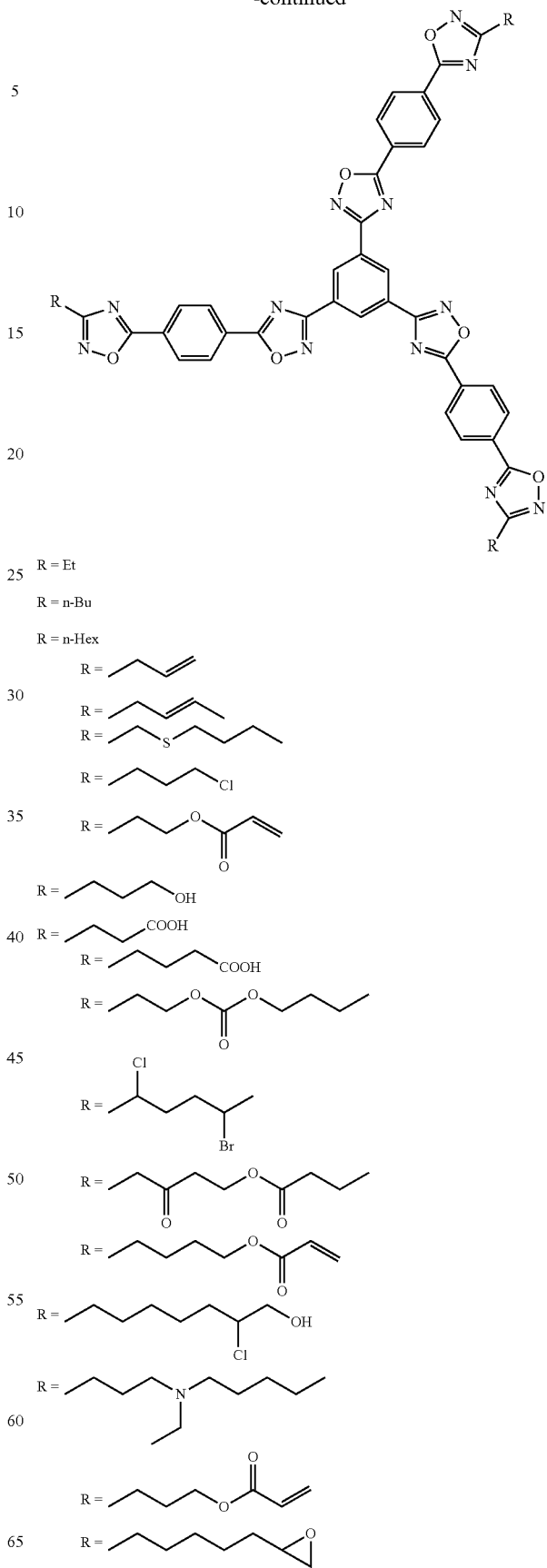

31
-continued
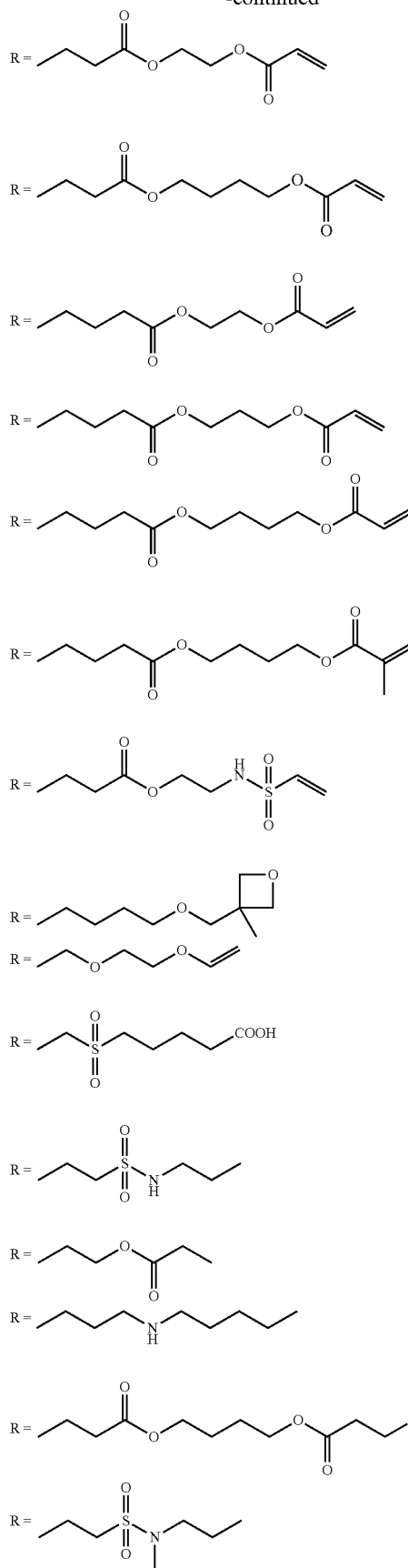
32
-continued
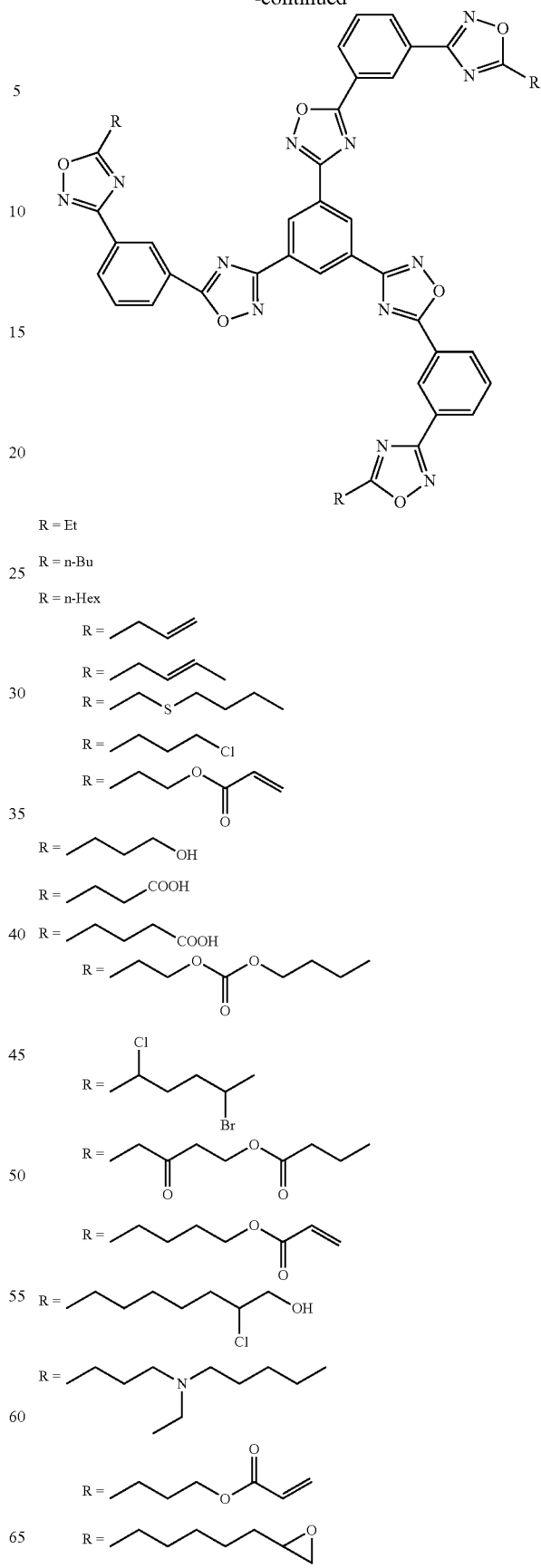

33
-continued (Structures with R= groups, including various esters, acrylates, methacrylates, sulfonamides, oxetanes, vinyl ethers, sulfones, amines, and chloro-substituted compounds)

34
-continued (A tris-oxadiazole-phenyl substituted benzene core structure with four R groups)

R = Et
R = n-Bu
R = n-Hex
R = (allyl)
R = (butenyl)
R = (thioether with pentyl)
R = (chlorobutyl)
R = (acrylate ester)
R = (hydroxybutyl)
R = (carboxylic acid)
R = (carboxylic acid, longer chain)
R = (butyl carbonate)
R = (dichloro substituted)
R = (bromo and keto ester)
R = (acrylate with butyl)
R = (hydroxyl with chloro)
R = (tertiary amine with ethyl)
R = (acrylate)
R = (epoxide)

35
-continued
R = 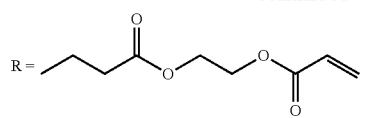
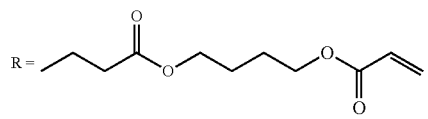
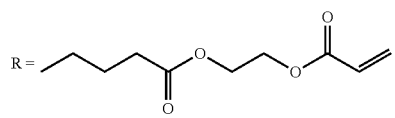
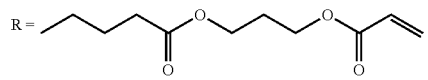
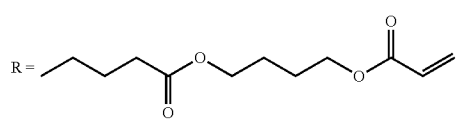
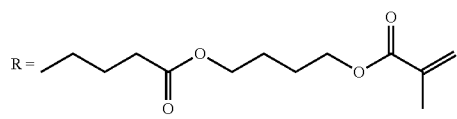
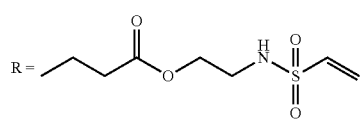
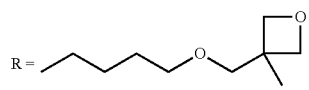
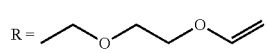
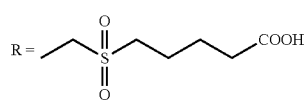
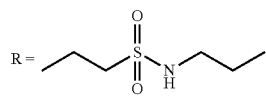
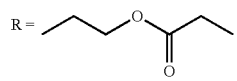
36
-continued
R = 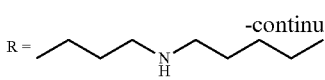
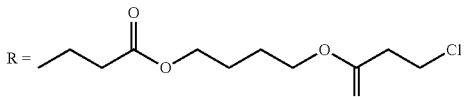
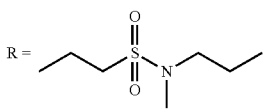
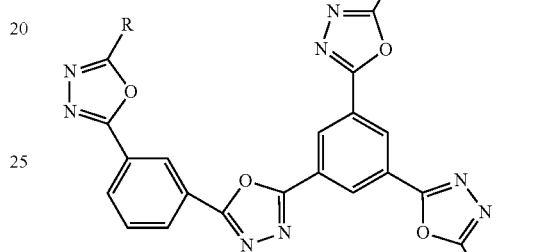
R = 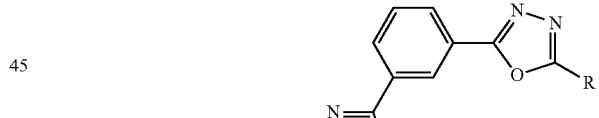
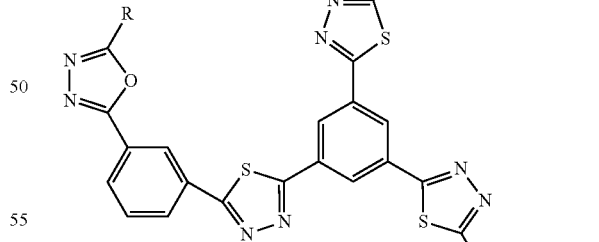
R = 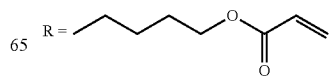

37
-continued
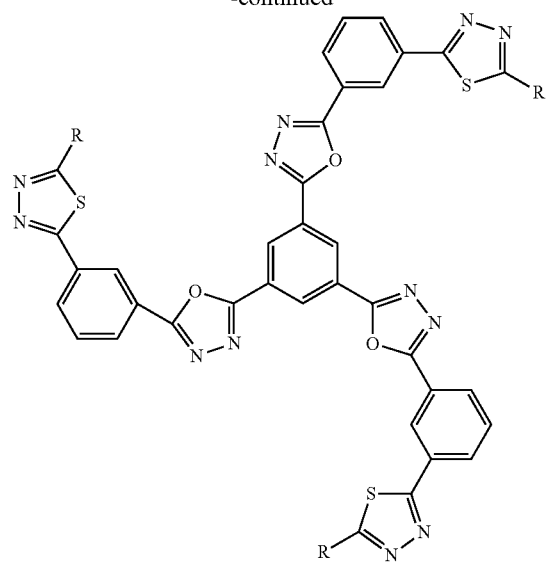
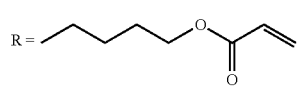
38
-continued
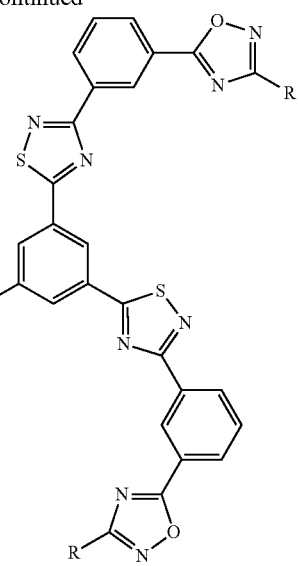
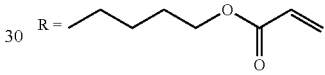
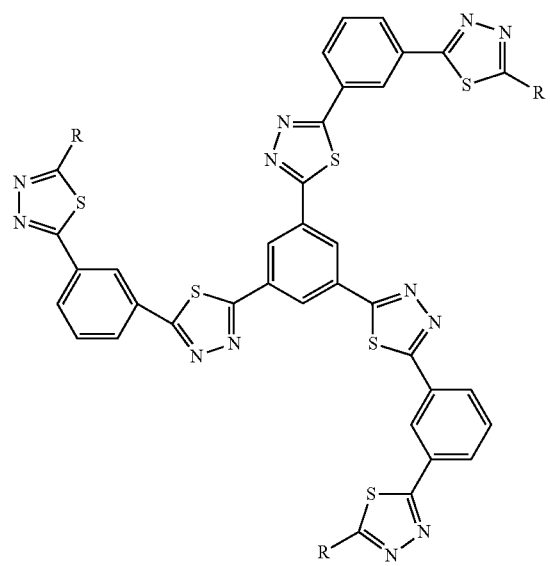
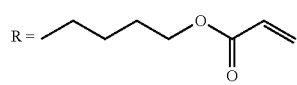
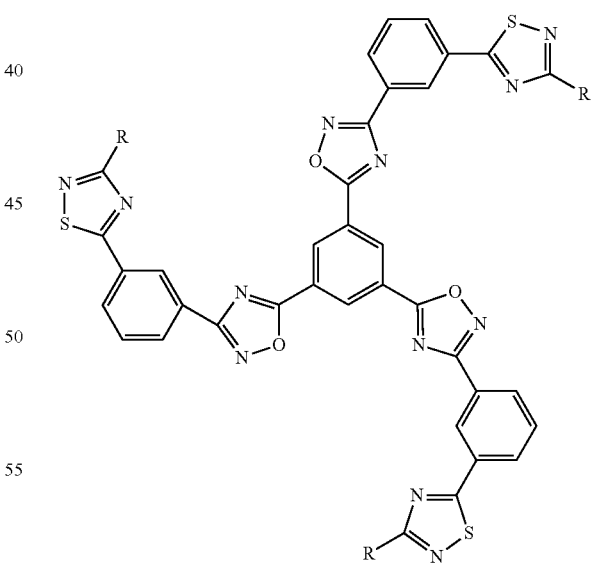
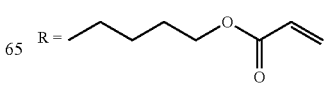

39
-continued
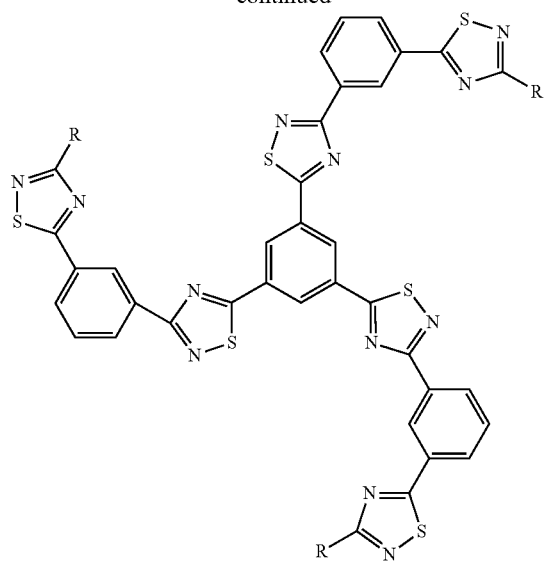
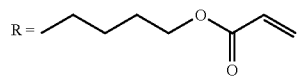
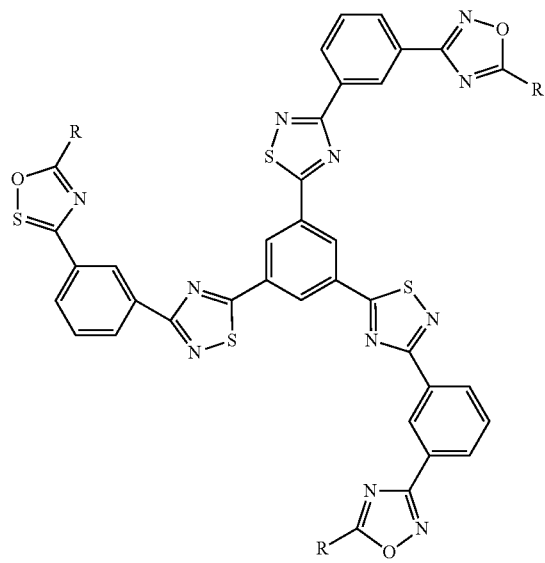
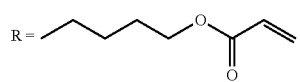
40
-continued
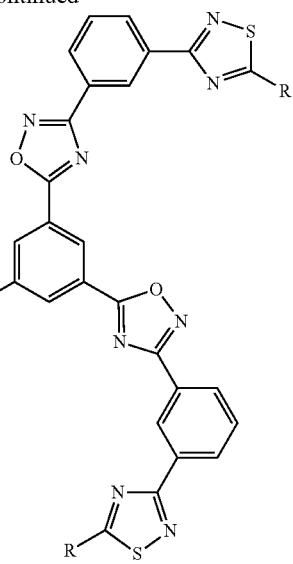
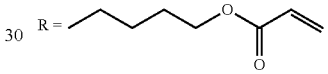
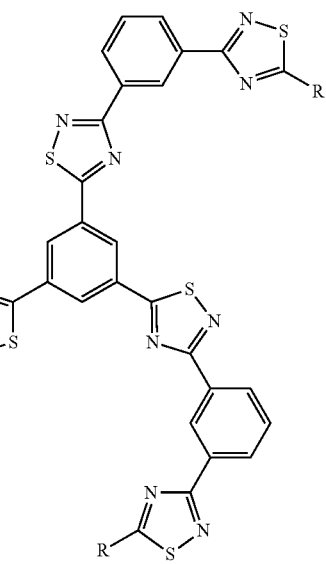
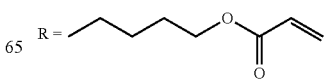

41
-continued
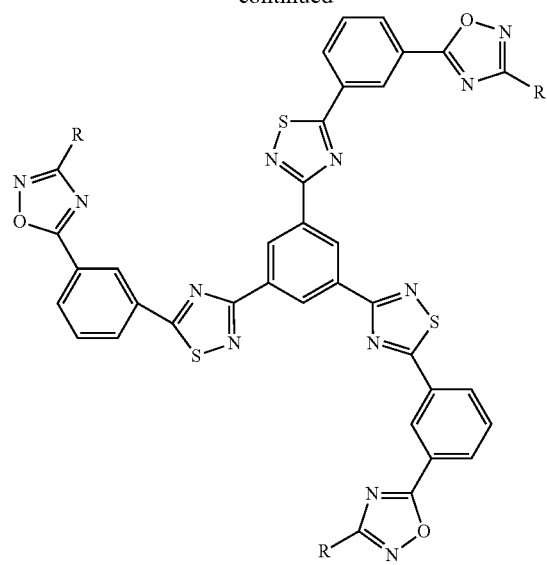
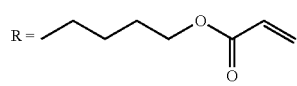
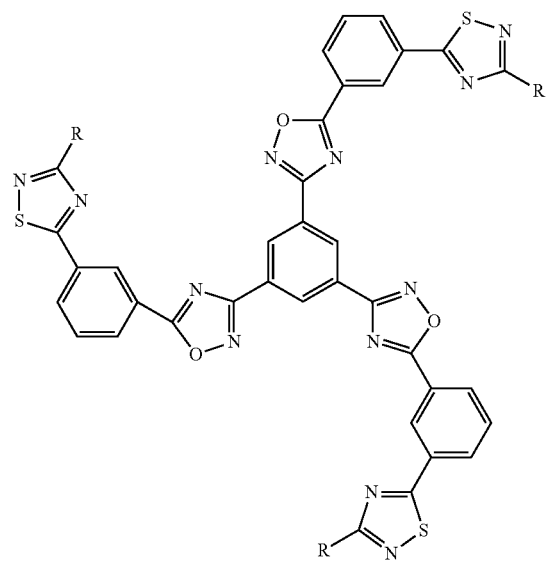
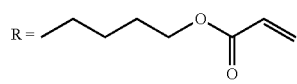
42
-continued
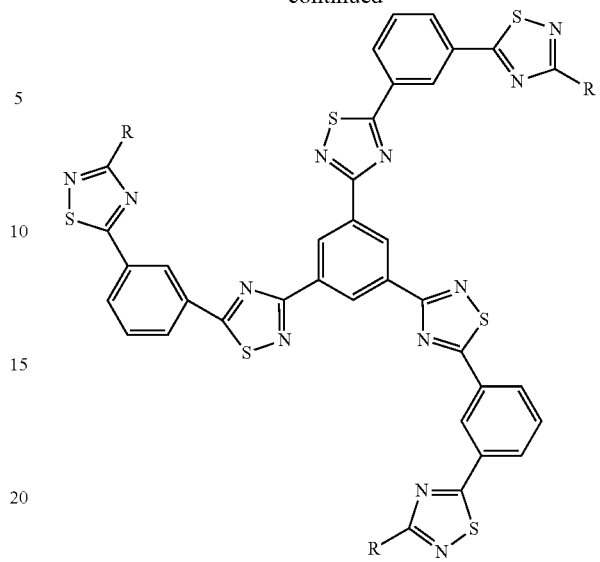
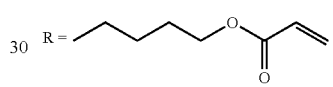
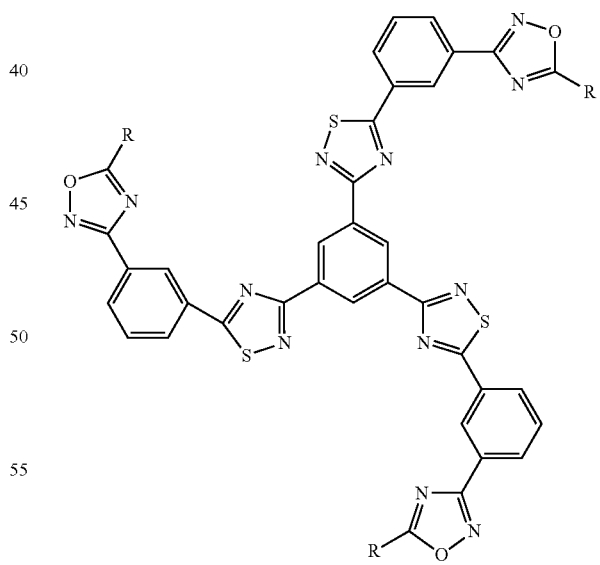
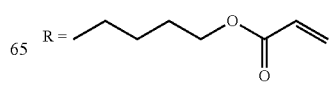

43
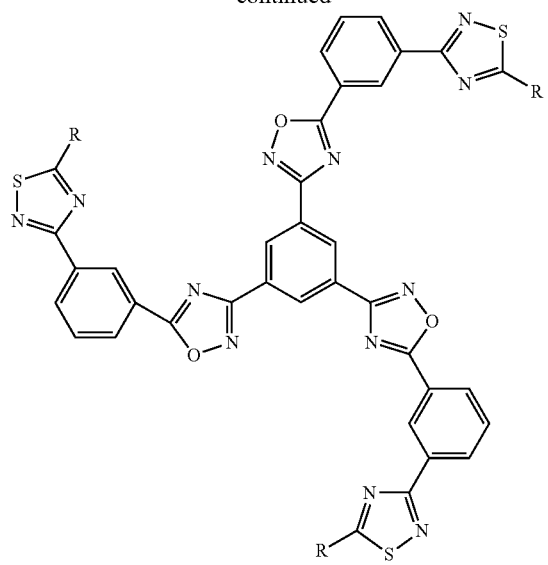
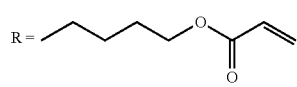
44
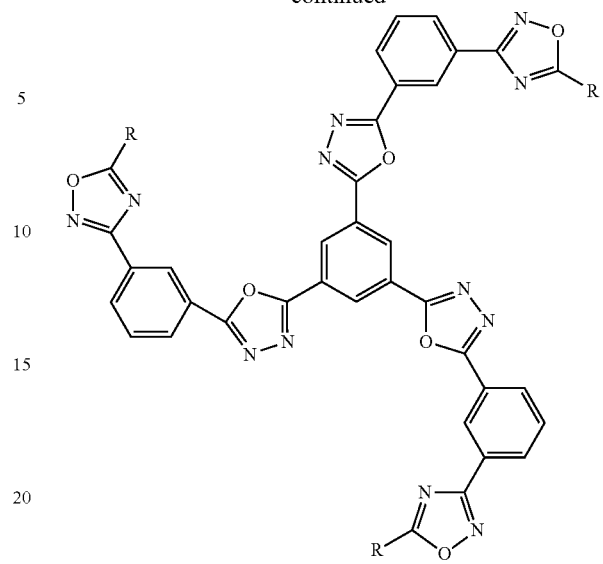
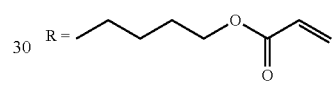
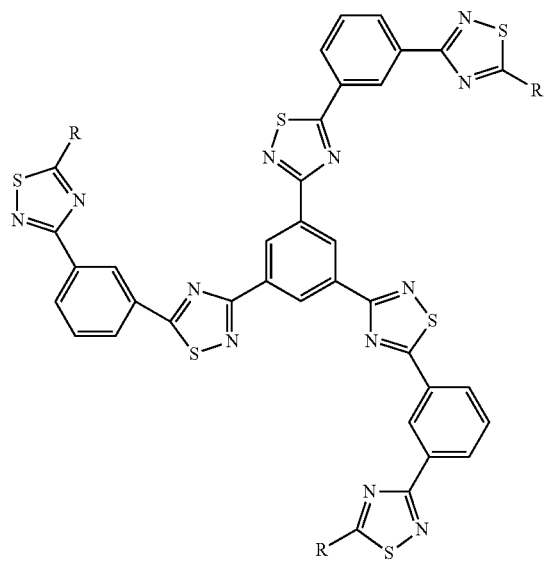
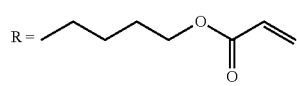
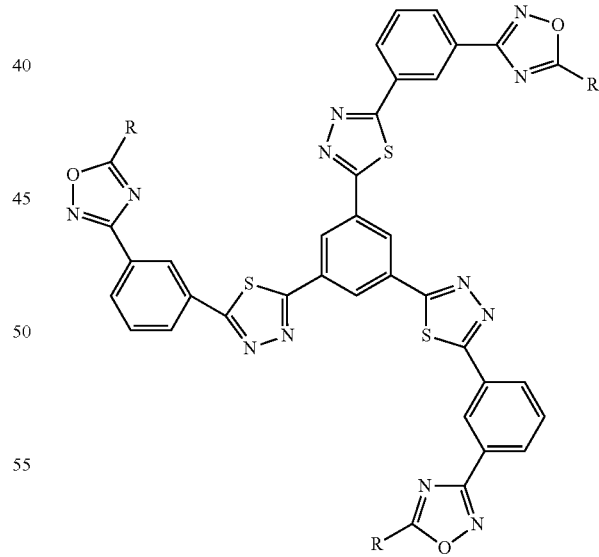
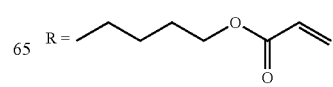

45
-continued
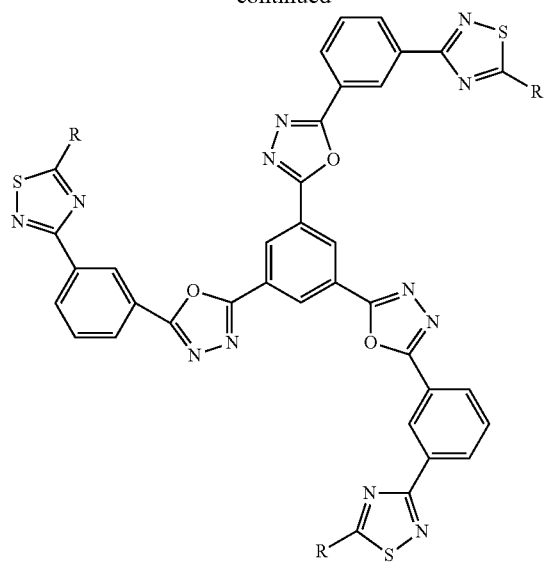
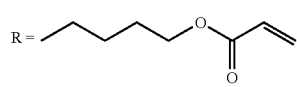
46
-continued
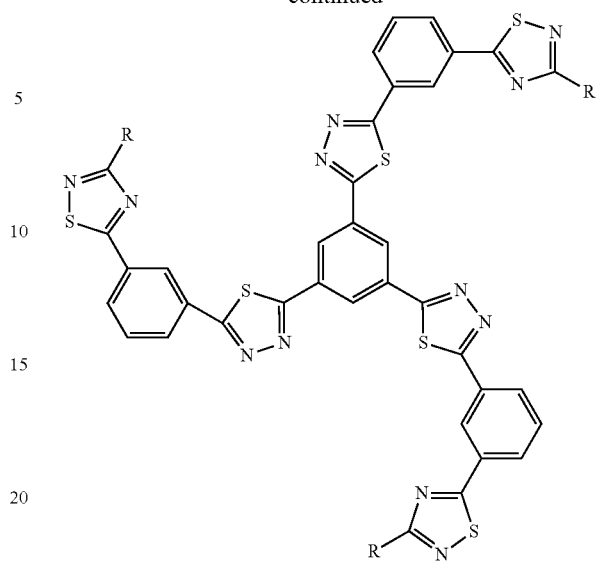
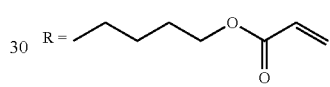
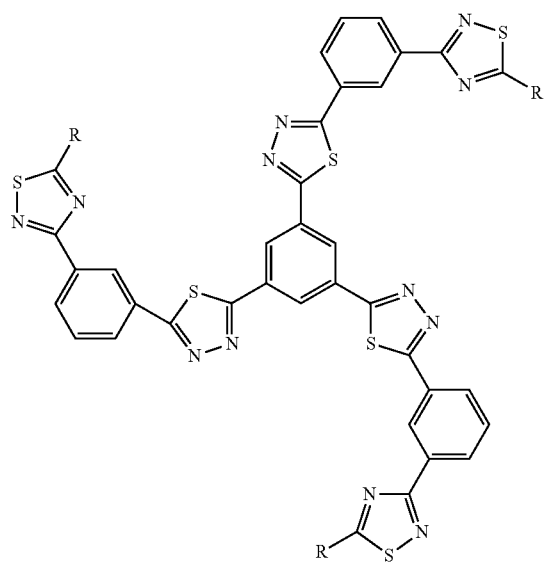
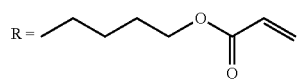
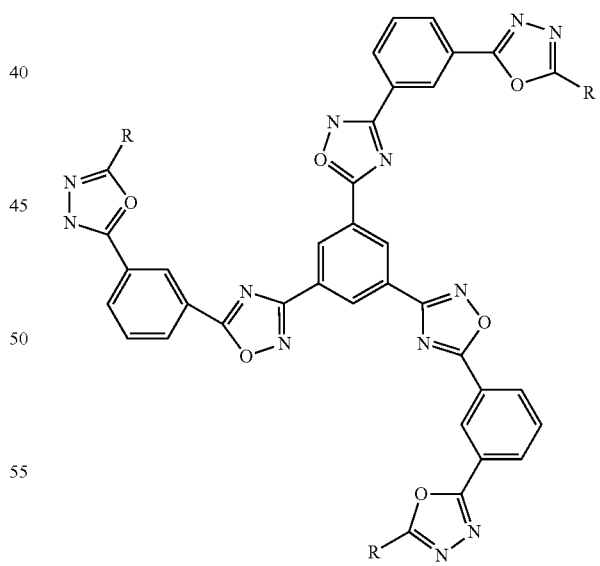
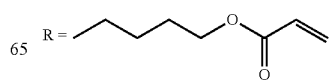

47
-continued
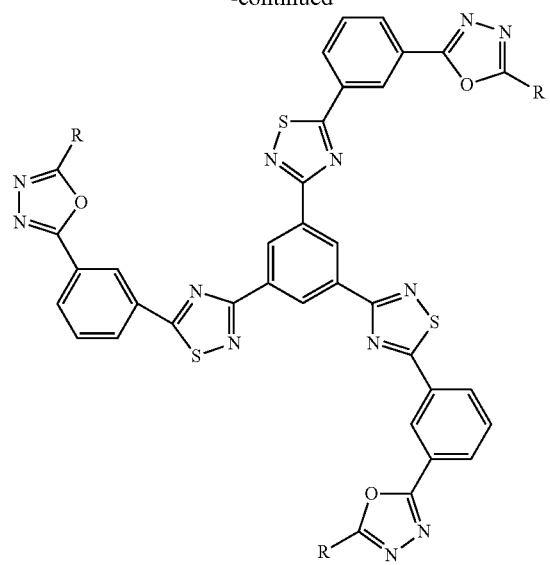
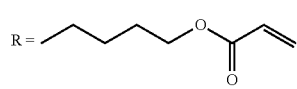
48
-continued
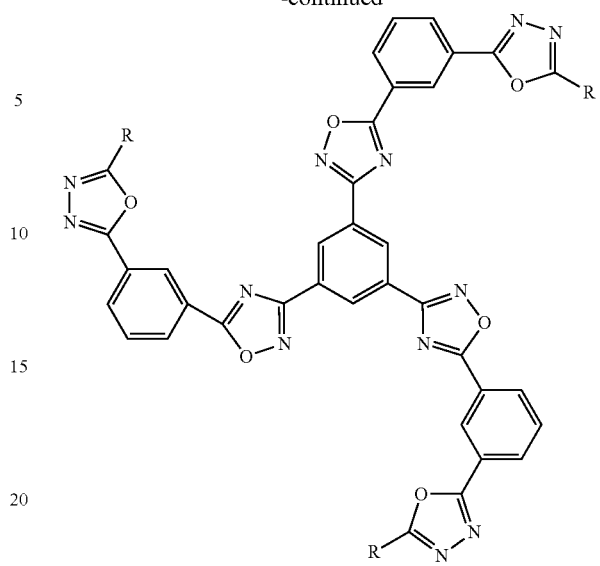
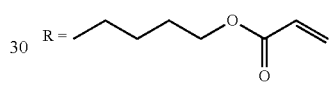
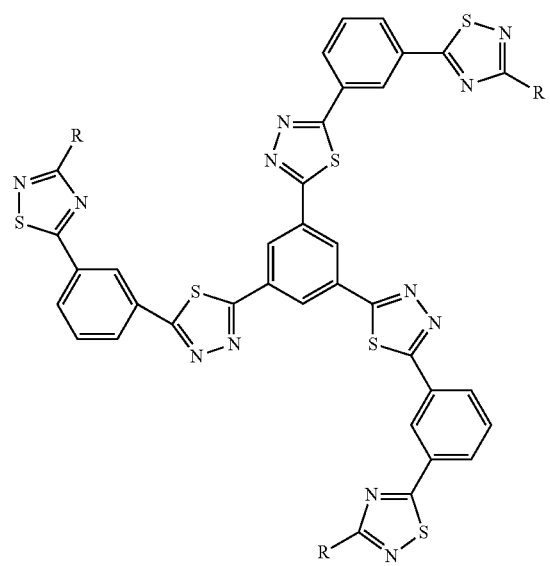
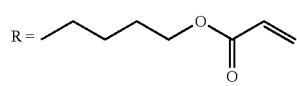
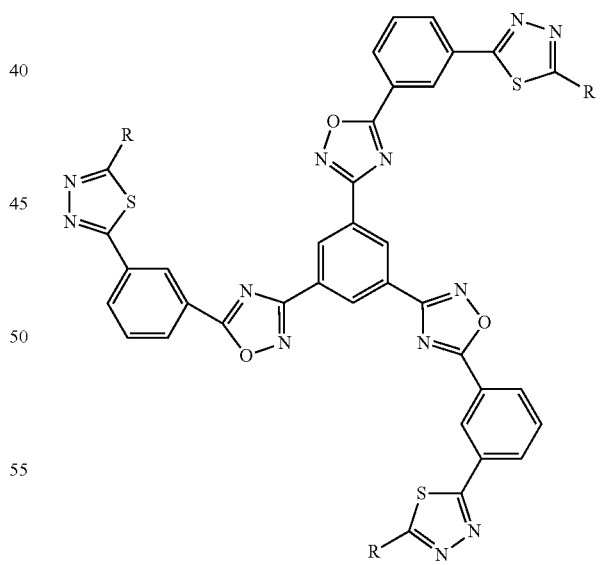
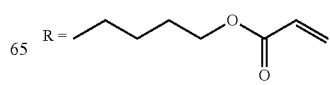

49
-continued
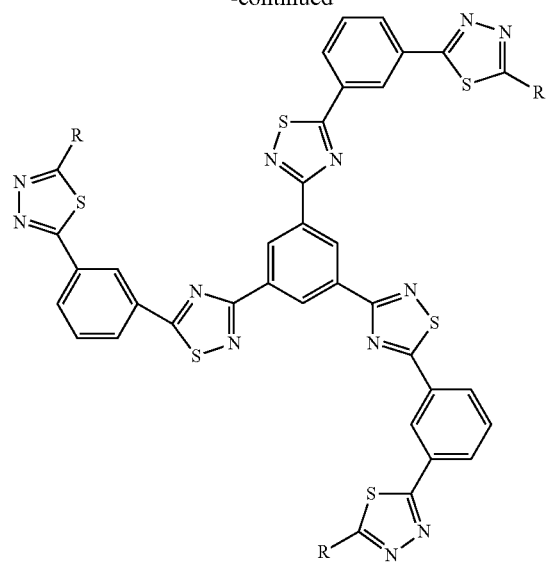
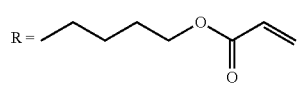
50
-continued
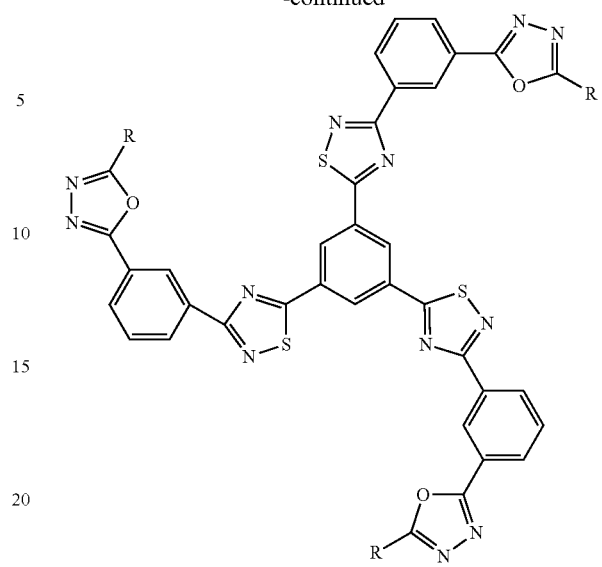
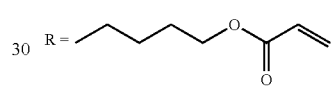
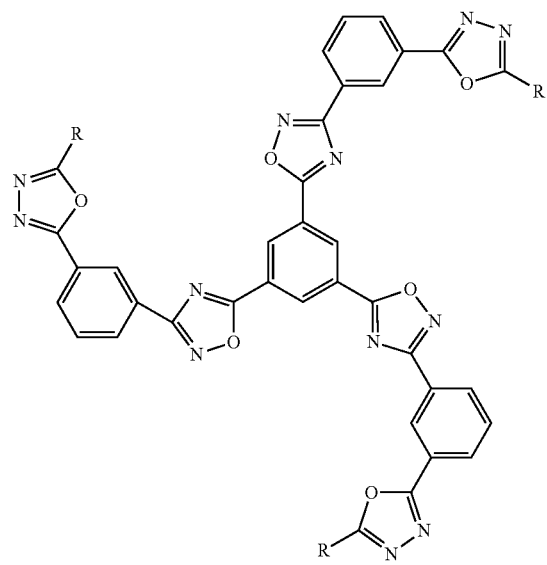
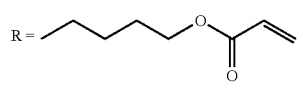
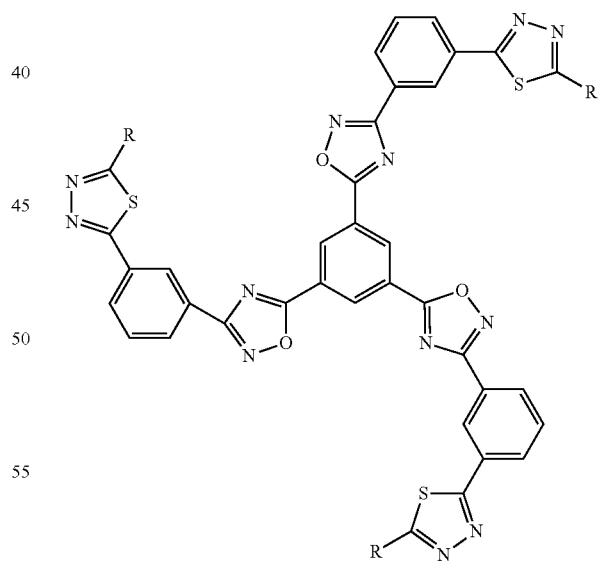
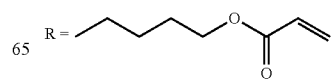

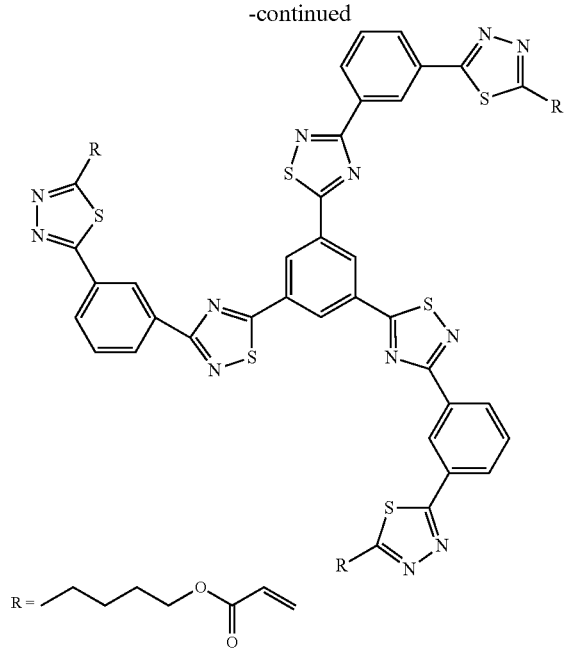

Examples of a discotic liquid crystalline compound which is a triphenylene compound and has small wavelength, dispersibility include compounds described in the paragraphs [0062] to [0067] of the official gazette of Japanese Patent Application Laid-Open No. 2007-108732, but the present invention is not limited thereto.

[Rod-Like Liquid Crystalline Compound]

In the present invention, a rod-like liquid crystalline compound may be used for forming the optically anisotropic layer that the optical film has. As the rod-like liquid crystalline compound, azomethines, azoxys, cyanobiphenyls, cyanophenyl esters, benzoic acid, esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles are preferably used. Polymer liquid crystalline compounds as well as the above-described low molecular liquid crystalline compounds may be used. It is more preferred that the alignment of the rod-like liquid crystalline compound is fixed by polymerization. As the liquid crystalline compound, compounds having a partial structure capable of causing a polymerization or crosslinking reaction by activated light rays, electronic rays, heat and the like are suitably used. The number of the partial structures is preferably 1 to 6, and more preferably 1 to 3. As a polymerizable rod-like liquid crystalline compound, it is possible to use compounds described in Makromol Chem., vol. 190, 2255 page (1989), Advanced Materials vol. 5, 107 page (1993), the specifications, of U.S. Pat. Nos. 4,683,327, 5,622,648 and 5,770,107, the official gazettes of international Publication Nos. WO95/22586, 95/24455, 97/00600, 98/23580 and 98/52905, the official gazettes of Japanese Patent Application Laid-Open Nos. H1-272551, H6-16616, H7-110469 and H11-80081, the official gazette of Japanese Patent Application Laid-Open No. 2001-328973 and the like.

A preferred range of the content of the liquid crystalline compound in the composition for forming the optically anisotropic layer is preferably 50% by mass or more, more preferably 60% by mass to 99.8% by mass, and still more preferably 70% by mass to 99.5% by mass, based on the total solid content of the composition (in the case of a coating solution, based on the composition except for a solvent).

[Vertical Alignment Accelerator]

When the optically anisotropic layer is formed, in order to uniformly and vertically align the molecules of the liquid crystalline compound, an alignment controlling agent capable of vertically aligning and controlling the liquid crystalline compound on the alignment film interface side and the air interface side is preferably used. For this purpose, an optically anisotropic layer is preferably formed by using a composition containing, together with a liquid crystalline compound, a compound which acts on an alignment film to vertically align a liquid crystalline compound by the excluded volume effect, electrostatic effect or surface energy effect. Further, as for the alignment control on the air interface side, an optically anisotropic layer is preferably formed by using a composition containing, together with a liquid crystalline compound, a compound which is unevenly distributed to the air interface during alignment of the liquid crystalline compound and acts to vertically align the liquid crystalline compound by the excluded volume effect, electrostatic effect or surface energy effect. As a compound (alignment film interface side vertically aligning agent) which accelerates the vertical alignment of the molecules of the liquid crystalline compound on the alignment film interface side, a pyridinium derivative is suitably used. As a compound (air interface side vertically aligning agent) which accelerates the vertical alignment of the molecules of the liquid crystalline compound on the air interface side, a compound containing a fluoroaliphatic group and one or more hydrophilic groups selected from the group consisting of a carboxyl group (—COOH), a sulfo group (—SO$_3$H), a phosphonoxy group {—OP(=O)(OH)$_2$} and salts thereof, which accelerate the compound to be unevenly distributed to the air interface side, is suitably used. In addition, by blending these compounds, for example, when the liquid crystalline composition is prepared as a coating solution, the coatability of the coating solution is improved and thus, unevenness or cissing is suppressed from being generated.

Hereinafter, the vertically aligning agent will be described in detail.

[Alignment Film Interface Side Vertically Aligning Agent]

As an alignment film, interface side vertically aligning agent which may be used in the present invention, a pyridinium derivative (pyridinium salt) represented by the following Formula (II) is suitably used. Molecules of a discotic liquid crystalline compound may be aligned substantially vertically in the vicinity of an alignment film by adding at least one of the pyridinium derivatives to the liquid crystalline compound.

Formula (II)

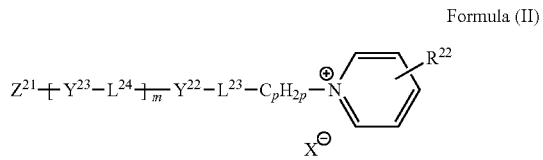

In the formula, each of $L^{23}$ and $L^{24}$ represents a divalent linking group.

$L^{23}$ is preferably a single bond, —O—, —O—CO—, —CO—O—, —C≡C—, —Ch=CH—, —CH—N—, —N=CH—, —N=N—, —O-AL-O—, —O-AL-O—CO—, —O-AL-CO—O—, —CO—O-AL-O—, —CO—O-AL-O—CO—, —CO—O-AL-CO—O—, —O—CO-AL- —O—, —O—CO-AL-O—CO— or —O—CO-AL-CO—O—, and AL is an alkylene group having 1 to 10 carbon atoms, $L^{23}$ is preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO— or —O—CO-AL-CO—O—, more preferably a single bond or —O— and most preferably —O—.

$L^{24}$ is preferably a single bond, —O—, —O—CO—, —CO—O—, —CH═CH—, —CH═Ch—, —CH═N—, —N═CH— or —N═N—, and more preferably —O—CO— or —CO—O—. When m is 2 or more, it is more preferred that a plurality of $L^{24}$'s are alternately —O—CO— and —CO—O—.

$R^{22}$ is a hydrogen atom, an unsubstituted amino group or a substituted amino group having 1 to 25 carbon atoms.

When $R^{22}$ is a dialkyl substituted amino group, two alkyl groups may be bonded with each other to form a nitrogen-containing heterocyclic ring. A nitrogen-containing heterocyclic ring formed at this time is preferably a 5- or 6-membered ring. $R^{22}$ is more preferably a hydrogen atom, an unsubstituted amino group or a dialkyl substituted amino group having 2 to 12 carbon atoms, and still more preferably a hydrogen atom, an unsubstituted amino group or a dialkyl substituted amino group having 2 to 8 carbon atoms. When $R^{22}$ an unsubstituted amino group and a substituted amino group, the 4-position of the pyridinium ring is preferably substituted.

X is an anion.

X is preferably a monovalent anion. Examples of the anion include a halide anion (for example, a fluoride ion, a chloride ion, a bromide ion, an iodide ion and the like), a sulfonate ion (for example, a methanesulfonate ion, a trifluoromethanesulfonate ion, a methylsulfate ion, a p-toluenesulfonate ion, a p-chlorobenzenesulfonate ion, a 1,3-benzenedisulfonate ion, a 1,5-naphthalenedisufonate ion, 2,6-napthalenedisulfonate ion and the like), a sulfate ion, a carbonate ion, a nitrate ion, a thiocyanate ion, a perchlorate ion, a tetrafluoroborate ion, a picrate ion, an acetate ion, a formate ion, a trifluoroacetate ion, a phosphate ion (for example, a hexafluorophosphate ion), a hydroxide ion and the like. X is preferably a halide anion, a sulfonate ion and a hydroxide ion.

Each of $Y^{22}$ and $Y^{23}$ is a divalent linking group having a 5- or 6-membered ring as a partial structure.

The 5- or 6-membered ring may have a substituent. At least one of $Y^{22}$ and $Y^{23}$ is preferably a divalent linking group having a 5- or 6-membered ring having a substituent as a partial structure. It is preferred that each of $Y^{22}$ and $Y^{23}$ is independently a divalent linking group having a 6-membered ring which may have a substituent as a partial structure. The 6-membered ring includes an aliphatic ring, an aromatic ring (benzene ring) and a heterocyclic ring. Examples of the 6-membered aliphatic ring include a cyclohexane ring, a cyclohexene ring and a cyclohexadiene ring. Examples of the 6-membered heterocyclic ring include a pyran ring, a dioxane ring, a dithiane ring, a thin ring, a pyridine ring, a piperidine ring, an oxaxine ring, a morpholine ring, a thiazine ring, a pyridazine ring, a pyrimidine ring, a pyrazine ring, a piperazine ring and a triazine ring. The 6-membered ring may be condensed with another 6- or 5-membered ring.

Examples of the substituent include a halogen atom, cyano group, an alkyl group having 1 to 12 carbon atoms and an alkoxy group having 1 to 12 carbon atoms. The alkyl group and the alkoxy group may be substituted with an acyl group having 2 to 12 carbon atoms or an acyloxy group having 2 to 12 carbon atoms. The substituent is preferably an alkyl group having 1 to 12 (more preferably 1 to 6, and still more preferably 1 to 3) carbon atoms. Two or more substituents may be included, and for example, when $Y^{22}$ and $Y^{23}$ are a phenylene group, $Y^{22}$ and $Y^{23}$ may be substituted with 1 to 4 alkyl groups having 1 to 12 (more preferably 1 to 6, and still more preferably 1 to 3) carbon atoms.

Furthermore, m is 1 or 2, and preferably 2. When m is 2, each of $Y^{23}$ and $L^{24}$ may be the same as or different from every other of $Y^{23}$ and $L^{24}$.

$Z^{21}$ is a monovalent group selected from the group consisting of a halogen-substituted phenyl, a nitro-substituted phenyl, a cyano-substituted phenyl, a phenyl substituted with an alkyl group having 1 to 25 carbon atoms, a phenyl substituted with an alkoxy group having 1 to 25 carbon atoms, an alkyl group having 1 to 25 carbon atoms, an alkynyl group having 2 to 25 carbon atoms, an alkoxy group having 1 to 25 carbon atoms, an alkoxycarbonyl group having 1 to 25 carbon atoms, an aryloxycarbonyl group having 7 to 26 carbon atoms and an arylcarbonyl group having 7 to 26 carbon atoms.

When m is 2, $Z^{21}$ is preferably cyano, an alkyl group having 1 to 25 carbon atoms, or an alkoxy group having 1 to 25 carbon atoms, and more preferably an alkoxy group having 4 to 20 carbon atoms.

When m is 1, $Z^{21}$ is preferably an alkyl group having 7 to 25 carbon atoms, an alkoxy group having 7 to 25 carbon atoms, an acyl-substituted alkyl group having 7 to 25 carbon atoms, an acyl-substituted alkoxy group having 7 to 25 carbon atoms, an acyloxy-substituted alkyl group having 7 to 12 carbon atoms, or an acyloxy-substituted alkoxy group having 7 to 25 carbon atoms.

The acyl group is represented by —CO—R, the acyloxy group is represented by —O—CO—R, and R is an aliphatic group (an alkyl group, a substituted alkyl group, an alkenyl group, a substituted alkenyl group, an alkynyl group or a substituted alkynyl group), or an aromatic group (an aryl group or a substituted aryl group). R is preferably an aliphatic group, and more preferably an alkyl group or an alkenyl group.

p is an integer of 1 to 10. p is particularly preferably 1 or 2. $C_pH_{2p}$ means a chained alkylene group which may have a branched structure. $C_pH_{2p}$ is preferably a straight-chained alkylene group (—$(CH_2)_p$—).

Among the compounds represented by the above-mentioned Formula (II), a compound represented by the following (II') is preferred.

Formula (II')

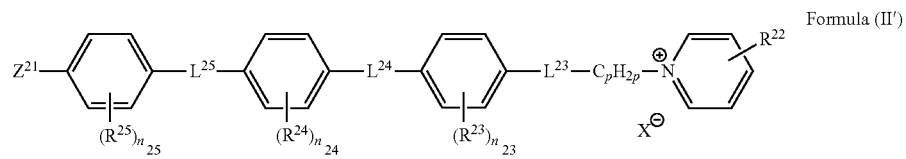

In Formula (II'), the same symbols as in Formula (II) have the same meaning, and the preferred ranges thereof are also the same. $L^{25}$ has the same meaning as $L^{24}$, and the preferred ranges thereof are also the same. $L^{24}$ and $L^{25}$ are preferably —O—CO— or —CO—O—, and it is preferred that $L^{24}$ is —O—CO— and $L^{25}$ is —CO—O—.

Each of $R^{23}$, $R^{24}$ and $R^{25}$ is an alkyl group having 1 to 12 (more preferably 1 to 6, and still more preferably 1 to 3) carbon atoms, $n_{23}$ represents 0 to 4, $n_{24}$ represents 1 to 4, and $n_{25}$ represents 0 to 4. It is preferred that $n_{23}$ and $n_{25}$ are 0, and $n_{34}$ is 1 to 4 (more preferably 1 to 3).

Specific examples of the compound represented by Formula (II) include the compounds as described in [0058] to [0061] of the specification of the official gazette of Japanese Patent Application Laid-Open No. 2006-113500.

Besides, specific examples of the compound represented by Formula (II) include the following compounds. However, in the following formula, an anion (X") is omitted.

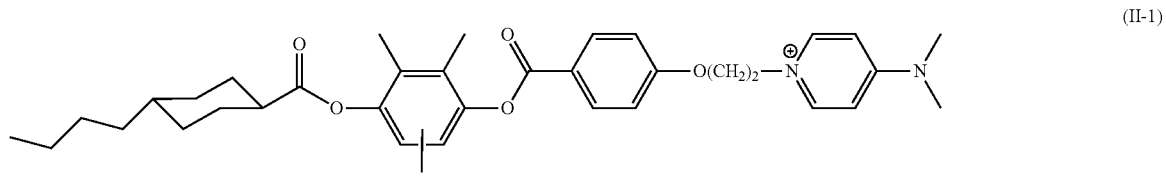
(II-1)

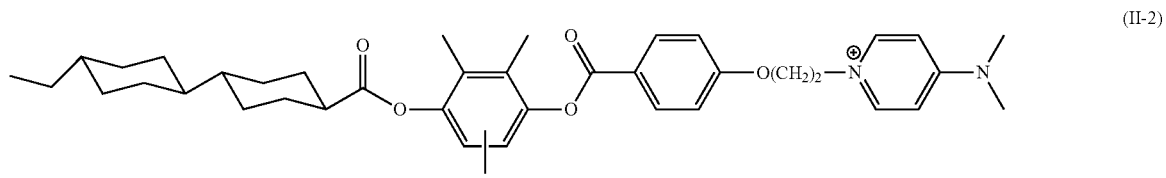
(II-2)

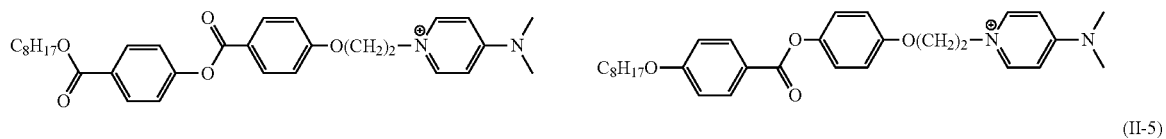
(II-3) (II-4)

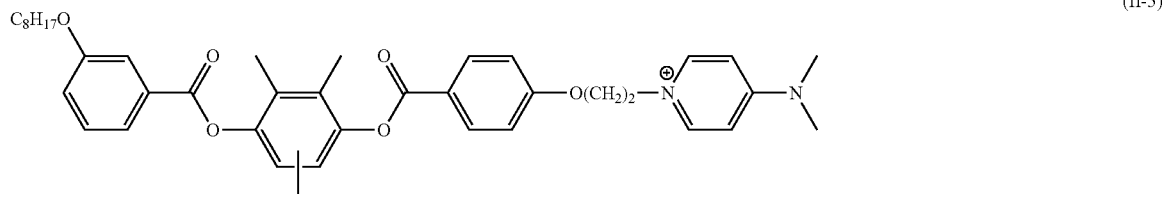
(II-5)

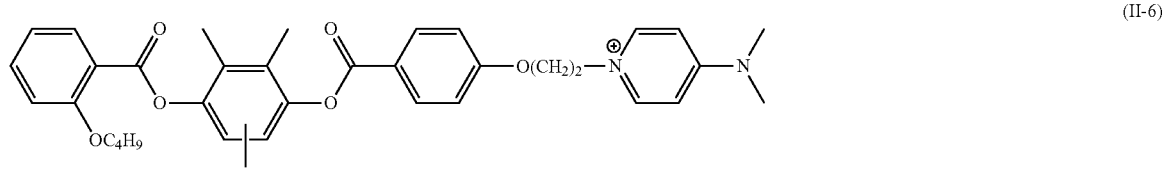
(II-6)

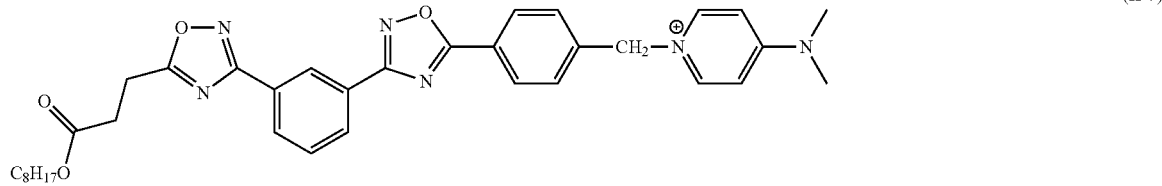
(II-7)

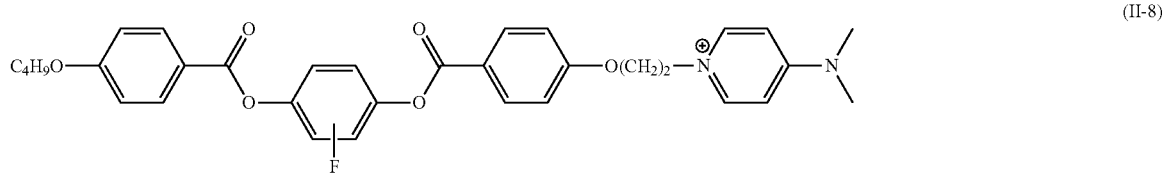
(II-8)

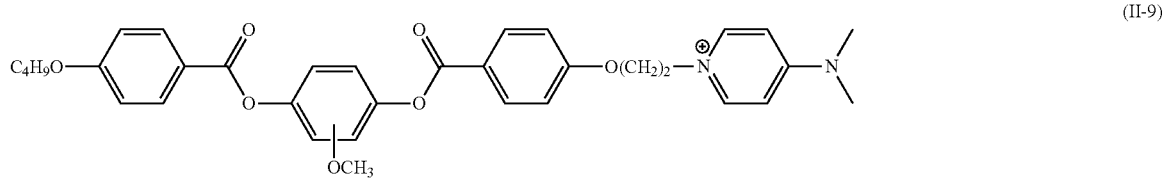
(II-9)

Hereinafter, specific examples of the compound represented by Formula (II') will be shown. However, in the following formula, an anion (X″) is omitted.
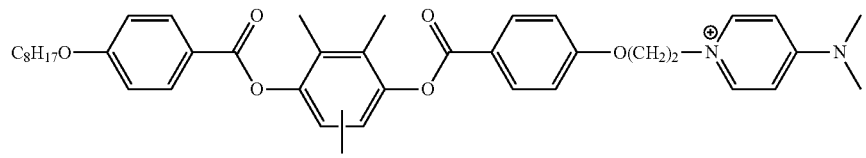
(II-10)
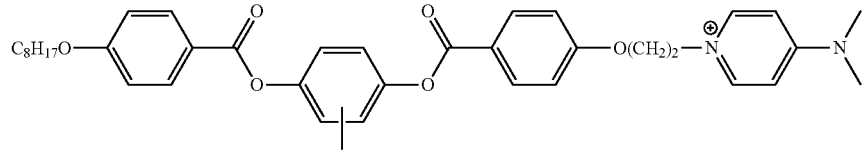
(II-11)
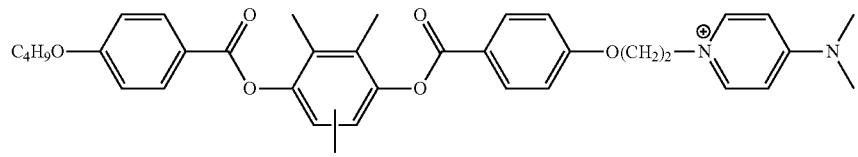
(II-12)
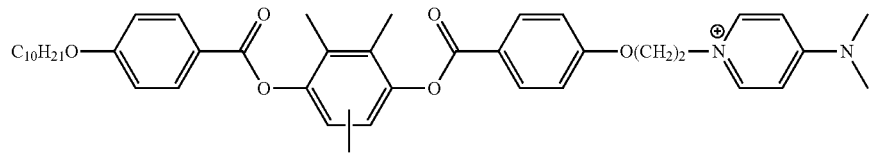
(II-13)
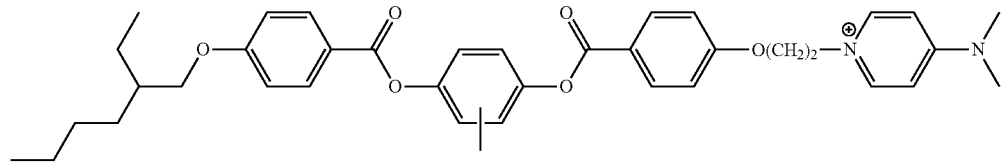
(II-14)
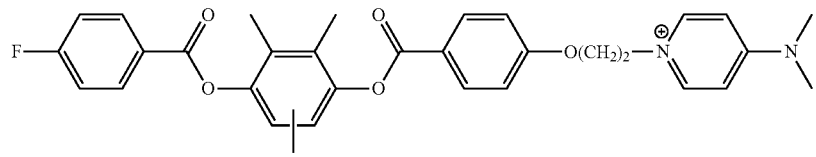
(II-15)
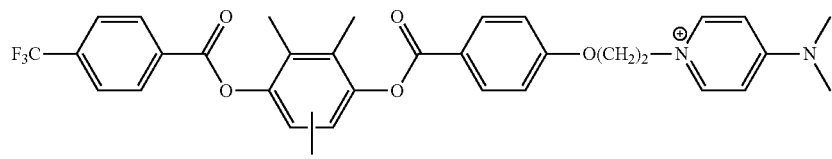
(II-16)
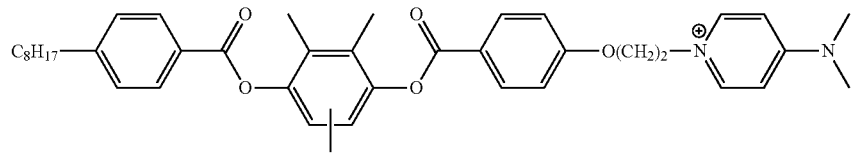
(II-17)
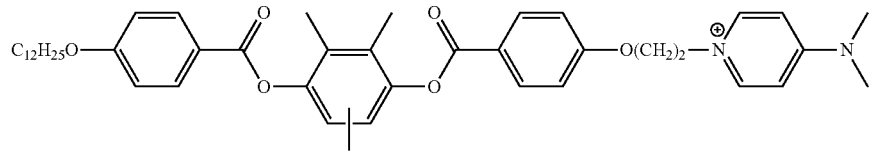
(II-18)

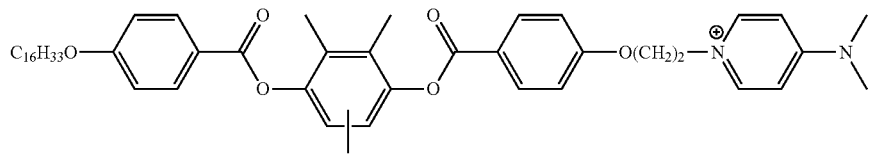
(II-19)
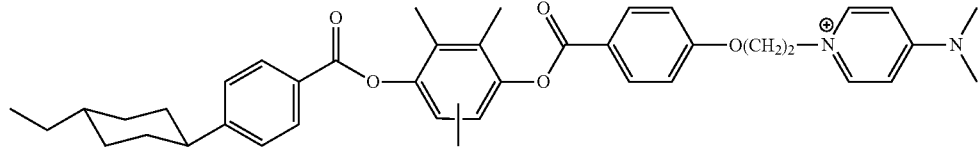
(II-20)
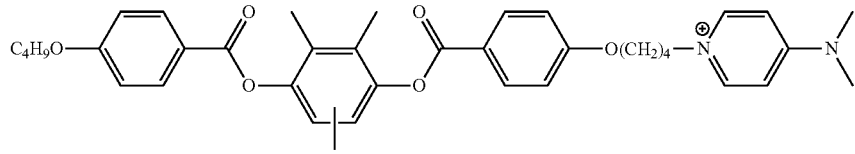
(II-21)
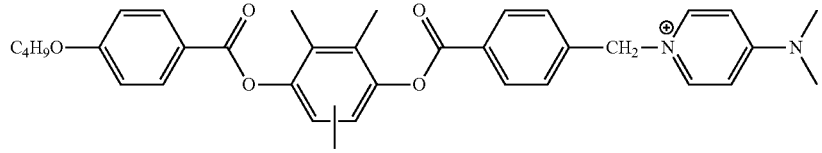
(II-22)
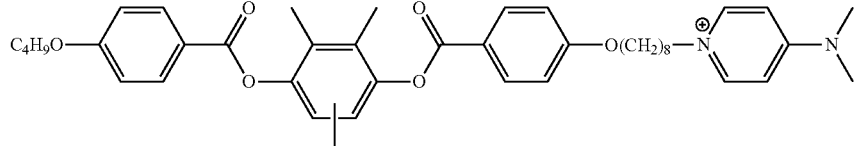
(II-23)
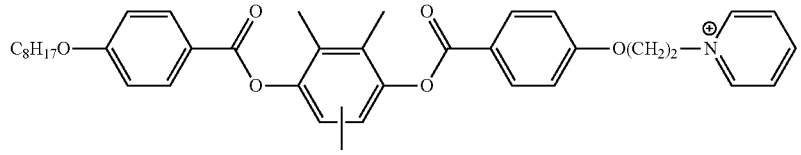
(II-24)
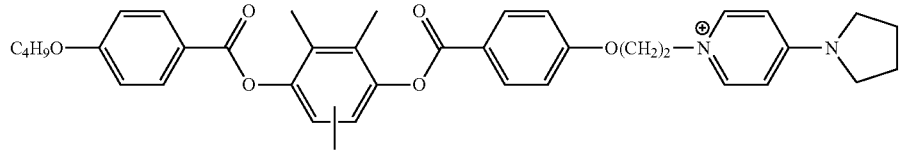
(II-25)
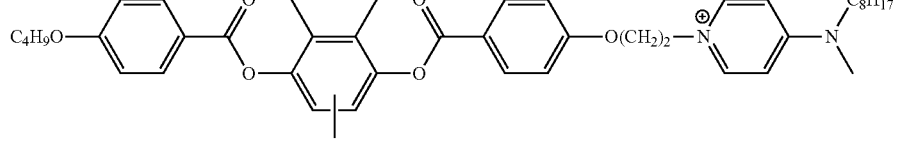
(II-26)
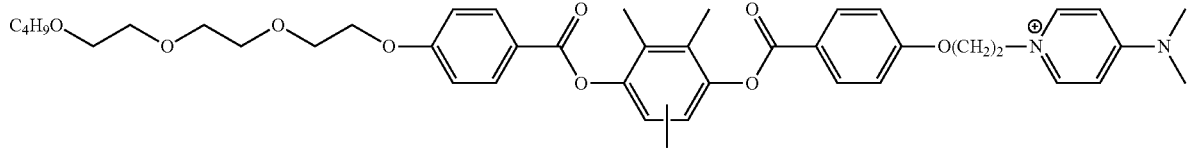
(II-27)

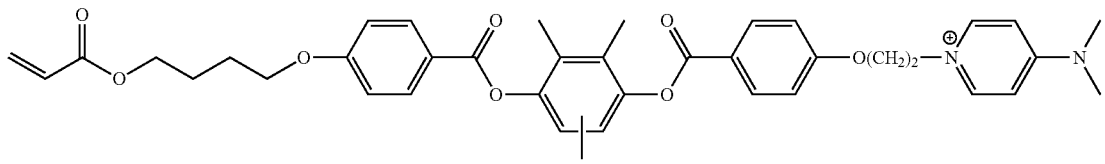
(II-28)

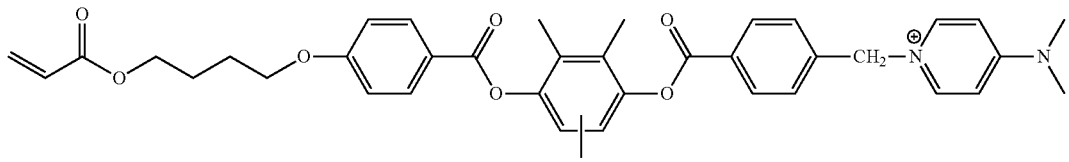
(II-29)

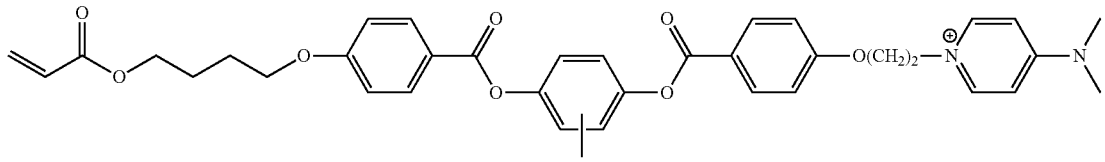
(II-30)

The pyridinium derivative of Formula (II) is generally obtained by subjecting a pyridine ring to alkylation (Menschutkin reaction).

A preferred range of the content of the pyridinium derivative in the composition for forming an optically anisotropic layer varies depending on the use thereof, but is preferably 0.005% by mass to 8% by mass, and more preferably 0.01% by mass to 5% by mass, based on the composition (liquid crystalline composition except for a solvent when the composition is prepared as a coating solution).

[Air Interface Side Vertically Aligning Agent]

As the air interface side vertically aligning agent in the present invention, a fluorine-containing compound represented by the following fluorine-based polymer (IIA) or Formula (III) is suitably used.

The fluorine-based polymer is a copolymer including a repeating unit derived from a fluoro-aliphatic group-containing monomer and a repeating unit represented by the following Formula (IIA).

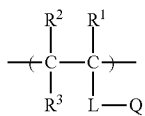

Formula (IIA)

In Formula (IIA), each of $R^1$, $R^2$ and $R^3$ independently represents a hydrogen atom or a substituent. Q represents a carboxylic group (—COOH) or a salt thereof, a sulfo group (—SO$_3$H) or a salt thereof; or a phosphonoxy group {—OP(—O)(OH)$_2$} or a salt thereof. L represents any group selected from the following group of linking groups or a divalent linking group formed by combining two or more thereof.

(Group of Linking Groups)

A single bond, —O—, —CO—, —NR$^b$— (R$^b$ represents a hydrogen, atom, an alkyl group, an aryl group or an aralkyl group), —S—, —SO$_2$—, —P(=O)(OR$^c$)— R$^c$ represents an alkyl group, an aryl group or an aralkyl group), an alkylene group and an arylene group.

Fluorine-containing compound represented by the following Formula (III).

$$(R^0)_m\text{-}L^0\text{-}(W)_n \qquad (III)$$

In the formula, $R^0$ represents an alkyl group, an alkyl group having a CF$_3$ group at the end, or an alkyl group having a CF$_2$H group at the end, and m represents an integer of 1 or more. Each $R^0$ may be the same as or different from every other $R^0$, but at least one thereof represents an alkyl group having a CF$_3$ group or a CF$_2$H group at the end. $L^0$ represents a (m+n)-valent linking group, W represents a carboxylic group (—COOH) or a salt thereof, a sulfo group (—SO$_3$H) or a salt thereof or a phosphonoxy group {—OP(=O)(OH)$_2$} or a salt thereof, and n represents an integer of 1 or more.

First, the fluorine-based polymer will be described.

The fluorine-based polymer that may be used in the present invention is characterized in that the polymer contains a fluoro-aliphatic group and one or more hydrophilic groups selected from the group consisting of a carboxyl group (—COOH), a sulfo group (—SO$_3$H), a phosphonoxy group {—OP(=O)(OH)$_2$} and salts thereof. As for kinds of the polymers, there is a description, on pages 1 to 4 in "Revised Chemistry of Polymer Synthesis" written by Takayuki Otsu and published by Kagaku-Dojin Publishing Company, Inc., 1968, and examples of the polymers include polyolefins, polyesters, polyamides, polyimides, polyurethanes, polycarbonates, polysulfones, polyethers, polyacetals, polyketones, polyphenylene oxides, polyphenylene sulfides, polyarylates, PTFEs, polyvinylidene fluorides, cellulose derivatives, and the like. The fluorine-based polymer is preferably polyolefins.

The fluorine-based polymer is a polymer having a fluoro-aliphatic group in the side chain thereof. The fluoro-aliphatic group has preferably 1 to 12 carbon atoms, and more preferably 6 to 10 carbon atoms. The aliphatic group may be chained or cyclic, and when the aliphatic group is chained, the aliphatic group may be straight-chained or branch-chained. Among them, a straight-chained fluoro-aliphatic group having 6 to 10 carbon atoms is preferred. The degree of substitution by a fluorine atom is not particularly limited, but 50% or more of the hydrogen atoms in the aliphatic group are preferably substituted by a fluorine atom, and 60% or more are more preferably substituted. The fluoro-aliphatic group is contained in the side chain bonded with the main chain of a polymer through an ester bond, an amide bond, an imide bond, a urethane bond, a urea bond, an ether bond, a thioether bond, an aromatic ring and the like. One of the fluoro-aliphatic groups is derived from a fluoro-aliphatic compound prepared by the telomerization method (also referred to as a telomer method) or the oligomerization method (also referred to as an oligomer method). The preparation method of the fluoro-aliphatic compounds is described, for example, on pages 117 to 118 of "Synthesis and Function of Fluorine Compounds" (compiled by Nobuo Ishikawa, published by CMC Publishing Co., Ltd., 1987), or on pages 747 to 752 of "Chemistry of Organic Fluorine Compounds II" (Monograph 187, Ed by Milos Hudlicky and Attila E. Pavlath, American Chemical Society, 1995). The telomerization method is a method in which an alkyl halide having a large chain transfer constant such as an iodide and the like is used as a telogen to perform radical polymerization of a fluorine-containing vinyl compound such as tetrafluoroethylene and the like, thereby synthesizing a telomer (exemplified in Scheme-1).

Scheme1

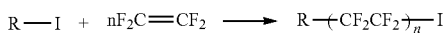

The obtained iodine-terminated telomer is usually subjected to appropriate terminal chemical modification, for example, as in [Scheme 2] and thus derived to fluoro-aliphatic compounds. These compounds are further converted, if necessary, into desired monomer structures, which are then used in the preparation of a fluoro-aliphatic group-containing polymer.

Scheme2

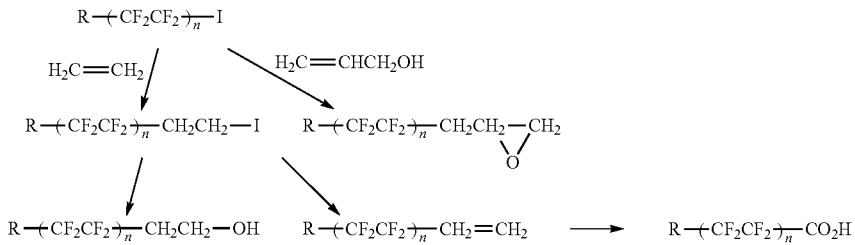

Specific examples of a monomer may be used in the preparation of the fluorine-based polymer usable in the present invention include the compounds described in Paragraph Nos. [0075] to [0081] of the official gazette of Japanese Patent Application Laid-Open No. 2006-113500, and the like, but the present invention is not limited to these specific examples in any way.

In Formula (IIA), each of $R^1$, $R^2$ and $R^3$ independently represents a hydrogen atom or a substituent selected from the group of substituents exemplified below.

(Group of Substituents)

Examples of the group of substituents include an alkyl group (an alkyl group having preferably 1 to 20 carbon atoms, more preferably 1 to 12 carbon atoms, and particularly preferably 1 to 8 carbon atoms, and examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group and the like), an alkenyl group (an alkenyl group having preferably 2 to 20 carbon atoms, more preferably 2 to 12 carbon atoms, and particularly preferably 2 to 8 carbon atoms, and examples thereof include a vinyl group, an aryl group, a 2-butenyl group, a 3-pentenyl group and the like), an alkynyl group (an alkynyl group having preferably 2 to 20 carbon atoms, more preferably 2 to 12 carbon atoms, and particularly preferably 2 to 8 carbon atoms, and examples thereof include a propargyl group, a 3-pentynyl group and the like), an aryl group (an aryl group having preferably 6 to 30 carbon atoms, more preferably 6 to 20 carbon atoms, and particularly preferably 6 to 12 carbon atoms, and examples thereof include a phenyl group, a p-methylphenyl group, a naphthyl group and the like), an aralkyl group (an aralkyl group having preferably 7 to 30 carbon atoms, more preferably 7 to 20 carbon atoms, and particularly preferably 7 to 12 carbon atoms, and examples thereof include a benzyl group, a phenethyl group, a 3-phenylpropyl group and the like), a substituted or unsubstituted amino group (an amino group having preferably 0 to 20 carbon atoms, more preferably 0 to 10 carbon atoms, and particularly preferably 0 to 6 carbon atoms, and examples thereof include an unsubstituted amino group, a methylamino group, a dimethylamino group, a diethylamino group, an anilino group and the like), an alkoxy group (an alkoxy group having preferably 1 to 20 carbon atoms, more preferably 1 to 16 carbon atoms, and particularly preferably 1 to 10 carbon atoms, and examples thereof include a methoxy group, an ethoxy group, a butoxy group and the like), an alkoxycarbonyl group (an alkoxycarbonyl group having preferably 2 to 20 carbon atoms, more preferably 2 to 16 carbon atoms, and particularly preferably 2 to 10 carbon atoms, and examples thereof include a methoxycarbonyl group, an ethoxycarbonyl group and the like), an acyloxy group (an acyloxy group having preferably 2 to 20 carbon atoms, more preferably 2 to 16 carbon atoms, and particularly preferably 2 to 10 carbon atoms, and examples thereof include an acetoxy group, a benzoyloxy group and the like), an acylamino group (an acylamino group having preferably 2 to 20 carbon atoms, more preferably 2 to 10 carbon atoms, and particularly preferably 2 to 10 carbon atoms, and examples thereof include an acetylamino group, a benzoylamino group and the like), an alkoxycarbonylamino group (an alkoxycarbonylamino group having preferably 2 to 20 carbon atoms, more preferably 2 to 16 carbon atoms, and particularly preferably 2 to 12 carbon atoms, and examples thereof include a methoxycarbonylamino group and the like), an axyloxycarbonylamino group (an aryloxycarbonylamino group having preferably 7 to 20 carbon atoms, more preferably 7 to 16 carbon atoms, and particularly preferably 7 to 12 carbon atoms, and examples thereof include a phenyloxycarbonylamino group and the like), a sulfonylamino group (a sulfonylamino group having preferably 1 to 20 carbon atoms, more preferably 1 to 16 carbon atoms, and particularly preferably 1 to 12 carbon atoms, and examples thereof include a methanesulfonylamino group, a benzenesulfonylamino group and the like), a sulfamoyl group (a sulfamoyl group having preferably 0 to 20 carbon atoms, more preferably 0 to 16 carbon atoms, and particularly preferably 0 to 12 carbon atoms, and examples thereof include a sulfamoyl group, a methylsulfamoyl group, a dimethylsulfamoyl group, a phenylsulfamoyl group and the like), a carbamoyl group (a carbamoyl group having preferably 1 to 20 carbon atoms, more preferably 1 to 16 carbon atoms, and particularly preferably 1 to 12 carbon atoms, and examples thereof include an unsubstituted carbamoyl group, a methylcarbamoyl group, a dietbylcarbamoyl group, a phenylcarbamoyl group and the like), and an alkylthio group (an alkylthio group having preferably 1 to 20 carbon atoms, more preferably 1 to 16 carbon atoms, and particularly preferably 1 to 12 carbon atoms, and examples thereof include a methylthio group, an ethylthio group and the like), an arylthio group (an arylthio group having preferably 6 to 20 carbon atoms, more preferably 6 to 16 carbon atoms, and particularly preferably 6 to 12 carbon atoms, and examples thereof include a phenylthio group and the like), a sulfonyl group (a sulfonyl group having preferably 1 to 20 carbon atoms, more preferably 1 to 16 carbon atoms, and particularly preferably 1 to 12 carbon atoms, and examples thereof include a mesyl group, a tosyl group and the like), a sulfinyl group (a sulfinyl group having preferably 1 to 20 carbon atoms, more preferably 1 to 16 carbon atoms, and particularly preferably 1 to 12 carbon atoms, and examples thereof include a methanesulfinyl group, a benzenesulfinyl group and the like), a ureido group (a ureido group having preferably 1 to 20 carbon atoms, more preferably 1 to 16 carbon atoms, and particularly preferably 1 to 12 carbon atoms, and examples thereof include an unsubstituted ureido group, a methylureido group, a phenylureido group, and the like), a phosphoric amide group (a phosphoric amide group having preferably 1 to 20 carbon atoms, more preferably 1 to 16 carbon atoms, and particularly preferably 1 to 12 carbon atoms, and examples thereof include a diethylphosphoric amide group, a phenylphosphoric amide group and the like), a hydroxyl group, a mercapto group, a halogen atom (for example, a fluorine atom, a chlorine atom, a bromine atom and an iodine atom), a cyano group, a sulfo group, a carboxyl group, a nitro group, a hydroxamic acid group, a sulfino group, a hydrazine group, an imino group, a heterocyclic group (a heterocyclic group having preferably 1 to 30 carbon atoms and more preferably 1 to 12 carbon atoms, for example, a heterocyclic group having a heteroatom such as a nitrogen atom, an oxygen atom, a sulfur atom and the like, and examples thereof include an imidazolyl group, a pyridyl group, a quinolyl group, a furyl group, a piperidyl group, a morpholino group, a benzoxazolyl group, a benzimidazolyl group, a benzthiazolyl group and the like), a silyl group (a silyl group having preferably 3 to 40 carbon atoms, more preferably 3 to 30 carbon atoms, and particularly preferably 3 to 24 carbon atoms, and examples thereof include a trimethylsilyl group, a triphenylsilyl group and the like). These substituents may be further substituted with these substituents. In addition, when two or more substituents are possessed, each substituent may be the same as or different from every other substituent. Furthermore, the substituents may be bonded to each other to form a ring, if possible.

Each of $R^1$, $R^2$ and $R^3$ independently represents preferably a hydrogen atom, an alkyl group, a halogen group (for example, a fluorine atom, a chlorine atom, a bromine atom, an iodine atom and the like), or a group represented by -L-Q as described below, more preferably a hydrogen atom, an alkyl group having 1 to 6 carbon atoms, a chlorine atom, or a group represented by -L-Q, particularly preferably a hydrogen atom or an alkyl group having 1 to 4 carbon atoms, and most preferably a hydrogen, atom or an alkyl group having 1 to 2 carbon atoms. Specific examples of the alkyl group include a methyl group, an ethyl group, an n-propyl group, an n-butyl group, a sec-butyl group and the like. The alkyl group may have a suitable substituent. Examples of the substituent include a halogen atom, an aryl group, a heterocyclic group, au alkoxyl group, an aryloxy group, an alkylthio group, an arylthio group, an acyl group, a hydroxyl group, an acyloxy group, an amino group, an alkoxycarbonyl group, an acylamino group, an oxycarbonyl group, a carbamoyl group, a sulfonyl group, a sulfamoyl group, a sulfonamide group, a sulfonyl group, a carboxyl group and the like. Meanwhile, for the number of carbon atoms in the alkyl group, carbon atoms in the substituents are not included. Hereinafter, the same applies to the number of carbon atoms in other groups.

L represents a divalent linking group selected from the group of linking groups, or a divalent linking group formed by combining two or more thereof. Among the group of the linking groups, $R^b$ of —$NR^b$— represents a hydrogen atom, an alkyl group, an aryl group or an aralkyl group, and preferably a hydrogen atom or an alkyl group. Further $R^c$ of —PO(O$R^c$)— represents an alkyl group, an aryl group or an aralkyl group, and preferably an alkyl group. When $R^b$ and $R^c$ represent an alkyl group, an aryl group or an aralkyl group, the number of carbon atoms is the same as described for the "group of substituents". Examples of L preferably include a single bond, —O—, —CO—, —$NR^b$—, —S—, —SO$_2$—, an alkylene group or an arylene group, and particularly preferably include —CO—, —O—, —$NR^b$—, an alkylene group or an arylene group. When L includes an alkylene group, the number of carbon atoms, in the alkylene group is preferably 1 to 10, more preferably 1 to 8, and particularly preferably 1 to 6. Specific examples of the particularly preferred alkylene group include methylene, ethylene, trimethylene, tetrabutylene, a hexamethylene group and the like. When L includes an arylene group, the number of carbon atoms in the arylene group is preferably 6 to 24, more preferably 6 to 18, and particularly preferably 6 to 12. Specific examples of the particularly preferred arylene group include phenylene, a naphthalene group and the like. When L includes a divalent linking group (that is, an aralkylene group) obtained by combining an alkylene group and an arylene group, the number of carbon atoms in the aralkylene group is preferably 7 to 34, more preferably 7 to 26, and particularly preferably 7 to 16. Specific examples of the particularly preferred aralkylene group include a phenylenemethylene group, a phenyleneethylene group, a methylenephenylene group and the like. The group exemplified as L may have a suitable substituent. Examples of the substituent include those which are the same as previously exemplified as the substituent in $R^1$ to $R^3$. Hereinafter, the specific structures of L include the structures described in Paragraph Nos. [0090] and [0091] of the official gazette of Japanese Patent Application Laid-Open No. 2006-113500, but the present invention is not limited to these specific examples in any way.

In Formula (IIA), Q represents a carboxyl group and a salt thereof (for example, a lithium salt, a sodium salt, a potassium salt, an ammonium salt (for example, ammonium, tetramethylammonium, trimethyl-2-hydroxyethylammonium, tetrabutylammonium, trimethylbenzylammonium, dimethylphenylammonium and the like), a pyridinium salt and the like), a sulfo group and a salt thereof (examples of the cation forming a salt are the same as those described for the carboxyl group), and a phosphonoxy group and a salt thereof (examples of the cation forming a salt are the same as those described for the carboxyl group). Q is more preferably a carboxyl group, a sulfo group, or a phospho group, and particularly preferably a carboxyl group or a sulfo group.

The fluorine-based, polymer may include one of the repeating units represented by Formula (IIA), and may also contain two or more thereof. In addition, the fluorine-based polymer may have one or two or more of other repeating units in addition to each repeating unit. The other repeating unit is not particularly limited, but preferred examples thereof include a repeating unit derived from a typical radically polymerizable monomer. Hereinafter, specific examples of the monomer that derives other repeating units will be mentioned. The fluorine-based polymer may contain a repeating unit derived from one or two or more of monomers selected from the following group of monomers.

Group of Monomers (1) Alkenes

Ethylene, propylene, 1-butene, isobutene, 1-hexene, 1-dodecene, 1-octadecene, 1-eicosene, hexafluoropropene, vinylidene fluoride, chlorotrifluoroethylene, 3,3,3-trifluoropropylene, tetrafluoroethylene, vinyl chloride, vinylidene chloride and the like;

(2) Dienes 1,3-butadiene, isoprene, 1,3-pentadiene, 2-ethyl-1,3-butadiene, 2-n-propyl-1,3-butadiene, 2,3-dimethyl-1,3-butadiene, 2-methyl-1,3-pentadiene, 1-phenyl-1,3-butadiene, 1-α-naphthyl-1,3-butadiene, 1-β-naphthyl-1,3-butadiene, 2-chloro-1,3-butadiene, 1-bromo-1,3-butadiene, 1-chlorobutadiene, 2-fluoro-1,3-butadiene, 2,3-dichloro-1,3-butadiene, 1,1,2-trichloro-1,3-butadiene and 2-cyano-1,3-butadiene, 1,4-divinyl cyclohexane and the like;

(3) Derivatives of α,β-Unsaturated Carboxylic Acid (3a) Alkyl Acrylates

Methyl acrylate, ethyl acrylate, n-propyl acrylate, isopropyl acrylate, n-butyl acrylate, isobutyl acrylate, sec-butyl acrylate, tert-butyl acrylate, amyl acrylate, n-hexyl acrylate, cyclohexyl acrylate, 2-ethylhexyl acrylate, n-octyl acrylate, tert-octyl acrylate, dodecyl acrylate, phenyl acrylate, benzyl acrylate, 2-chloroethyl acrylate, 2-bromoethyl acrylate, 4-chlorobutyl acrylate, 2-cyanoethyl acrylate, 2-acetoxyethyl acrylate, methoxybenzyl acrylate, 2-chlorocyclohexyl acrylate, furfuryl acrylate, tetrahydrofurfuryl acrylate, 2-methoxyethyl acrylate, ω-methoxypolyethylene glycol acrylate (number of added moles of polyoxyethylene: n=2 to 100), 3-methoxybutyl acrylate, 2-ethoxyethyl acrylate, 2-butoxyethyl acrylate, 2-(2-butoxyethoxy)ethyl acrylate, 1-bromo-2-methoxyethyl acrylate, 1,1-dichloro-2-ethoxyethyl acrylate, glycidyl acrylate and the like;

(3b) Alkyl Methacrylates

Methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, n-hexyl methacrylate, cyclohexyl methacrylate, 2-ethylhexyl methacrylate, n-octyl methacrylate, stearyl methacrylate, benzyl methacrylate, phenyl methacrylate, allyl methacrylate, furfuryl methacrylate, tetrahydrofurfuryl methacrylate, cresyl methacrylate, naphthyl methacrylate, 2-methoxyethyl methacrylate, 3-methoxybutyl methacrylate, ω-methoxypolyethylene glycol methacrylate (number of added moles of polyoxyethylene: n=2 to 100), 2-acetoxyethyl methacrylate, 2-ethoxyethyl methacrylate, 2-butoxyethyl methacrylate, 2-(2-butoxyethoxy)ethyl methacrylate, glycidyl methacrylate, 3-trimethoxysilylpropyl methacrylate, allyl methacrylate, 2-isocyanatoethyl methacrylate and the like;

(3c) Diesters of Unsaturated Polyvalent Carboxylic Acid

Dimethyl malate, dibutyl malate, dimethyl itaconate, dibutyl itaconate, dibutyl crotonate, dihexyl crotonate, diethyl fumarate, dimethyl fumarate and the like;

(3d) Amides of α,β-Unsaturated Carboxylic Acid

N,N-dimethylacrylic amide, N,N-diethylacrylic amide, N-n-propylacrylic amide, N-tert-butylacrylic amide, N-tert-octyl methacrylamide, N-cyclohexylacrylic amide, N-phenylacrylic amide, N-(2-acetoacetoxyethyl)acrylic amide, N-benzylacrylic amide, N-acryloylmorpholine, diacetone acrylic amide, N-methylmaleimide and the like;

(4) Unsaturated Nitriles

Acrylonitrile, methacrylonitrile and the like;

(5) Styrenes and Derivatives Thereof

Styrene, vinyltoluene, ethylstyrene, p-tert-butylstyrene, methyl p-vinylbenxoate, α-methylstyrene, p-chloromethyl styrene, vinylnaphthalene, p-methoxystyrene, p-hydroxymethylstyrene, p-acetoxystyrene and the like;

(6) Vinyl Esters

Vinyl acetate, vinyl propionate, vinyl butyrate, vinyl isobutyrate, vinyl benzoate, vinyl salicylate, vinyl chloroacetate, vinyl methoxyacetate, vinyl phenylacetate and the like;

(7) Vinyl Ethers

Methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, n-dodecyl vinyl ether, n-eicosyl vinyl ether, 2-ethylhexyl vinyl ether, cyclohexyl vinyl ether, fluorobutyl vinyl ether, fluorobutoxyethyl vinyl ether and the like; and (8) Other Polymerizable Monomers N-vinylpyrrolidone, methyl vinyl ketone, phenyl vinyl ketone, methoxyethyl vinyl ketone, 2-vinyloxazoline, 2-isopropenyloxazoline and the like.

Among the fluorine-based polymers, the amount of the fluoro-aliphatic group-containing monomer is preferably 5% by mass or more, more preferably 10% by mass or more, and still more preferably 30% by mass or more, based on the total amount of the monomer constituting the polymer. In the fluorine-based polymer, the amount of the repeating unit represented by Formula (IIA) is preferably 0.5% by mass or more, more preferably 1% by mass to 20% by mass, and still more preferably 1% by mass to 10% by mass, based on the total amount of the monomer constituting the fluorine polymer. For the percentage by mass, the value of the preferred range is easily changed according to the molecular weight of the monomer to be used, and thus by presenting the molar number of the functional group per unit mass of a polymer, the content of a repeating unit represented by Formula (IIA) may be accurately determined. When the notation is used, a preferred amount of a hydrophilic group contained in the fluorine-based polymer (Q in Formula (IIA)) is 0.1 mmol/g to 10 mmol/g, and a more preferred, amount is 0.2 mmol/g to 8 mmol/g.

The mass average molecular weight of the fluorine-based polymer that is used in the present invention is preferably 1,000,000 or less, more preferably 500,000 or less, and still more preferably 100,000 or less. The mass average molecular weight may be measured as a value in terms of polystyrene (PS) by using gel permeation chromatography (GPC).

A polymerization method of the fluorine-based polymer is not particularly limited, but for example, a polymerization method such as cationic polymerization or radical polymerization using a vinyl group, anionic polymerization and the like may be adopted, and among them, the radical polymerization is particularly preferred in that the polymerization may be used for all purposes. As a polymerization initiator of the radical polymerization, a known compound such as a radical thermopolymerization initiator, a radical photopolymerization initiator and the like may be used, but a radical thermopolymerization initiator is particularly preferably used. Herein, the radical thermopolymerization initiator is a compound which generates radicals by heating to the decomposition temperature or more. Examples of the radical thermopolymerization initiator include diacyl peroxide (acetyl peroxide, benzoyl peroxide and the like), ketone peroxide (methyl ethyl ketone peroxide, cyclohexanone peroxide and the like), hydroperoxide (hydrogen peroxide, tert-butylhydroxperoxide, cumene hydroperoxide and the like), dialkyl peroxide (di-tert-butyl peroxide, dicumyl peroxide, dilauroyl peroxide, and the like), peroxy esters (tert-butyl peroxyacetate, tert-butyl peroxypivalate and the like), an azo-based compound (azo-bis-isobutyronitrile, azobisisovaleronitrile and the like), and persulfates (ammonium persulfate, sodium persulfate, potassium persulfate and the like). These radical thermopolymerization initiators may be used either alone or in combination of two or more thereof.

The radical polymerization method is not particularly limited, but an emulsion polymerization method, a suspension polymerization method, a mass polymerization method, a solution polymerization method and the like may be adopted. The solution polymerization which is a typical radical polymerization method will be described in more detail. The fundamentals of other polymerization methods are the same, and details thereof are described, for example, in "Experimental Methods for Polymer Synthesis" edited by the Society of Polymer Science, Japan (TOKYO KAGAKU-DOJIN Co., Ltd., 1981) and the like.

An organic solvent is used to perform the solution polymerization. These organic solvents may be arbitrarily selected as long as the solvents do not impair the object and effect of the present invention. The organic solvents are usually an organic compound having a boiling point in a range of 50° C. to 200° C. under atmospheric pressure, and an organic compound which uniformly dissolves each constitutional component is preferred. Preferred examples of the organic solvent include alcohols such as isopropanol, butanol and the like; ethers such as dibutyl ether, ethylene glycol dimethyl ether, tetrahydrofuran, dioxane and the like; ketones such as acetone, methyl ethyl ketone, methyl isobutyl ketone, cyclohexanone and the like; esters such as ethyl acetate, butyl acetate, amyl acetate, γ-butyrolactone and the like; and aromatic hydrocarbons such as benzene, toluene, xylene and the like. Meanwhile, these organic solvents may be used either alone or in combination of two or more thereof. Further, from the viewpoint of solubility of a monomer or a produced polymer, a water-mixed organic solvent may also be applied, in which water is used in combination with the organic solvent.

In addition, the conditions for solution polymerization are not particularly limited, but it is preferred that the system is heated within a temperature range of for example, 50° C. to 200° C. for 10 minutes to 30 hours. Furthermore, in order not to deactivate the generated radicals, it is preferred that inert gas is purged not only during the solution polymerization, but also prior to the solution polymerization initiation. As the inert gas, a nitrogen gas is typically suitably used.

In order to obtain the fluorine-based polymer within a preferred molecular weight range, a radical polymerization method using a chain transfer agent is particularly effective. As the chain transfer agent, it is possible to use any of mercaptans (for example, octylmercaptan, decylmercaptan, dodecylmercaptan, tert-dodecylmercaptan, octadecylmercaptan, thiophenol, p-nonylthiophenol and the like), polyhalogenated alkyl (for example, carbon tetrachloride, chloroform, 1,1,1-trichloroethane, 1,1,1-tribromooctane and the like), and low-active monomers (α-methylstyrene, an α-methylstyrene dimer and the like), but mercaptans having 4 to 16 carbon atoms are preferably used. The amount of the chain transfer agent used is significantly influenced by an activity of the chain transfer agent, a combination of the monomers, polymerization conditions, or the like, and thus is required to be precisely controlled. Usually, based on the total molar number of the monomers used, the amount of the chain transfer agent used is approximately 0.01 mol % to 50 mol %, preferably 0.05 mol % to 30 mol %, and particularly preferably 0.08 mol % to 25 mol %. These chain transfer agents may be allowed to be present, in the system, together with the subjective monomers whose degree of polymerization during the polymerization process needs to be controlled, and the addition method thereof is not particularly critical. The chain transfer agent may be added while being dissolved in a monomer, or may also be added separately from the monomer.

Meanwhile, it is also preferred that the fluorine-based polymer of the present invention has a polymerizable group as a substituent in order to fix the alignment state of the discotic liquid crystalline compound.

Specific examples of a fluoro-aliphatic group-containing copolymer which is preferably used as the fluorine-based polymer in the present invention include the compounds described in Paragraph Nos. [0110] to [0114] of the official gazette of Japanese Patent Application Laid-Open No. 2006-113500, and the like, but the present invention is not limited to these specific examples in any way.

The fluorine-based polymer used in the present invention may be prepared, by a known and practical method. For example, to an organic solvent including the monomer having a fluoro-aliphatic group as previously exemplified, a monomer having a group capable of hydrogen bonding and the like, a radical polymerization initiator for all purposes may be added, and the resulting mixture may be polymerized to prepare the fluorine-based polymer. Further, in cases, other addition polymerizable unsaturated compounds may be further added to prepare the fluorine-based polymer by the above-mentioned method. According to the polymerizability of each monomer, a dropwise polymerization method that performs polymerization while adding monomers and an initiator dropwise into a reactor, or the like is effective for obtaining a polymer with a uniform composition.

A preferred range of the content of the fluorine-based polymer in the composition varies depending on the use thereof, but when the fluorine-based polymer is used for formation of an optically anisotropic layer, the content is preferably 0.005% by mass to 8% by mass, more preferably 0.01% by mass to 5% by mass, and still more preferably 0.05% by mass to 3% by mass, based on the composition (the composition except for a solvent in the case of a coating solution). When the amount of the fluorine-based polymer added is less than 0.005% by mass, the effect thereof is insufficient, and when the amount added is more than 8% by mass, the coating film is not sufficiently dried, or the performance as an optical film (for example, uniformity of retardation, and the like) is influenced negatively.

Subsequently, a fluorine-containing compound represented by Formula (III) will be described.

In Formula (III), $R^0$ functions as a hydrophobic group of a fluorine-containing compound. An alkyl group represented by $R^0$ may be a substituted or unsubstituted alkyl group, may be a straight-chained or branch-chained, and is preferably an alkyl group having 1 to 20 carbon atoms, more preferably an alkyl group having 4 to 16 carbon atoms, and particularly preferably an alkyl group having 6 to 16 carbon atoms. As the substituent any one of the substituents exemplified as the group D of substituents as described below may be applied. An alkyl group having a $CF_3$ group at the end, which is represented by $R^0$, has preferably 1 to 20 carbon atoms, more preferably 4 to 16 carbon atoms, and particularly preferably 4 to 8 carbon atoms. The alkyl group having a $CF_3$ group at the end is an alkyl group having the hydrogen atoms contained in the alkyl group, which are partially substituted or all substituted with fluorine atoms. 50% or more of hydrogen atoms in the alkyl group are preferably substituted with fluorine atoms, 60% or more thereof are more preferably substituted, and 70% or more thereof are particularly preferably substituted. The remaining hydrogen atoms may also be substituted with substituents exemplified as the group D of substituents as described below. An alkyl group having a $CF_2H$ group at the end, which is represented by $R^0$, has preferably 1 to 20 carbon atoms, more preferably 4 to 16 carbon atoms, and particularly preferably 4 to 8 carbon atoms. The alkyl group having a $CF_2H$ group at the end is an alkyl group having the hydrogen atoms contained in the alkyl group, which are partially substituted or all substituted with fluorine atoms. 50% or more of hydrogen atoms in the alkyl group are preferably substituted with fluorine atoms, 60% or more thereof are more preferably substituted, and 70% or more thereof are particularly preferably substituted. The remaining hydrogen atoms may also be substituted with substituents exemplified as the group D of substituents as described below. Examples of the alkyl group having a $CF_3$ group at the end or the alkyl group having a $CF_2H$ group at the end, which is represented by $R^0$, are shown below.

R1: n-$C_8F_{17}$—
R2: n-$C_6F_{13}$—
R3: n-$C_4F_9$—
R4: n-$C_8F_{17}$—$(CH_2)_2$—
R5: n-$C_6F_{13}$—$(CH_2)_2$—
R6: n-$C_4F_9$—$(CH_2)_2$—
R7: H—$(CF_3)_8$—
R8: H—$(CF_2)_8$—
R9: H—$(CF_2)_4$—
R10: H—$(CF_2)_8$—$(CH_2)$—
R11: H—$(CF_2)_6$—$(CH_2)$—
R12: H—$(CF_2)_4$—$(CH_2)$—

In Formula (III), a (m+n)-valent linking group represented by $L^0$ is preferably a linking group formed by combining at least two groups selected from the group consisting of an alkylene group, an alkenylene group, an aromatic group, a heterocyclic group, —CO—, —NR— (in which R is an alkyl group having 1 to 5 carbon atoms or a hydrogen atom), —O—, —S—, —SO— and —$SO_2$—.

In Formula (III), W represents a carboxyl group (—COOH) or a salt thereof, a sulfo group (—$SO_3H$) or a salt thereof, or a phosphonoxy group {—OP(=O)(OH)$_2$} or a salt thereof. The preferred range of W is the same as that of Q in Formula (IIA).

Among the fluorine-containing compounds represented by Formula (III), a compound represented by the following Formula (III)-a or (III)-b is preferred.

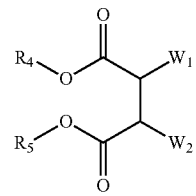

Formula (III)-a

In Formula (III)-a, each of $R_4$ and $R_5$ represents an alkyl group, an alkyl group having a $CF_3$ group at the end, or an alkyl group having a $CF_2H$ group at the end, but $R_4$ and $R_5$ are not an alkyl group at the same time. Each of $W_1$ and $W_2$ represents a hydrogen atom, a carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group, or an alkylamino group having a carboxyl group, a sulfo group, or a phosphonoxy group as a substituent, but $W_1$ and $W_2$ are not a hydrogen atom at the same time.

$(R_6-L_2-)_{m2}(Ar_1)$—$W_3$  Formula (III)-b

In Formula (III)-b, $R_6$ represents an alkyl group, an alkyl group having a $CF_3$ group at the end, or an alkyl group having a $CF_2H$ group at the end, m2 represents an integer of 1 or more, each $R_6$ may be the same as or different from every other but at least one $R_6$ represents an alkyl group having a $CF_3$ group or a $CF_2H$ group at the end, $L_2$ represents a divalent linking group selected from the group consisting of an alkylene group, an aromatic group, —CO—, —NR— (R is an alkyl group having 1 to 5 carbon atoms or a hydrogen atom), —O—, —S—, —SO—, —$SO_2$—, or a combination thereof, and each $L_2$ may be the same as or different from every other $L_2$. $Ar_1$ represents an aromatic hydrocarbon ring or an aromatic heterocyclic ring, and $W_3$ represents a carboxyl group (—COOH) or a salt thereof, a sulfo group (—$SO_3H$) or a salt thereof, a phosphonoxy group {—OP(=O)(OH)$_2$} or a salt thereof, or an alkyl group, an alkoxy group or an alkylamino group having a carboxyl group, a sulfo group, or a phosphonoxy group as a substituent.

First, the Formula (III)-a will be described.

$R_4$ and $R_5$ have the same meaning as $R^0$ in Formula (III), and preferred ranges thereof are also the same. A carboxyl group (—COOH) or a salt thereof, a sulfo group (—$SO_3H$) or a salt thereof a phosphonoxy group {—OP(=O)(OH)$_2$} or a salt thereof represented by $W_1$ and $W_2$ have the same meaning as W in Formula (III), and preferred ranges thereof are also the same. An alkyl group having a carboxyl group, a sulfo group or a phosphonoxy group as a substituent represented by $W_1$ and $W_2$ may be straight-chained, or branch-chained, and is preferably an alkyl group having 1 to 20 carbon atoms, more preferably an alkyl group having 1 to 8 carbon atoms, and particularly preferably an alkyl group having 1 to 3 carbon atoms. The alkyl group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same meaning as the carboxyl group, the sulfo group and the phosphonoxy group represented by W in Formula (III), and preferred ranges thereof are also the same. The alkyl group having a carboxyl group, a sulfo group or a phosphonoxy group as a substituent may be substituted with other substituents, and as the substituent, any one of substituents exemplified as the group D of substituents as described below may be applied. An alkoxy group having a carboxyl group, a sulfo group or a phosphonoxy group as a substituent represented by $W_1$ and $W_2$ may be straight-chained or branch-chained, and is preferably an alkoxy group having 1 to 20 carbon atoms, more preferably an alkoxy group having 1 to 8 carbon atoms, and particularly preferably an alkoxy group having 1 to 4 carbon atoms. The alkoxy group having a carboxyl group, a sulfo group or a phosphonoxy group as a substituent may have at least one of a carboxyl group, a sulfo group or a phosphonoxy group, and the carboxyl group, the sulfo group and the phosphonoxy group have the same meaning as the carboxyl group, the sulfo group and the phosphonoxy group represented by W in Formula (III), and preferred ranges thereof are also the same. The alkoxy group having a carboxyl group, a sulfo group or a phosphonoxy group may be substituted with other substituents, and as the substituent any one of substituents exemplified as the group D of substituents as described below may be applied. Au alkylamino group having a carboxyl group, a sulfo group or a phosphonoxy group as a substituent represented by $W_1$ and $W_2$ may be straight-chained, or branch-chained, and is preferably an alkylamino group having 1 to 20 carbon atoms, more preferably an alkylamino group having 1 to 8 carbon atoms, and particularly preferably an alkylamino group having 1 to 4 carbon atoms. The alkylamino group having a carboxyl group, a sulfo group or a phosphonoxy group may have at least one of a carboxyl group, a sulfo group or a phosphonoxy group, and the carboxyl group, the sulfo group and the phosphonoxy group have the same meaning as the carboxyl group, the sulfo group and the phosphonoxy group represented by W in Formula (III), and preferred ranges thereof are also the same. The alkylamino group having a carboxyl group, a sulfo group or a phosphonoxy group may be substituted with other substituents, and as the substituent, any one of substituents exemplified as the group D of substituents as described below may be applied.

Each of $W_1$ and $W_2$ is particularly preferably a hydrogen atom or $(CH_2)_nSO_3M$ (n represents 0 or 1). M represents a cation, but when the electric charge within the molecule becomes 0, M may not exist. As the cation represented by M, for example, a protonium ion, an alkali metal ion (a lithium ion, a sodium ion, a potassium ion and the like), an alkaline-earth metal ion (a barium ion, a calcium ion and the like), an ammonium ion and the like are preferably applied. Among them, a protonium ion, a lithium ion, a sodium ion, a potassium ion and an ammonium ion are particularly preferred.

Subsequently, Formula (III)-b will be described.

$R_6$ have the same meaning as $R^0$ Formula (III), and preferred ranges thereof are also the same.

$L_2$ preferably represents a linking group (R is a hydrogen atom or a substituent) having 0 to 40 carbon atoms in total, which is composed of an alkylene group having 1 to 12 carbon atoms, an aromatic group having 6 to 12 carbon atoms, —CO—, —NR—, —O—, —S—, —SO—, —SO$_2$—, and a combination thereof, and particularly preferably a linking group having 0 to 20 carbon atoms in total, which is composed of an alkylene group having 1 to 8 carbon atoms, a phenyl group, —CO—, —NR—, —O—, —S—, —SO$_2$—, and a combination thereof. $Ar_1$ preferably represents an aromatic hydrocarbon ring having 6 to 12 carbon atoms, and particularly preferably a benzene ring or a naphthalene ring. A carboxyl group (—COOH) or a salt thereof, a sulfo group (—SO$_3$H) or a salt thereof, a phosphonoxy group {—OP(=O)(OH)$_2$} or a salt thereof, or an alkyl group, an alkoxy group or an alkylamino group having a carboxyl group, a sulfo group or a phosphonoxy group as a substituent, represented by $W_3$, has the same meaning as a carboxyl group (—COOH) or a salt thereof, a sulfo group (—SO$_3$H) or a salt thereof, phosphonoxy {—OP(=O)(OH)$_2$} or a salt thereof, or an alkyl group, an alkoxy group or an alkylamino group having a carboxyl group, a sulfo group or a phosphonoxy group as a substituent, represented by $W_1$ and $W_2$ in Formula (III)-a, and preferred ranges thereof are also the same.

$W_3$ preferably represents a carboxyl group (—COOH) or a salt thereof, a sulfo group (—SO$_3$H) or a sail thereof, or an alkylamino group having a carboxyl group (—COOH) or a salt thereof, or a sulfo group (—SO$_3$H) or a salt thereof as a substituent, and particularly preferably SO$_3$M or CO$_2$M. M represents a cation, but when the electric charge within the molecule becomes 0, M may not exist. As the cation represented by M, for example, a protonium ion, an alkali metal ion (a lithium ion, a sodium ion, a potassium ion and the like), an alkaline-earth metal ion (a barium ion, a calcium ion and the like), an ammonium ion and the like are preferably applied. Among them, a protonium ion, a lithium ion, a sodium ion, a potassium ion and an ammonium ion are particularly preferred.

In the present specification, examples of the group D of substituents include an alkyl group (an alkyl group having preferably 1 to 20 carbon atoms, more preferably 1 to 12 carbon atoms, and particularly preferably 1 to 8 carbon atoms, and examples thereof include a methyl group, an ethyl group, an isopropyl group, a tert-butyl group, an n-octyl group, an n-decyl group, an n-hexadecyl group, a cyclopropyl group, a cyclopentyl group, a cyclohexyl group and the like), an alkenyl group (an alkenyl group having preferably 2 to 20 carbon atoms, more preferably 2 to 12 carbon atoms, and particularly preferably 2 to 8 carbon atoms, and examples thereof include a vinyl group, an allyl group, a 2-butenyl group, a 3-pentenyl group and the like), an alkynyl group (an alkynyl group having preferably 2 to 20 carbon atoms, more preferably 2 to 12 carbon atoms, and particularly preferably 2 to 8 carbon atoms, and examples thereof include a propargyl group, a 3-pentynyl group and the like), an aryl group (an aryl group having preferably 6 to 30 carbon atoms, more preferably 0 to 20 carbon atoms, and particularly preferably 6 to 12 carbon atoms, and examples thereof include a phenyl group, a p-methylphenyl group, a naphthyl group and the like), a substituted or unsubstituted amino group (an amino group having preferably 0 to 20 carbon atoms, more preferably 0 to 10 carbon atoms, and particularly preferably 0 to 6 carbon atoms, and examples thereof include an unsubstituted amino group, a methylamino group, a dimethylamino group, a diethylamino group, a dibenzylamino group and the like), an alkoxy group (an alkoxy group having preferably 1 to 20 carbon atoms, more preferably 1 to 12 carbon atoms, and particularly preferably 1 to 8 carbon atoms, and examples thereof include a methoxy group, an ethoxy group, a butoxy group and the like), an aryloxy group (an aryloxy group having preferably 6 to 20 carbon atoms, more preferably 6 to 16 carbon atoms, and particularly preferably 6 to 12 carbon atoms, and examples thereof include a phenyloxy group, a 2-naphthyloxy group and the like), an acyl group (an acyl group having preferably 1 to 20 carbon atoms, more preferably 1 to 16 carbon atoms, and particularly preferably 1 to 12 carbon atoms, and examples thereof include an acetyl group, a benzoyl group, a formyl group, a pivaloyl group and the like), an alkoxycarbonyl group (an alkoxycarbonyl group having preferably 2 to 20 carbon atoms, more preferably 2 to 16 carbon atoms, and particularly preferably 2 to 12 carbon atoms, and examples thereof include a methoxycarbonyl group, an ethoxycarbonyl group and the like), an aryloxycarbonyl group (an aryloxycarbonyl group having preferably 7 to 20 carbon atoms, more preferably 7 to 16 carbon atoms, and particularly preferably 7 to 10 carbon atoms, and examples thereof include a phenyloxycarbonyl group and the like), acyloxy group (an acyloxy group having preferably 2 to 20 carbon atoms, more preferably 2 to 10 carbon atoms, and particularly preferably 2 to 10 carbon atoms, and examples thereof include an acetoxy group, a benzoyloxy group and the like), an acylamino group (an acylamino group having preferably 2 to 20 carbon atoms, more preferably 2 to 16 carbon atoms, and particularly preferably 2 to 10 carbon atoms, and examples thereof include an acetylamino group, a benzoylamino group and the like), an alkoxycarbonylamino group (an alkoxycarbonylamino group having preferably 2 to 20 carbon atoms, more preferably 2 to 16 carbon atoms, and particularly preferably 2 to 12 carbon atoms, and examples thereof include a methoxycarbonylamino group and the like), an aryloxycarbonylamino group (an aryloxycarbonylamino group having preferably 7 to 20 carbon atoms, more preferably 7 to 16 carbon atoms, and particularly preferably 7 to 12 carbon atoms, and examples thereof include a phenyloxycarbonylamino group and the like), a sulfonylamino group (a sulfonylamino group having preferably 1 to 20 carbon atoms, more preferably 1 to 16 carbon atoms, and particularly preferably 1 to 12 carbon atoms, and examples thereof include a methanesulfonylamino group, a benzenesulfonylamino group and the like), a sulfamoyl group (a sulfamoyl group having preferably 0 to 20 carbon atoms, more preferably 0 to 16 carbon atoms, and particularly preferably 0 to 12 carbon atoms, and examples thereof include a sulfamoyl group, a methylsulfamoyl group, a dimethylsulfamoyl group, a phenyl sulfamoyl group and the like), a carbamoyl, group (a carbamoyl group having preferably 1 to 20 carbon atoms, more preferably 1 to 16 carbon atoms, and particularly preferably 1 to 12 carbon atoms, and examples thereof include an unsubstituted carbamoyl group, a methylcarbamoyl group, a diethylcarbamoyl group, a phenylcarbamoyl group and the like), an alkylthio group (an alkylthio group having preferably 1 to 20 carbon atoms, more preferably 1 to 16 carbon atoms, and particularly preferably 1 to 12 carbon atoms, and examples thereof include a methylthio group, an ethylthio group and the like), an arylthio group (an arylthio group having preferably 6 to 20 carbon atoms, more preferably 6 to 16 carbon atoms, and particularly preferably 6 to 12 carbon atoms, and examples thereof include a phenylthio group and the like), a sulfonyl group (a sulfonyl group having preferably 1 to 20 carbon atoms, more preferably 1 to 16 carbon atoms, and particularly preferably 1 to 12 carbon atoms, and examples thereof include a mesyl group, a tosyl group and the like), a sulfinyl group (a sulfinyl group having preferably 1 to 20 carbon atoms, more preferably 1 to 16 carbon atoms, and particularly preferably 1 to 12 carbon atoms, and examples thereof include a methanesulfinyl group, a benzenesulfinyl group and the like), a ureido group (a ureido group having preferably 1 to 20 carbon atoms, more preferably 1 to 16 carbon atoms, and particularly preferably 1 to 12 carbon atoms, and examples thereof include an unsubstituted ureido group, a methylureido group, a phenylureido group, and the like), a phosphoric amide group (a phosphoric amide group having preferably 1 to 20 carbon atoms, more preferably 1 to 16 carbon atoms, and particularly preferably 1 to 12 carbon atoms, and examples thereof include a diethylphosphoric amide group, a phenylphosphoric amide group and the like), a hydroxyl group, a mercapto group, a halogen atom (for example, a fluorine atom, a chlorine atom, a bromine atom and an iodine atom), a cyano group, a sulfo group, a carboxyl group, a nitro group, a hydroxamic acid group, a sulfino group, a hydrazine group, an imino group, a heterocyclic group (a heterocyclic group having preferably 1 to 30 carbon atoms and more preferably 1 to 12 carbon atoms, for example, a heterocyclic group having a heteroatom such as a nitrogen atom, an oxygen atom, a sulfur atom and the like, and examples thereof include an imidazolyl group, a pyridyl group, a quinolyl group, a furyl group, a piperidyl group, a morpholino group, a benzoxazolyl group, a benzimidazolyl group, a benzthiazolyl group and the like), and a silyl group (a silyl group having preferably 3 to 40 carbon atoms, more preferably 3 to 30 carbon atoms, and particularly preferably 3 to 24 carbon atoms, and examples thereof include a trimethylsilyl group, a triphenylsilyl group and the like). These substituents may be further substituted with these substituents. In addition, when two or more substituents are possessed, each substituent may be the same as or different from every other substituent. Furthermore, the substituents may be bonded to each other to form a ring, if possible.

Meanwhile, it is also preferred that the fluorine-containing compound of the present invention has a polymerizable group as a substituent in order to fix the alignment state of the discotic liquid crystalline compound.

Specific examples of the fluorine-containing compound represented by Formula (III), which may be used in the present invention, include the compounds described in Paragraph Nos. [0136] to [0140] of the official gazette of Japanese Patent Application Laid-Open No. 2006-113500, and the like, but the present invention is not limited to these specific examples in any way.

A preferred range of the content of the fluorine-containing compound in the composition varies depending on the use thereof, but when the fluorine-containing compound is used for formation of an optically anisotropic layer, the content is preferably 0.005% by mass to 8% by mass, more preferably 0.01% by mass to 5% by mass, and still more preferably 0.05% by mass to 3% by mass, based on the composition (the composition except for a solvent in the case of a coating solution).

[Polymerizable Initiator]

An aligned (preferably vertically aligned) liquid crystalline compound is fixed while maintaining the alignment state. Fixation is preferably performed by a polymerizing reaction of a polymerizable group (P) which is introduced to the liquid crystalline compound. Examples of the polymerization reaction include a thermopolymerization reaction using a thermopolymerization initiator and a photo-polymerization reaction using a photopolymerization initiator. A photopolymerization reaction is preferred. Examples of the photopolymerization initiator include α-carbonyl compounds (described in the specifications of U.S. Pat. Nos. 2,367,661 and 2,367,676), acyloin ethers (described in the specification of U.S. Pat. No. 2,448,828), α-hydrocarbon substituted aromatic acyloin compounds (described in the specification of U.S. Pat. No. 2,722,512), polynuclear quinone compounds (described in the specifications of U.S. Pat. Nos. 3,046,127 and 2,951,758), a combination of triarylimidazole dimer and p-aminophenyl ketone (described in the specification, of U.S. Pat. No. 3,549,367), acridine and phenazine compounds (described in the specifications of Japanese Patent Application Laid-Open No. Sho 60-105667 and U.S. Pat. No. 4,239,850), and oxadiazole compounds (described in the specification of U.S. Pat. No. 4,212,970).

The amount of the photopolymerization initiator used is preferably 0.01 mass % to 20 mass % and more preferably 0.5 mass % to 5 mass %, based on the solid content in a coating solution. For the light irradiation for polymerization of a discotic liquid crystalline molecule, ultraviolet rays are preferably used. The irradiation energy is preferably 20 mJ/cm$^2$ to 50 J/cm$^2$, and more preferably 100 mJ/cm$^2$ to 800 mJ/cm$^2$. In order to accelerate the photopolymerization reaction, light irradiation may be performed under a heating condition.

The thickness of the optically anisotropic layer is preferably 0.1 μm to 10 μm, more preferably 0.2 μm to 5 μm, and most preferably 0.3 μm to 5 μm.

[Other Additives in Optically Anisotropic Layer]

Along with the above-mentioned liquid crystalline compound, a plasticizer, a surfactant, polymerizable monomers, or the like may be used in combination to improve the uniformity of a coating film, the strength of the film, alignment characteristics of a liquid crystalline compound, and the like. For these materials, a material having compatibility with a liquid crystalline compound and not hindering the alignment is preferred.

Examples of the polymerizable monomer include a radical polymerizable or cationic polymerizable compound. The monomer is preferably a polyfunctional radical polymerizable monomer, and is preferably copolymerizable with the above-mentioned polymerizable group-containing liquid crystal compound. Examples thereof include those described in Paragraph Nos. [0018] to [0020] of the specification of the official gazette of Japanese Patent Application Laid-Open No. 2002-296423. The amount of the compound added is generally in a range of 1% by mass to 50% by mass, and preferably 5% by mass to 30% by mass, based on the discotic liquid crystalline molecules.

Examples of the surfactant include a compound known in the related art, and a fluorine-based compound is particularly preferred. Specific examples thereof include the compounds described in Paragraph Nos. [0028] to [0056] of the official gazette of Japanese Patent Application Laid-Open Mo. 2001-330725 and the compounds described in Paragraph Nos. [0069] to [0126] of the official gazette of Japanese Patent Application Laid-Open No. 2005-62673.

A polymer that is used with a liquid crystalline compound is preferably the polymer which may thicken a coating solution. Examples of the polymer include a cellulose ester. Preferred examples of the cellulose ester include the cellulose ester described in Paragraph No. [0178] of the official gazette of Japanese Patent Application Laid-Open No. 2000-155216. In order not to inhibit the alignment of a liquid crystalline compound, the amount of the polymer added is preferably in a range of 0.1% by mass to 10% by mass, and more preferably in a range of 0.1% by mass to 8% by mass, based on the liquid crystalline molecules.

The transition temperature of the discotic nematic liquid crystal phase-solid phase of the liquid crystalline compound is preferably 70° C. to 300° C., and more preferably 70° C. to 170° C.

[Coating Solvent]

As a solvent that is used to prepare a costing solution, an organic solvent is preferably used. Examples of the organic solvent include amides (for example, N,N-dimethylformamide), sulfoxides (for example, dimethylsulfoxlde), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone and methyl ethyl ketone), ethers (for example, tetrahydrofuran and 1,2-dimethoxyethane). Alkyl halides and ketones are preferred. The organic solvents may be used in combination of two or more thereof.

[Coating Method]

A coating solution may be coated by a known method (for example, a wire bar coating method, an extrusion coating method, a direct gravure coating method, a reverse gravure coating method and a dye coating method). Among them, when the optically anisotropic layer is formed, a wire bar coating method is preferably used to perform the coating, and the rotation speed of the wire bar preferably satisfies the following equation.

$$0.6 < (W \times (R+2r) \times \pi)/V < 1.4$$

[W: Rotation speed (rpm) of the wire bar, R: Diameter (m) of the bar core, r: Diameter (m) of the wire, and V: Conveying speed (m/min) of the support]

$(W \times (R+2r) \times \pi)/V$ is more-preferably in a range of 0.7 to 1.3, and still more preferably in a range of 0.8 to 1.2.

In forming the optically anisotropic layer, a die coating method is preferably used, and a coating method using a slide coater or a slot die coater is particularly preferred.

[Alignment Film]

In the present invention, it is preferred that the composition is coated on the surface of an alignment film, thereby aligning the molecules of the liquid crystalline compound. The alignment film is preferably used for implementing a preferred aspect of the present invention because the alignment film has a function of regulating the alignment direction of the liquid crystalline compound. However, the alignment film is serving the role once the alignment state is fixed after aligning the liquid crystalline compound, and thus is not always essential as a constitutional element of the present invention. That is, it is also possible to manufacture the polarizing plate of the present invention by transferring only the optically anisotropic layer on the alignment film in which the alignment state is fixed onto a polarizing layer or a support.

An alignment film may be formed by means of the rubbing treatment of an organic compound (preferably a polymer), the oblique deposition of an inorganic compound, formation of a layer having microgrooves, or accumulation of organic compounds (for example, ω-tricosanic acid, dioctadecylmethylammonium chloride and methyl stearate) by a Laugmuir-Blodgett method (LB film). Further, an alignment film that exhibits an alignment function by giving an electric field, giving a magnetic field or irradiating light, is also known. It is preferred that an alignment film is formed by the rubbing treatment of a polymer.

Examples of the polymer include a methacrylate-based copolymers described, for example, in Paragraph No. [0022] of the official gazette of Japanese Patent Application Laid-Open No. Hei 8-338913, styrene-based copolymers, polyolefins, polyvinyl alcohols and modified polyvinyl alcohols, poly(N-methylolacrylamides), polyesters, polyimides, vinyl acetate copolymers, carboxymethylcellolose, polycarbonates and the like. A silane coupling agent may be used as a polymer. Water-soluble polymers (for example, poly(N-methylolacrylamides), carboxymethylcellulose, gelatin, polyvinyl alcohols and modified polyvinyl alcohols) are preferred, gelatin, polyvinyl alcohols and modified, polyvinyl alcohols are more preferred, and polyvinyl alcohols and modified polyvinyl alcohols are most preferred.

The saponification degree of a polyvinyl alcohol is preferably 70% to 100%, and more preferably 80% to 100%. The polymerization degree of a polyvinyl alcohol is preferably 100 to 5,000.

In the alignment film, it is preferred that the side chain having a crosslinkable functional group (for example, a double bond) is bonded to the main chain or a crosslinkable functional group having a function of aligning the liquid crystalline molecules is introduced into the side chain. For the polymer used in the alignment film, a polymer which is capable of crosslinking by itself or which is crosslinked by a crosslinking agent may be used, and a plurality of combinations thereof may be used.

When the side chain having a crosslinkable functional group is bonded to the main chain of the polymer for an alignment film, or when a crosslinkable functional group is introduced into the side chain having a function of aligning the liquid crystalline molecules, the polymer for an alignment film may be copolymerized with a polyfunctional monomer contained in the optically anisotropic layer. As a result, a polyfunctional monomer and a polyfunctional monomer, a polymer for the alignment film and a polymer for the alignment, film, and a polyfunctional monomer and a polymer for the alignment film are strongly bonded to each other by a covalent bond. Therefore, the strength of an optical compensation sheet may be significantly improved by introducing a crosslinkable functional group into the polymer for an alignment film.

It is preferred that the crosslinkable functional group in a polymer for an alignment film includes a polymerizable group like the polyfunctional monomer. Specific examples thereof include those as described in Paragraph Nos. [0080] to [0100] of the specification of the official gazette of Japanese Patent Application Laid-Open No. 2000-155210, and the like.

The polymer for an alignment film may be crosslinked by using a crosslinking agent apart from the above-mentioned crosslinkable functional group. Examples of the crosslinking agent include aldehyde, an N-methylol compound, a dioxane derivative, a compound acting by activating a carboxyl group, an activated vinyl compound, an activated halogen compound, isooxazole and dialdehyde starch. The crosslinking agents may be used in combination of two or more thereof. Specific examples thereof include the compounds described in Paragraph Nos. [0023] and [0024] of the specification of the official gazette of Japanese Patent Application Laid-Open No. 2002-62420, and the like. High reactive aldehydes are preferred, and glutaraldehyde is particularly preferred.

The amount of the crosslinking agent added is preferably 0.1% by mass to 20% by mass and more preferably 0.5% by mass to 15% by mass, based on a polymer. The amount of the unreacted crosslinking agent remaining in the alignment film is preferably 1.0% by mass or less, and more preferably 0.5% by mass or less. Through the control in this manner, sufficient durability without generating reticulation may be obtained even though the alignment film is used for a long time in the liquid crystal display device or the alignment film is left to stand under a high temperature and high humidity atmosphere for a long period of time.

An alignment film can be basically formed by coating a solution including the polymer, which is an alignment film forming material, a crosslinking agent and an additive onto a transparent support, and then heat drying (crosslinking) the coated transparent support and subjecting the support to rubbing treatment. The crosslinking reaction may be performed at an arbitrary time after coating a solution onto a transparent support as described above. When a water-soluble polymer such as polyvinyl alcohol is used as an alignment film forming material, it is preferred that a coating solution is prepared in a mixed solvent of water and an organic solvent (for example, methanol) having a defoaming action. The ratio in the mass ratio of water; methanol is preferably 0:100 to 99:1, and more preferably 0:100 to 91:9. Accordingly, foam generation is inhibited, and defects on the alignment film, and furthermore, defects on the surface of the optically anisotropic layer are significantly reduced.

A coating method used for forming an alignment film is preferably a spin coating method, a dip coating method, a curtain coating method, an extrusion coating method, a rod coating method, or a roll coating method. A rod coating method is particularly preferred. Further, the film thickness after drying is preferably 0.1 μm to 10 μm. Heat drying may be performed at 20° C. to 110° C. In order to form a sufficient crosslinking, the heat drying is performed preferably at 60° C. to 100° C., and particularly preferably at 80° C. to 100° C. The drying time may be 1 minute to 36 hours, and preferably 1 minute to 30 minutes. It is also preferred that the pH is set at a value which is optimal for the crosslinking agent used, and when glutaraldehyde is used, the pH is preferably 4.5 to 5.5.

The alignment film is preferably formed on a transparent support. The alignment film may be obtained by crosslinking the polymer layer and then subjecting the surface to rubbing treatment, as described above.

As the rubbing treatment, a treatment method may be applied, which is widely adopted as a process for treating the alignment for liquid crystal of LCD. That is, it is possible to use a method of obtaining the alignment by rubbing the surface of the alignment film using paper or gauze, felt, rubber or nylon, polyester fibers, or the like in a certain direction. In general, the method is carried out by performing rubbing a number of times using a cloth which has averagely transplanted fibers having a uniform length and thickness, or the like.

The composition is coated on the rubbing-treated surface of the alignment film to align the molecules of the liquid crystalline compound. Thereafter, if necessary, the polymer for an alignment film may be reacted with a polyfunctional monomer contained in an optically anisotropic layer, or the polymer for an alignment film may be crosslinked using a crosslinking agent, thereby forming the optically anisotropic layer.

The thickness of the alignment film is preferably in a range of 0.1 μm to 10 μm.

In the optical film of the present invention, it is preferred that the optically anisotropic layer is a layer formed after subjecting an alignment film formed on a support to rubbing treatment, and the angle formed by the slow axis of the optically anisotropic layer and the rubbing direction is substantially 90° (the angle formed by the slow axis and the rotation axis of the rubbing roller is substantially 0°).

In addition, in the optical film of the present invention, it is preferred that the optically anisotropic layer is a layer formed after subjecting an alignment film formed on a support to rubbing treatment, and the angle formed by the slow axis of the optically anisotropic layer and the rubbing direction is substantially 0° (the angle formed by the slow axis and the rotation axis of the rubbing roller is substantially 90°).

[Support]

The optical film of the present invention may have a support composed of a polymer film supporting an optically anisotropic layer formed of a composition containing a liquid crystalline compound. A polymer film having a small optical anisotropy may be used, and a polymer film in which the optical anisotropy is developed by a stretching treatment and the like may be used. The optical transmittance of the support is preferably 80% or more.

The in-plane retardation (Re) of the support is preferably 0 nm to 30 nm, more preferably 0 nm to 20 nm, and most preferably 0 nm to 10 nm. Furthermore, the retardation in a thickness direction (Rth) of the support is preferably −1,000 nm to 300 nm, more preferably −500 nm to 200 nm, and most preferably −300 nm to 150 nm. The optical anisotropy of the support is preferably selected by combination with the optically anisotropic layer formed thereon, and the combination allows the Nz value of the optical film may be controlled by the combination.

Examples of the polymer include cellulose acylate films (for example, a cellulose triacetate film (refractive index 1.48), a cellulose diacetate film, a cellulose acetate butyrate film, and a cellulose acetate propionate film), polyethylene terephthalate films, polyethersulfone films, polyacrylic resin films, polymethane-based resin films, polyester films, polycarbonate films, polysulfone films, polyether films, polymethylpentene films, polyether ketone films, (meth)acrylnitrile films, polyolefins, polymers having an alicyclic structure (norbornene-based resins (ARTON: trade name, manufactured by JSR Corporation, and amorphous polyolefins (ZEONEX: trade name, manufactured by Zeon Corporation)), and the like. Among them, triacetylcellulose, polyethylene terephthalate and polymers having an alicyclic structure are preferred, and triacetylcellulose is particularly preferred.

The polymer film is preferably formed by a solvent casting method. The thickness of a transparent support is usually approximately 25 μm to 1000 μm, preferably 25 μm to 250 μm, and more preferably 30 μm to 90 μm. In order to improve the adhesiveness between a transparent support and a layer formed thereon (an adhesive layer, a vertical alignment film or an optically anisotropic layer), a surface treatment (for example, a glow discharge treatment, a corona discharge treatment, au ultraviolet (UV) treatment and a flame treatment) may be performed on the transparent support. On the transparent support, an adhesive layer (undercoat layer) may be formed. In addition, in order to impart slidability in the conveying process or to prevent adhesion of the surface with the reverse surface after winding, it is preferred to use a transparent support or a long transparent support, which is formed by coating or co-casting with the support of, on one side of the support, a polymer layer in which inorganic particles having an average particle diameter of approximately 10 nm to 100 nm are mixed at a weight ratio of the solid content of 5% to 40%.

Meanwhile, an optical film having a laminate structure in which an optically anisotropic layer is formed on a support has been described above, but the present invention is not limited to this aspect, and the optically anisotropic layer may be, of course, composed of only a stretched polymer film, or composed of only a liquid crystal film formed of a composition containing a liquid crystalline compound. Preferred examples of the stretched polymer film are the same as the preferred examples of the support that the optical film has. Furthermore, preferred examples of the liquid crystal film, are also the same as the preferred examples of the optically anisotropic layer included in the optical film.

It is preferred that the optical film is manufactured continuously in a long state. Further, it is preferred that the slow axis is in a direction which is neither parallel nor orthogonal to the longitudinal direction. That is, an angle formed by the slow axis of at least one optically anisotropic layer included in the optical film and the long side of the film is preferably 5° to 85°. When the optically anisotropic layer is formed of the liquid crystalline compound, the angle of the slow axis of the optically anisotropic layer may be adjusted, by the angle of rubbing. When the optically anisotropic layer is formed of a stretch-treated polymer film, the angle of the slow axis may be adjusted according to the stretch direction. By setting the angle of the slow axis of the optically anisotropic layer at an angle which is neither parallel nor orthogonal to the longitudinal direction of the long film, in the manufacture of a discotic polarizing plate or an elliptically polarizing plate as described below, it is possible to adhere the polarizing plate with a long polarizing film by roll-to-roll, thereby making it possible to manufacture a discotic polarizing plate or an elliptically polarizing plate with high precision of the axis angle in adhesion and with high productivity.

(Layer Configuration of Optical Film)

In the optical film of the present invention, a required single or a plurality of functional layers may be formed according to the purpose. Examples of a preferred aspect include an aspect in which a hardcoat layer is stacked on an optically anisotropic layer, an aspect in which an antireflection layer is stacked on an optically anisotropic layer, an aspect in which a hardcoat layer is stacked on an optically anisotropic layer and an antireflection layer is further stacked thereon, and the like. The antireflection layer is a layer composed of at least one layer, which is designed in consideration of the refractive index, the film thickness, the number of layers, the order of the layers and the like so as to reduce the reflectance by optical interference.

The simplest configuration of the antireflection layer is a configuration in which only a low refractive index layer is coated and formed on the outermost surface of the film. In order to further reduce the reflectance, a configuration in which a high refractive index layer having a high refractive index and a low refractive index layer having a low refractive index are combined to form an antireflection layer is preferred. Configuration examples include a bilayer configuration with a high refractive index layer/a low refractive index layer, stacked sequentially from the lower side, a configuration with three layers having different refractive indices, that is, a constitution in which a medium refractive index layer (a layer having a refractive index that is higher than that of the lower layer and lower than that of the high refractive index layer)/a high refractive index layer/a low refractive index layer are stacked in this order, and the like, and a configuration in which more antireflection layers are stacked is also proposed. Among them, due to durability, optical characteristics, cost, productivity and the like, a configuration with a medium refractive index layer/a high refractive index layer/a low refractive index layer, stacked in this order on the hardcoat layer, is preferred, and examples thereof include the configurations described in the official gazette of Japanese Patent Application Laid-Open Nos. H8-122504, H8-110401, H10-300902, 2002-243906, 2000-111706, and the like. Further, other functions may be imparted to each layer, and examples thereof include a configuration in which an antifouling low refractive index layer, an antistatic high refractive index layer and an antistatic hardcoat layer are stacked (for example, the official gazette of Japanese Patent Application Laid-Open Nos. H10-206603, 2002-243906 and the like), and the like.

Specific examples of the layer configuration of the optical film of the present invention having a hardcoat layer or an antireflection layer will be shown below.

An optically anisotropic layer/a hardcoat layer

An optically anisotropic layer/a low refractive index layer

An optically anisotropic layer/an antiglare layer/a low refractive index layer

An optically anisotropic layer/a hardcoat layer/a low refractive index layer

An optically anisotropic layer/a hardcoat layer/an antiglare layer/a low refractive index layer An optically anisotropic layer/a hardcoat layer/a high refractive index layer/a low refractive index layer An optically anisotropic layer/a hardcoat layer/a medium refractive index layer/a high refractive index layer/a low refractive index layer An optically anisotropic layer/a hardcoat layer/an antiglare layer/a high, refractive index layer/a low refractive index layer An optically anisotropic layer/a hardcoat layer/an antiglare layer/a medium refractive index layer/a high refractive index layer/a low refractive index layer An optically anisotropic layer/an antiglare layer/a high refractive index layer/a low refractive index layer An optically anisotropic layer/an antiglare layer/a medium refractive index layer/a high refractive index layer/a low refractive index layer In each of the above-mentioned configurations, a configuration in which functional layers such, as a hardcoat layer, an antiglare layer, an antireflection layer and the like are directly formed on an optically anisotropic layer is preferred. In addition, an optical film having layers of a hardcoat layer, an antiglare layer, an antireflection layer and the like formed on a support apart from an optical film including the optically anisotropic layer may be stacked for manufacture.

An optical film is preferred, in which a hardcoat layer and at least one optical interference layer are stacked directly or through another layer on the optical film in this order.

It is more preferred that at least one layer of the optical interference layer is a low refractive index layer, and the low refractive index layer is disposed on the outermost surface side.

It is preferred that the optical interference layer is a layer in which a intermediate refractive index layer, a high refractive index layer and a low refractive index layer are stacked in this order, and the low refractive index layer is disposed entire outermost surface side.

It is preferred that at least one layer of a support, an optically anisotropic layer, a hardcoat layer and an optical interference layer contains an ultraviolet absorbent.

As one of the preferred aspects of the optical him of the present invention, the optical film has an antireflection layer in which a medium refractive index layer, a high refractive index layer and a low refractive index layer are sequentially stacked from an optically anisotropic layer side. It is preferred that the refractive index of the medium refractive index layer is 1.60 to 1.65 at a wavelength of 550 nm, the thickness of the medium refractive index layer is 50.0 nm to 70.0 nm, the refractive index of the high refractive index layer is 1.70 to 1.74 at a wavelength of 550 nm, the thickness of the high refractive index layer is 90.0 nm to 115.0 nm, the refractive index of the low refractive index layer is 1.33 to 1.38 at a wavelength of 550 nm, and the thickness of the low refractive index layer is 85.0 nm to 95.0 nm.

Among the configurations, configuration (1) or configuration (2) shown below is particularly preferred.

Configuration (1): an antireflection film which is a low refractive index layer, in which the refractive index of the medium refractive index layer is 1.60 to 1.64 at a wavelength of 550 nm, the thickness of the medium refractive index, layer is 55.0 nm to 65.0 nm, the refractive index of the high refractive index layer is 1.70 to 1.74 at a wavelength of 550 nm, the thickness of the high refractive index layer is 105.0 nm to 115.0 nm, the refractive index of the low refractive index layer is 1.33 to 1.38 at a wavelength of 550 nm, and the thickness of the low refractive index layer is 83.0 nm to 95.0 nm.

Configuration (2): an antireflection film, in which the refractive index of the medium refractive index layer is 1.60 to 1.65 at a wavelength of 550 nm, the thickness of the medium refractive index layer is 55.0 nm to 65.0 nm, the refractive index of the high refractive index layer is 1.70 to 1.74 at a wavelength, of 550 nm, the thickness of the high refractive index layer is 90.0 nm to 100.0 nm, the refractive index of the low refractive index layer is 1.33 to 1.38 at a wavelength of 550 nm, and the thickness of the low refractive index layer is 85.0 nm to 95.0 nm.

The variation in reflected color may be decreased to a smaller value by adjusting the refractive index and thickness of each layer within the ranges. Configuration (1) is a configuration in which the reflectance may be adjusted to a particularly small value while suppressing the variation in reflected color at a low level, and is particularly preferred. Furthermore, Configuration (2) is a configuration in which the variation in reflectance is suppressed at a level lower than Configuration (1), and is particularly preferred because the robustness against the variation in film thickness is excellent.

Moreover, in the present invention, it is preferred feat with respect to a design wavelength $\lambda$ (=550 nm; representative of a wavelength region in which the visibility is the highest), the medium refractive index layer, the high refractive index layer and the low refractive index layer satisfy the following Equations (I), (II) and (III), respectively.

$$\lambda/4 \times 0.68 < n_1 d_1 < \lambda/4 \times 0.74 \qquad \text{Equation (I)}$$

$$\lambda/2 \times 0.66 < n_2 d_2 < \lambda/2 \times 0.72 \qquad \text{Equation (II)}$$

$$\lambda/4 \times 0.84 < n_3 d_3 < \lambda/4 \times 0.92 \qquad \text{Equation (III)}$$

(However, in the equations, $n_1$ is the refractive index of the medium refractive index layer, $d_1$ is the layer thickness (nm) of the medium refractive index layer, $n_2$ is the refractive index of the high refractive index layer, $d_2$ is the layer thickness (nm) of the high refractive index, layer, $n_3$ is the refractive index of the low refractive index layer, $d_3$ is the layer thickness (nm) of the low refractive index layer, and $n_3 < n_1 < n_2$)

In the case of satisfying Equations (I), (II) and (III), the reflectance is decreased and the change in reflected color may be suppressed, and thus the configuration is preferred. Further, accordingly, when oil components such as fingerprints, sebum or the like are adhered, the change in tint is small, making it difficult to recognize if a smear occurs, and thus the configuration is preferred.

When the tint of regularly reflected light for the light with 5° incident angle from a CIE standard light source D65 in a wavelength region of 380 to 780 nm is represented by a* and b* values in the CIE1976L*a*b* color space, by setting the a* and b* values within the ranges of $0 \le a^* \le 8$ and $-10 \le b^* \le 10$, respectively and furthermore setting a color difference $\Delta E$ when the layer thickness of any layer in each layer changes by 2.5% within the above-mentioned range of the variation of tint to the range of the following Equation (5), the neutrality of the reflected color for each product is good, there is no difference in the reflected color, and the smear becomes inconspicuous when oil components such as fingerprints, sebum or the like are adhered on the surface, and thus the configuration is preferred. By combining a low refractive index layer containing a fluorine-containing antifouling agent having a polymerizable unsaturated group and a fluorine-containing polyfunctional acrylate with the layer configuration and using the combination, even in a multilayer interference film configuration, it is difficult for felt pen mark or oil components such as fingerprints, sebum or the like to be attached, easy for the felt pen mark or the oil components to be wiped off even though attached, and possible for the felt pen mark or the oil components to become inconspicuous.

$$\Delta E = \{(L^* - L^{*\prime})^2 + (a^* - a^{*\prime})^2 + (b^* - b^{*\prime})^2\}^{1/2} \le 3 \qquad \text{Equation (5)}$$

($L^{*\prime}$, $a^{*\prime}$ and $b^{*\prime}$ are the tints of reflected light in a design film thickness)

In addition, in the ease of installation on the surface of an image display device, the glare may be significantly reduced by setting the average value of the specular reflectance to 0.5% or less, and thus the configuration is preferred.

As for the measurement of specular reflectance and tint, the antireflection property may be evaluated by mounting an adapter "ARV-474" on a spectrophotometer "V-550" (manufactured by JASCO Corporation), measuring the specular reflectance for the outgoing angle of −θ at an incident angle of θ (θ=5 to 45°, interval of 5°) in the wavelength region 380 nm to 780 nm, and calculating an average reflectance at 450 nm to 650 nm. Further, the tint of reflected light may be evaluated by calculating, from the reflection spectrum measured, the $L^*$, $a^*$ and $b^*$ values of the CIE1976 $L^*a^*b^*$ color space, which are values showing the tint of regularly reflected light for incident light at each incident angle of a CIE standard light source D65.

The refractive index of each layer may be measured using Multi-Wavelength Abbe Refractometer DR-M2 (manufactured by ATAGO Co., Ltd.) by coating the coating solution for each layer onto a glass plate to a thickness of 3 µm to 5 µm. In the present specification, a refractive index measured using a filter "Interference Filter 546(e) nm for DR-M2 and M4, Parts No.: RE-3523", is adopted as the refractive index at a wavelength of 550 nm. The film thickness of each layer may be measured by observing the cross-section by means of a reflection spectroscopy film thickness meter "FE-3000" (manufactured by Otsuka Electronics Co., Ltd.) using light interference or a IBM (transmission electron microscope). The refractive index may be measured simultaneously with the film thickness even by the reflection spectroscopy film thickness meter, but in order to increase the measurement precision of film thickness, a refractive index of each layer measured by another means is preferably used. When the refractive index of each layer may not be measured, the measurement of film thickness by TEM is preferred. In this case, it is preferred that the film thickness is measured at 10 or more portions and the average value of the values obtained is used.

It is preferred that a form of the optical film of the present invention at the time of manufacture takes a form of winding the film into a roll shape. In this case, in order to obtain the neutrality of tint of the reflected color, the layer thickness distribution value calculated by the following Equation (6) in which the average d (average value), minimum d: (minimum value) and maximum d (maximum value) of the layer thickness in a range of an arbitrary 1,000 m in length are used as the parameters is preferably 5% or less, more preferably 4% or less, still more preferably 3% or less, still more preferably 2.5% or less, and particularly preferably 2% or less, with respect to each layer of thin film layers.

$$(\text{maximum } d - \text{minimum } d) \times 100 / \text{average } d \quad \text{Equation (6)}$$

(Hardcoat Layer)

In the optical film, of the present invention, a hardcoat layer may be formed directly or through another layer on at least one surface of the optical film, in order to impart physical strength to the film. In the present invention, the hardcoat layer may not be formed, but forming a hardcoat layer is preferred in that the scratch-resistance surface becomes strong in a pencil scratch test or the like.

A low refractive index layer is preferably formed on the hardcoat layer, and a medium refractive index layer and a high refractive index layer are more preferably formed between the hardcoat layer and a low refractive index layer to constitute the antireflection film.

The hardcoat layer may be composed of lamination of two or more layers.

The refractive index of the hardcoat layer in the present invention is in a range of preferably 1.48 to 2.00, and more preferably 1.48 to 1.70, due to an optical design to obtain an antireflection film. In the present invention, at least one layer of the low refractive index layer is present on the hardcoat layer, and thus when the refractive index is much smaller than the range, the antireflection property is reduced, and when the refractive index is much larger than the range, the tint of the reflected light tends to become strong.

The film thickness of the hardcoat layer is usually about 0.5 µm to 50 µm, preferably 1 µm to 20 µm, and more preferably 5 µm to 20 µm, from the viewpoints of imparting sufficient durability and impact resistance to the film.

The strength of the hardcoat layer is preferably H or more, more preferably 2H or more and most preferably 3H or more by a pencil hardness test. Further, it is preferred that the amount of abrasion of a test specimen before and after the test in the Taber test in accordance with JIS K5400 is as small as possible.

The hardcoat layer is preferably formed by a crosslinking reaction or a polymerization reaction of an ionized radiation curable compound. The hardcoat layer may be formed, for example, by coating a coating composition including ionized radiation curable polyfunctional monomers or polyfunctional oligomers on a transparent support, and subjecting the polyfunctional monomers or the polyfunctional oligomers to a crosslinking reaction, or a polymerization reaction. The functional group of the ionized radiation curable polyfunctional monomers or the polyfunctional oligomers is preferably photo-, electron beam-, or radiation-polymerizable, and among these, a photopolymerizable functional group is preferred. Examples of the photopolymerizable functional group include an unsaturated polymerizable functional group such as a (meth)acryloyl group, a vinyl group, a styryl group, an allyl and the like, and among them, a (meth)acryloyl group is preferred. Specifically, compounds exemplified in the (polyfunctional monomer having a polymerizable unsaturated group) may be preferably used.

The hardcoat layer may contain matte particles having an average particle diameter of 1.0 µm to 10.0 µm, and preferably 1.5 µm to 7.0 µm, for example, particles of inorganic compounds or resin particles, for the purpose of imparting an infernal scattering property.

Various refractive index monomers or inorganic particles, or both of them may be added to the binder of the hardcoat layer for the purpose of controlling the refractive index of the hardcoat layer. The inorganic particles have, in addition to an effect of controlling the refractive index, an effect of suppressing curing shrinkage caused by a crosslinking reaction. In the present invention, after formation of the hardcoat layer, a polymer produced by polymerizing the polyfunctional monomers and/or the high refractive index monomers and the like, and inorganic particles dispersed therein are collectively referred to as a binder.

(Antiglare Layer)

The antiglare layer is formed for the purpose of imparting, to the film, a hard coating property for improving the antiglare property caused by surface scattering, and preferably the hardness and the scratch resistance of the film.

The antiglare layer is described in Paragraphs Nos. [0178] to [0189] of the official gazette of Japanese Patent Application Laid-Open No. 2009-98658, and the same applies to the present invention.

It is preferred that at least one optical interference layer functioning as an antireflection layer is stacked directly or through another layer on at least one surface of the optical film in the present invention.

[High Refractive Index Layer and Medium: Refractive Index Layer]

The refractive index of the high refractive index layer is preferably 1.70 to 1.74, and more preferably 1.7.1 to 1.73. The refractive index of the medium refractive index is adjusted so as to be a value between the refractive index of the low refractive index layer and the refractive index of the high refractive index layer. The refractive index of the medium refractive index layer is preferably 1.60 to 1.64, and more preferably 1.61 to 1.63.

As for a method for forming the high refractive index layer or the medium refractive index layer, it is possible to use a transparent thin film of inorganic oxide formed by a chemical vapor deposition (CVD) method or a physical vapor deposition (PVD) method, particularly, a vacuum deposition method or a sputtering method, which is a kind of the physical vapor deposition method, but a method using all-wet costing is preferred.

The medium refractive index layer may be adjusted in the same manner using the same materials as the high refractive index layer, except that the refractive index is different from that of the high refractive index layer, and thus the high refractive index layer will be particularly described below.

The high refractive index layer is preferably formed by coating a coating composition containing inorganic fine particles, a curable compound having a trifunctional or higher polymerizable group (hereinafter also referred to as a "binder" in some cases), a solvent, and a polymerization initiator, drying the solvent, and then curing the coating by using either one of heating and irradiation of ionized radiation or both in combination thereof. When the curable compound or the initiator is used, the curable compound may be cured by a polymerization reaction by means of heat and/or ionized radiation after coating, thereby forming a medium refractive index layer or high refractive index layer having excellent scratch resistance and adhesion property.

(Inorganic Fine Particles)

The inorganic fine particles are preferably inorganic fine particles containing an oxide of metal, and more preferably inorganic fine particles containing an oxide of at least one metal selected from Ti, Zr, In, Zn, Sn, Al and Sb. Furthermore, in order to assist the antistatic property developed by a conductive polymer compound introduced into a layer (A), at least one of the medium refractive index layer and the high refractive index layer may contain conductive inorganic fine particles.

As the inorganic fine particles, fine particles of zirconium oxide are preferred from the viewpoint of a refractive index. Further, it is preferred that inorganic fine particles having an oxide of at least one metal of Sb, In and Sn as a main component are used from the viewpoint of conductivity. The conductive inorganic fine particles are more preferably at least one metal oxide selected from the group consisting of tin-doped indium oxide (ITO), antimony-doped tin oxide (ATO), fluorine-doped tin oxide (FTO), phosphorus-doped tin oxide (PTO), zinc antimonate (AZO), indium-doped zinc oxide (IZO), zinc oxide, ruthenium oxide, rhenium oxide, silver oxide, nickel oxide, and copper oxide.

By varying the amount of the inorganic fine particles, the refractive index may be adjusted to a predetermined refractive index. When zirconium oxide is used as a main component, the average particle diameter of the inorganic fine particles in the layer is preferably 1 nm to 120 nm, more preferably 1 nm to 60 nm, and still more preferably 2 nm to 40 nm. The range is preferred because the haze is suppressed and dispersion stability and adhesion to the upper layer due to appropriate unevenness on the surface are improved.

The refractive index of the inorganic fine particles having zirconium oxide as a main component is preferably 1.90 to 2.80, more preferably 2.00 to 2.40, and most preferably 2.00 to 2.20.

The amount of the inorganic fine particles added may vary depending on the layer added, and in the medium refractive index layer, the amount added is preferably 20% by mass to 60% by mass, more preferably 25% by mass to 55% by mass, and still more preferably 30% by mass to 50% by mass, based on the solid content of the entire medium refractive index layer. In the high refractive index layer, the added amount is preferably 40% by mass to 90% by mass, more preferably 50% by mass to 85% by mass, and still more preferably 60% by mass to 80% by mass, based on the solid content of the entire high refractive index layer.

The particle diameter of the inorganic fine particles may be measured by a light-scattering method or an electron microscope photograph. The specific surface area of the inorganic fine particles is preferably 10 m$^2$/g to 400 m$^2$/g, more preferably 20 m$^2$/g to 200 m$^2$/g, and most preferably 30 m$^2$/g to 150 m$^2$/g.

The inorganic fine particles may be subjected to a physical surface treatment such as plasma discharge treatment or corona discharge treatment or a chemical surface treatment with a surfactant or a coupling agent in order to achieve dispersion stabilization in a dispersion liquid or a coating solution or enhance affinity for or binding properties to a binder component. The use of the coupling agent is particularly preferred. As the coupling agent, an alkoxymetal compound (for example, a titanium coupling agent or a silane coupling agent) is preferably used. Among them, treatment with a silane coupling agent having an acryloyl group or a methacryloyl group is particularly effective. The chemical surface treatment agents of inorganic fine particles, the solvents, the catalysts and the stabilizers of dispersed products are described in [0058] to [0083] of the official, gazette of Japanese Patent Application Laid-Open No. 2006-17870.

The inorganic fine particles may be dispersed by using a disperser. Examples of the disperser include a sand grinder mill (for example, bead mill with a pin), a high-speed impeller mill, a pebble mill, a roller mill, an attritor and a colloid mill. A sand grinder mill and a high-speed impeller mill are particularly preferred. In addition, a preliminary dispersion treatment may be performed. Examples of the disperser used in the preliminary dispersion treatment include a ball mill, a three-line roll mill, a kneader and an extruder.

The inorganic fine particles are preferably dispersed in a dispersion medium to have a particle size as refined as possible, and the mass average diameter is 10 nm to 120 nm. The mass average diameter is preferably 20 nm to 100 nm, more preferably 30 nm to 90 nm, and particularly preferably 30 nm to 80 nm. By refining the inorganic fine particles to 200 nm or less, the high refractive index layer and the medium refractive index layer may be formed without impairing transparency.

(Curable Compound)

The curable compound is preferably a polymerizable compound, and as the polymerizable compound, an ionized radiation curable polyfunctional monomer or a polyfunctional oligomer is preferably used. The functional group in these compounds is preferably photo-, electron beam-, or radiation-polymerizable, and among them, a photopolymerizable functional group is preferred. Examples of the photopolymerizable functional group include an unsaturated polymerizable functional group such as a (meth)acryloyl group, a vinyl group, a styryl group, an allyl and the like, and among them, a (meth)acryloyl group is preferred.

As specific examples the photopolymerizable polyfunctional monomer having a photopolymerizable functional group, the compounds described in the (polyfunctional monomer having a polymerizable unsaturated group) may be suitably used.

In the high refractive index layer, a surfactant, an antistatic agent, a coupling agent, a thickener, a coloration inhibitor, a colorant (a pigment or a dye), a defoaming agent, a leveling agent, a flame retardant, an ultraviolet absorbent an infrared absorbent, an adhesion-imparting agent, a polymerization inhibitor, an antioxidant, a surface modifier, a conductive metal fine particle and the like may be added, in addition to the above-mentioned components (inorganic fine particles, a curable compound, a polymerization initiator, a photosensitizer and the like).

It is preferred that the high refractive index layer and the medium refractive index layer used in the present invention are formed by adding a curable compound (for example, the above-described ionized radiation curable polyfunctional monomer, the polyfunctional oligomer or the like) which is a binder precursor further necessary to form a matrix, a photopolymerization initiator and the like to a dispersion liquid prepared by dispersing inorganic line particles in a dispersion medium as described above to prepare a coating composition for forming a high refractive index layer and a medium refractive index layer, coating the coating composition for forming a high refractive index layer and a medium refractive index layer on a transparent support, and curing the coating composition by a crosslinking reaction, or a polymerization reaction of the curable compound.

Further, it is preferred that the binder of the high refractive index layer and the medium refractive index layer is subjected to crosslinking reaction or polymerization reaction with a dispersing agent simultaneously with coating of the layer or after coating. The binder of the high refractive index layer and the medium refractive index layer thus-manufactured takes a form, for example, in which the anionic groups of the dispersing agent are introduced into the binder as a result of crosslinking or polymerization reaction between the above-described preferred dispersing agent and the ionized radiation curable polyfunctional monomer or polyfunctional oligomer. Further, the anionic groups introduced into the binder of the high refractive index layer and the medium refractive index layer have a function of maintaining the dispersed state of the inorganic fine particles, and the crosslinked or polymerized structure imparts a film-forming ability to the binder, thereby improving the physical strength, chemical resistance and weather resistance of the high refractive index layer and the medium refractive index layer containing the inorganic fine particles.

In the formation of the high refractive index layer, the crosslinking reaction or polymerization reaction of the curable compound is preferably performed in an atmosphere having an oxygen concentration of 10% by volume or less. By forming the high refractive index layer in an atmosphere having an oxygen concentration of 10% by volume or less, it is possible to improve the physical strength, chemical resistance, and weather resistance of the high refractive index layer and furthermore adhesion between the high refractive index layer and a layer adjacent to the high refractive index layer. The layer through a crosslinking reaction or polymerization reaction of the curable resin is formed in an atmosphere having an oxygen, concentration of preferably 6% by volume or less, more preferably 4% by volume or less, particularly preferably 2% by volume or less, and most preferably 1% by volume or less.

As described above, the medium refractive index layer may be obtained by using the same materials and in the same manner as those of the high refractive index layer.

Specifically, for example, a main composition is determined by selecting the kind of tine particle and the kind of resin and determining the blending ratio therebetween such that the medium refractive index layer and the high refractive index layer may satisfy the film thickness and refractive index of Formulas (I) and (II).

In the coating composition for forming all the layers, a solvent may be used in the same manner as in the composition for a low refractive index layer.

[Low Refractive Index Layer]

The refractive index of the low refractive index layer in the present invention is preferably 1.30 to 1.47. The refractive index ox the low refractive index layer in the case of the antireflection film, of a multi-layer thin film interference type (medium refractive index layer/high refractive index layer/low refractive index layer) is preferably 1.33 to 1.38, and more preferably 1.33 to 1.37. The range is preferred because the film strength may be maintained by suppressing the reflectance. Even for a method of forming the low refractive index layer, it is possible to use a transparent thin film of inorganic oxide formed by a chemical vapor deposition (CVD) method or a physical vapor deposition (PVD) method, particularly, a vacuum deposition method or a sputtering method, which is a kind of the physical vapor deposition method, but a method by all-wet coating using a composition for a low refractive index layer is preferably used.

The haze of the low refractive index layer is preferably 3% or less, more preferably 2% or less and most preferably 1% or less.

The strength of the antireflection film, of which even the low refractive index layer is formed, is preferably H or more, more preferably 2H or more, and most preferably 3H or more in a pencil hardness test under a load of 500 g.

In addition, in order to improve the antifouling performance of the antireflection film, the contact angle of the surface with water is preferably 90° or more. The contact angle is more preferably 102° or more. In particular, when the contact angle is 105° or more, the anti-fouling performance against fingerprints is significantly improved, which is thus particularly preferred. Furthermore, the contact angle with water is 102° or more, and the surface free energy is more preferably 25 dynes/cm or less, particularly preferably 23 dynes/cm or less, and still more preferably 20 dynes/cm or less. Most preferably, the contact angle with water is 105° or more and the surface free energy is 20 dynes/cm or less.

(Formation of Low Refractive Index Layer)

The low refractive index layer is preferably formed by coating a coating composition having dissolved or dispersed therein a fluorine-containing antifouling agent having a polymerizable unsaturated group, a fluorine-containing copolymer having a polymerizable unsaturated group, inorganic fine particles, and other arbitrary components contained if desired, simultaneously with the coating or after the coating and drying, curing the coating by a crosslinking reaction or polymerization reaction by the irradiation of ionized radiation (examples thereof include irradiation of light, irradiation, of an electron beam, and the like) or heating.

In particular, when the low refractive index layer is formed by the crosslinking reaction, or polymerization reaction of an ionized radiation curable compound, the crosslinking reaction or polymerization reaction is preferably performed in an atmosphere having an oxygen concentration of 10% by volume or less. By forming the low refractive index layer in an atmosphere having an oxygen concentration of 1% by volume or less, an outermost layer having excellent physical strength, and chemical resistance may be obtained.

The oxygen concentration is preferably 0.5% by volume or less, more preferably 0.1% by volume or less, particularly preferably 0.05% by volume or less, and most preferably 0.02% by volume or less.

As a means of adjusting the oxygen concentration to 1% by volume or less, replacement of the air (nitrogen, concentration is about 79% by volume, oxygen concentration is about 21% by volume) with other gases is preferred, and replacement with nitrogen (purging by nitrogen) is particularly preferred.

(Ultraviolet Absorbent)

As the ultraviolet absorbent, any known ultraviolet absorbent which may express an ultraviolet absorbing property may be used. Among the ultraviolet absorbents, a benzotriazole-based or hydroxyphenyltriazine-based ultraviolet absorbent is preferred, in order to obtain a high ultraviolet absorbing property and an ultraviolet absorbing ability (ultraviolet blocking ability) that is used in an electronic image display device. Further, two or more of ultraviolet absorbents having different maximum absorption wavelengths may be used in combination in order to widen the ultraviolet absorption band.

Examples of the benzotriazole-based ultraviolet absorbent include 2-[2'-hydroxy-5'-(methacryloyloxymethyl)phenyl]-2H-benzotriazole, 2-[2'-hydroxy-5'-(methacryloyloxyethyl)phenyl]-2H-benzotriazole, 2-[2'-hydroxy-5'-(methacryloyloxypropyl)phenyl]-2H-benzotriazole, 2-[2'-hydroxy-5'-(methacryloyloxyhexyl)phenyl]-2H-benzotriazole, 2-[2'-hydroxy-3'-tert-butyl-5'-(methacryloyloxyethyl)phenyl]-2H-benzotriazole, 2-[2'-hydroxy-5'-tert-butyl-3'-(methacryloyloxyethyl)phenyl]-2H-benzotriazole, 2-[2'-hydroxy-5'-(methacryloyloxyethyl)phenyl]-5-chloro-2H-benzotriazole, 2-[2'-hydroxy-5'-(methacryloyloxyethyl)phenyl]-5-methoxy-2H-benzotriazole, 2-[2'-hydroxy-5'-(methacryloyloxyethyl)phenyl]-5-cyano-2H-benzotriazole, 2-[2'-hydroxy-5'-(methacryloyloxyethyl)phenyl]-5-tert-butyl-2H-benzotriazole, 2-[2'-hydroxy-5'-(methacryloyloxyethyl)phenyl]-5-nitro-2H-benzotriazole, 2-(2-hydroxy-5-tert-butylphenyl)-2H-benzotriazole, benzenepropanoic acid-3-(2H-benzotriazol-2-yl)-5-(1,1-dimethylethyl)-4-hydroxy-, C7- to 9-branched or straight chained alkyl ester, 2-(2H-benzotriazol-2-yl)-4,6-bis(1-methyl-1-phenylethyl)phenol, 2-(2H-benzotriazol-2-yl)-6-(1-methyl-1-phenylethyl)-4-(1,1,3,3-tetramethylbutyl)phenol and the like.

Examples of the hydroxyphenyltriazine-based ultraviolet absorbent include 2-[4-[(2-hydroxy-3-dodecyloxypropyl)oxy]-2-hydroxyphenyl]-4,6-bis(2,4-dimethylphenyl)-1,3,5-triazine, 2-[4-(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, 2-(2-hydroxy-4-[1-octyloxycarbonylethoxy]phenyl)-4,6-bis(4-phenylphenyl)-1,3,5-triazine, 2,2',4,4'-tetrahydroxybenzophenone, 2,2'dihydroxy-4,4'-dimethoxybenzophenone, 2,2'-dihydroxy-4-methoxybenzophenone, 2,4-dihydroxybenzophenone, 2-hydroxy-4-acetoxyethyoxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-n-octoxybenzophenone, 2,2'-dihydroxy-4,4'-dimethoxy-5,5'-disulfobenzophenone-disodium salt and the like.

The content of the ultraviolet absorbent depends on a required ultraviolet transmittance or absorptivity of an ultraviolet absorbent, but is usually 20 parts by mass or less, and preferably 1 part by mass to 20 parts by mass, based on 100 parts by mass of the ultraviolet curable resin. When the content of the ultraviolet absorbent is more than 20 parts by mass, there is a tendency that the curability of the curable composition by ultraviolet rays is reduced, and at the same time, there is a concern that the visible light transmittance of the hardcoat film 10 may be reduced. Meanwhile, when the content of the ultraviolet absorbent is less than 1 part by mass, the ultraviolet absorptivity of the hardcoat film 10 may not be sufficiently exhibited.

[Polarizing Plate]

The polarizing plate of the present invention has the optical film and a polarizing film. As the polarizing film, any one of an iodine-based polarizing film, a dye-based polarizing film which uses a dichromatic dye, and a polyene-based polarizing film may be used. A polyvinyl alcohol-based film is generally used to prepare an iodine-based polarizing film and a dye-based polarizing film. The absorption axis of the polarizing film corresponds to the stretching direction of the film. Therefore, the polarizing film stretched to the machine direction (conveying direction) has an absorption axis parallel to the longitudinal direction, and the polarizing film stretched to the transverse direction (a direction vertical to the conveying direction) has the absorption axis vertical to the longitudinal direction.

The polarizing film generally has a protective film. In the present invention, the optical film may function as a protective film of the polarizing film. When a protective film of the polarizing film is stacked apart from the optical film, a cellulose ester film having high optical isotropy as a protective film is preferably used.

A preferred method for manufacturing the polarizing plate of the present invention includes a process of continuously stacking the optical film and the polarizing film respectively in a long state. The long polarizing plate is cut to fit the size of a screen in the image display device used. For the polarizing plate of the present invention, it is preferred that any of the optical film and the polarizing film is continuously stacked in a long state.

A linear polarizing film as the polarizing film may be used in combination with the optical film to manufacture a polarizing film-integrated optical film which, functions as a discotic polarizing plate or an elliptically-polarizing plate, with high productivity. These discotic polarizing plates or elliptically-polarizing plates have a plurality of uses, such as the use for improving the contrast of or enlarging the viewing angle of a liquid crystal display device, the use as an antireflection film of an organic EL display device, the use as a luminance improving film by stacking with a cholesteric liquid crystal film or the use as a viewing improving film of a 3D display device.

The polarizing plate of the present invention may have the optical film stacked on one side of the polarizing film and have an optically-compensatory film having an optical anisotropy further stacked, on the other side thereof. By disposing the optical film, the polarizing film, the optically-compensatory film and the liquid crystal cell of the present invention in the order from a viewer side, or disposing the optical film, the polarizing film, the optically-compensatory film and the liquid crystal cell of the present invention in the order from a backlight side, the optically-compensatory film may function, as a compensatory film of contrast or viewing angle of a liquid crystal display device, and thus the optical film of the present invention functions as a film used at the external side of the polarizing film (viewer side or backlight side).

The polarizing plate of the present invention is preferably a polarizing plate in which any of the optical film, the polarizing film and the optically-compensatory film is continuously stacked in this order in a long state.

The image display device of the present invention, is preferably an image display device, and more preferably a stereoscopic image display device, in which the optical film or polarizing plate is disposed on the forefront surface.

[Liquid Crystal Display Device]

As long as the liquid crystal display device of the present invention has the polarizing plate, the configuration thereof is not particularly limited. The configuration may be any of reflection-type, semi-transmission-type, and transmission-type liquid crystal display devices and the like. The liquid crystal display device generally includes a polarizing plate, a liquid crystal cell, and if necessary, members such as an phase difference plate, a reflection layer, a light-diffusing layer, a backlight, a front light, an optical control film, a light guide, a prism sheet, a color filter and the like. In the present invention, the optical film is preferably used on an external side and/or a backlight side of the display device. In addition, the location of the polarizing plate of the present invention used is not particularly limited, and one or multiple locations may be available. The liquid crystal, cell is not particularly limited, and it is possible to use a general liquid crystal cell having a liquid crystal layer sandwiched between a pair of transparent substrates having an electrode, and the like. The transparent substrate that constitutes the liquid crystal cell is not particularly limited as long as the transparent substrate allows a material showing liquid crystallinity, which constitutes the liquid crystal layer, to be aligned in a specific alignment direction. Specifically, it is possible to use any of a transparent substrate having the property of aligning liquid crystals by itself a transparent substrate lacking in an aligning capability by itself but provided with an alignment film or the like having the property of aligning liquid crystals, and the like. Furthermore, as the electrode for the liquid crystal cell, any known in the art may be used. Typically, the electrode may be provided on the surface of the transparent substrate to be brought into contact with the liquid crystal layer, and when a substrate having an alignment film is used, the electrode may be provided between the substrate and the alignment film. The material showing liquid crystallinity, which forms the liquid crystal layer, is not particularly limited, and examples thereof include various types of typical low molecular liquid crystalline compounds, polymer liquid crystalline compounds and their mixtures capable of constituting various liquid crystal cells. Further, within a range not impairing the liquid crystallinity, a dye, a chiral agent, a non-liquid crystalline compound or the like may be added thereto.

The liquid crystal cell may include various constituent elements necessary to constitute various types of liquid crystal cells as described below, in addition to the above-mentioned electrode substrate and liquid crystal layer. Examples of the liquid crystal cell mode includes various modes such as a TN (Twisted Nematic) mode, an STN (Super Twisted nematic) mode, an ECB (Electrically Controlled Birefringence) mode, an IPS (In-Plane Switching) mode, a VA (Vertical Alignment) mode, an MVA (Multidomain Vertical Alignment) mode, a PVA (Patterned Vertical Alignment) mode, an OCB (Optically Compensated Birefringence) mode, a HAN (Hybrid Aligned Nematic) mode, an ASM (Axially Symmetric Aligned Microcell) mode, a halftone gray scale mode, a domain division mode or a display mode using a ferroelectric liquid crystal and an antiferroelectric liquid crystal, and the like. In addition, the driving system of the liquid crystal cell is not also particularly limited, and may be any driving system of a passive matrix system used in STN-LCD or the like, an active matrix system using an active electrode such as TFT (Thin Film Transistor) electrode, a TFD (Thin Film Diode) electrode or the like, a plasma address system, and the like. The driving system may also be a field sequential system which does not use a color filter.

The polarizing plate in the present invention is preferably used in reflection-type, semi-transmission type and transmission type liquid crystal display devices. Furthermore, the polarizing plate in the present invention is combined with a cholesteric liquid crystal film, and thus is also preferably used as a luminance improving film. The reflection type liquid crystal display device has a configuration in which a reflection plate, a liquid crystal cell and a polarizing plate are stacked in this order. The phase difference plate is disposed between a reflection plate and a polarizing film (between a reflection plate and a liquid crystal cell or between a liquid crystal cell and a polarizing film). The reflection plate may share a substrate with a liquid crystal cell. The semi-transmission-reflection type liquid crystal display device at least includes a liquid crystal cell, a polarizing plate disposed closer to an observer side than to the liquid crystal cell, at least one phase difference plate disposed between the polarizing plate and the liquid crystal cell, and a semi-transmission reflection layer provided in the back away from the observer father than the liquid crystal layer, and has at least one phase difference plate and a polarizing plate in the back away from the observer farther than the semi-transmissive reflection layer. In this type of the liquid crystal display device, it is possible to use both a reflection mode and a transmission mode by providing a backlight.

The liquid crystal cell is preferably of a VA mode, an OCB mode, an IPS mode or a TN mode.

In the VA mode liquid crystal cell, rod-like liquid crystalline molecules are substantially vertically aligned when no voltage is applied. The VA mode liquid crystal cells include (1) liquid crystal cells in a VA mode in a narrow sense in which rod-like liquid crystalline molecules are aligned substantially vertically when no voltage is applied but are aligned substantially horizontally when voltage is applied (described in the official gazette of Japanese Patent Application Laid-Open No. H2-176625), (2) liquid crystal cells (in an MVA mode) in which a VA mode is multidomained for enlarging the viewing angle (described in SID97, Digest of Tech. Papers (Proceedings) 28 (1997), 845), (3) liquid crystal cells in a mode (n-ASM mode) in which rod-like liquid crystalline molecules are aligned substantially vertically when no voltage is applied but are aligned in a twisted multidomained mode when voltage is applied (described in Proceedings of Symposium on Japanese Liquid Crystal Society, 58 to 59 (1988)), and (4) liquid crystal cells in a SURVIVAL mode (reported in LCD International 98).

The OCB mode liquid crystal cell is a liquid crystal cell in a bend alignment mode in which rod-shaped liquid crystalline molecules are substantially reversely (symmetrically) aligned in the upper and lower portions of the liquid crystal cell. Liquid crystal displays using the liquid crystal cell in bend alignment mode are disclosed in U.S. Pat. Nos. 4,583,825 and 5,410,422. The rod-like liquid crystalline molecules are symmetrically aligned in the upper and lower portions of the crystal cell are symmetrically aligned and thus the liquid crystal cell in a bend alignment mode has a self-optically-compensatory function. For this reason, the liquid crystal mode is referred to as an OCB (Optically Compensatory Bead) liquid crystal mode. The liquid crystal display device in a bend alignment mode is advantageous in last response speed.

In a liquid cell in an IPS mode, rod-like liquid crystal molecules are aligned substantially in parallel to a substrate, and the liquid crystal molecules respond planarly by applying an electric field parallel to the surface of the substrate. An IPS mode displays black when no electric field is applied thereto, and the transmission axes of a pair of upper and lower polarizing plates are disposed orthogonal to each other. Methods for improving the viewing angle by reducing light leakage in an inclined direction during the black display using an optically compensatory sheet are disclosed in the official gazettes of Japanese Patent Application Laid-Open Nos. H10-54982, H11-202323, H9-292522, H11-133408, H11-305217, H10-307291 and the like.

In a liquid cell in a TN mode, rod-like liquid crystalline molecules are substantially horizontally aligned when no voltage is applied, and are aligned twisted at 60° to 120°. Liquid crystal cells in TN mode are mostly used as a color TFT liquid crystal display device, and are described in numerous literatures.

It is preferred that the polarizing plate of the present invention is configured by stacking the optical film, polarizing film and optically-compensatory film of the present invention. It is preferred that the optically-compensatory film has a function as a compensatory film of contrast of viewing angle of a liquid crystal display device. As the optically-compensatory film, it is possible to use an optically-compensatory film in which the optical anisotropy is developed by stretching a polymer film or aligning a liquid crystalline compound. It is preferred that the optically-compensatory film controls the refractive index anisotropy in the three-dimensional direction according to the mode or the disposed position of a liquid crystal display device used. The refractive index anisotropy in the three-dimensional direction may be controlled in the molecular shape or the alignment state of a liquid crystalline compound, may be controlled by using a polymer film having an optical anisotropy used as a support, and may be controlled by the combination thereof.

One of preferred aspects of the optically-compensatory film includes liquid crystalline compounds, and discotic liquid crystal compounds or rod-like liquid crystal compounds are preferably used. The alignment state of the liquid crystalline compound is preferably any one of a vertical alignment, a horizontal alignment a hybrid alignment, an inclined alignment, a twisted alignment and a spiral alignment.

The vertical alignment of a discotic liquid crystalline compound means that the disc plane of the discotic liquid crystalline compound is substantially vertical to the film surface (the molecular symmetry axis is substantially parallel to the film surface). The average tilt angle of the disc plane for the film surface is preferably 70° to 90°, more preferably 75° to 90°, and most preferably 80° to 90°.

The horizontal alignment of a discotic liquid crystalline compound means that the disc plane of the discotic liquid crystalline compound is substantially parallel to the film surface (the molecular symmetry axis is substantially vertical to the film surface). The average tilt angle of the disc plane for the film surface, is preferably 0° to 20°, more preferably 0° to 15°, and most preferably 0° to 10°.

The vertical alignment of the rod-like liquid crystalline compound means that the major axis (molecular symmetry axis) of the rod-like liquid crystalline compound is substantially vertical to the film surface. The average tilt angle of the major axis for the film surface is preferably 70° to 90°, more preferably 75° to 90°, and most preferably 80° to 90°.

The horizontal alignment of the rod-like liquid crystalline compound means that the major axis (molecular symmetry axis) of the rod-like liquid crystalline compound is substantially horizontal to the film surface. The average tilt angle of the major axis for the film surface is preferably 0° to 20°, more preferably 0° to 15°, and most preferably 0° to 10°.

When the optically-compensatory film includes a vertically aligned discotic liquid crystalline compound or a vertically aligned rod-like liquid crystalline compound, the optically anisotropic layer may be suitably used as a viewing angle-compensatory film of a liquid crystal display device in an IPS mode and the like.

When the optically compensatory layer is used as a viewing angle-compensatory film of a liquid crystal display device in an IPS mode, the in-plane retardation of an optically anisotropic layer in which a discotic liquid crystalline compound is vertically aligned is preferably 50 nm to 200 nm, more preferably 60 nm to 180 nm, and most preferably 70 nm to 160 nm. Further, the retardation in a thickness direction of the optically anisotropic layer is −100 nm to −25 nm, more preferably −90 nm to −30 nm, and most preferably −80 nm to −35 nm. Further, a transparent support may be included. The in-plane retardation of the support is preferably 0 nm to 20 nm, more preferably 0 nm to 10 nm, and most preferably 0 nm to 5 nm. Further, the retardation in a thickness direction, of the support is preferably 20 nm to 120 nm, and more preferably 40 nm to 100 nm.

When the optically anisotropic layer is used as a viewing angle-compensatory film, of a liquid crystal display device in an IPS mode, the in-plane retardation of an optically anisotropic layer in which a rod-like liquid crystalline compound is vertically aligned is preferably 0 nm to 10 nm, more preferably 0 nm to 5 nm, and most preferably 0 nm to 3 nm. Further, the retardation in a thickness direction of the optically anisotropic layer is −400 nm to −80 nm, more preferably −360 mm to −100 nm, and most preferably −320 nm to −120 nm. In addition, a transparent support may be included. The in-plane retardation of the support is preferably 20 nm to 150 nm, more preferably 30 nm to 130 nm, and most preferably 40 mm to 110 nm. Further, the retardation in a thickness direction of the support is 100 nm to 300 nm, more preferably 120 nm to 280 nm, and most preferably 140 nm to 260 nm.

When the optically-compensatory film includes a horizontally aligned discotic liquid crystalline compound or a horizontally aligned rod-like liquid crystalline compound, the optically anisotropic layer may be suitably used as a viewing angle-compensatory film of a liquid crystal display device in VA mode and the like.

When the optically anisotropic layer is used as a viewing angle-compensatory film of a liquid crystal display device in a VA mode, the in-plane retardation of an optically anisotropic layer in which a discotic liquid crystalline compound is horizontally aligned is preferably 0 nm to 10 nm, and more preferably 0 nm to 5 nm. Further, the retardation in a thickness direction of the optically anisotropic layer is preferably 30 nm to 300 nm, and more preferably 40 nm to 200 nm. In addition, a transparent support may be included. The in-plane retardation of the support is preferably 0 nm to 40 nm, and more preferably 0 nm to 20 nm. Further, the retardation in a thickness direction of the support is preferably 0 nm to 200 nm, and more preferably 20 nm to 150 nm.

When the optically anisotropic layer is used as a viewing angle-compensatory film of a liquid crystal display device in a VA mode, the in-plane retardation of an optically anisotropic layer in which a rod-like liquid crystalline compound is horizontally aligned is preferably 60 nm to 140 nm, and more preferably 80 nm to 120 nm. Further, the retardation in a thickness direction of the optically anisotropic layer is preferably 30 nm to 70 nm, and more preferably 40 nm to 60 nm. In addition, a transparent support may be included. The in-plane retardation of the support is preferably 0 nm to 20 nm, and more preferably 0 nm to 10 nm. Further, the retardation in a thickness direction of the support is preferably −30 nm to 30 nm, and more preferably −20 nm to 20 nm.

When the optically-compensatory film includes a discotic liquid crystalline compound and the disc plane of the discotic liquid crystalline compound is obliquely aligned to the film surface, the optically anisotropic layer may be suitably used as a viewing angle-compensatory film of a liquid crystal display device in a TN mode, an OCB mode, an ECB mode, a HAN mode and the like. In the thickness direction of the optically anisotropic layer, the discotic liquid crystalline compound may be obliquely aligned at a substantially uniform angle or may be in a hybrid alignment with a different tilt angle, but the hybrid alignment is more preferred. When the optically anisotropic layer is used as a viewing angle-compensatory film of a liquid crystal display device in a TN mode, an OCB mode, an ECB mode, a HAN mode and the like, the in-plane retardation of an optically anisotropic layer including a discotic liquid crystalline compound is preferably 0 nm to 50 nm, more preferably 15 nm to 45 nm, and most preferably 20 nm to 40 nm. Furthermore, a transparent support may be included. The in-plane retardation of the support is preferably 0 nm to 60 nm, and more preferably 0 nm to 50 nm. Further, the retardation in a thickness direction of the support is preferably 40 nm to 300 nm, and more preferably 60 nm to 200 nm.

EXAMPLE

Hereinafter, characteristics of the present invention will be described in more detail wife reference to Examples and Comparative Examples. The materials, used amounts, ratios, contents of treatments, order of treatments and the like shown in the following Examples may appropriately be modified as long as they do not depart from the spirit of the present invention. Therefore, the scope of the present invention is not to be construed as being limited by specific Examples shown below.

Example 1

<Manufacture of Support (Cellulose Acetate Film T1)>
The following composition was put into a mixing tank and stirred while heating to dissolve each component, thereby preparing a cellulose acetate solution.
(Composition of Cellulose Acetate Solution)

| | |
|---|---|
| Cellulose acetate with a degree of acetylation of 60.7% to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

16 parts by mass of the following retardation enhancer (A), 92 parts by mass of methylene chloride and 8 parts by mass of methanol were put into a separate mixing tank and stirred while heating to prepare a retardation enhancer solution. 25 parts by mass of the retardation enhancer solution was mixed with 474 parts by mass of the cellulose acetate solution, and followed by stirring sufficiently to prepare a dope. The amount of the retardation enhancer added was 6.0 parts by mass based on 100 parts by mass of cellulose acetate.

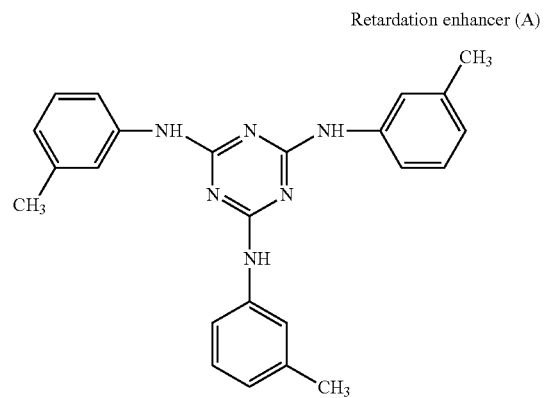 [SMILES: Cc1cccc(Nc2nc(Nc3cccc(C)c3)nc(Nc3cccc(C)c3)n2)c1]

Retardation enhancer (A)

The obtained dope was cast by using a band stretch device. After the temperature of film surface on the band reaches 40° C., the dope was dried with warm air at 70° C. for 1 minute, and the film from the band was dried with dry air at 140° C. for 10 minutes, thereby manufacturing Cellulose Acetate Film T1 having a residual solvent amount of 0.3% by mass.

The width and the thickness of the obtained long cellulose acetate film T1 were 1490 mm and 80 μm, respectively. Further, the in-plane retardation (Re) and the retardation in a thickness direction (Rth) at 550 nm were 8 nm and 78 nm, respectively.

<<Formation of Optically Anisotropic Layer Including Liquid Crystalline Compound>>
(Alkali Saponification Treatment)

The Cellulose Acylate Film T1 was passed through a dielectric heating roll at a temperature of 60° C. to elevate the film surface temperature to 40° C. and then an alkali solution having the composition shown below was coated onto one surface of the film in a coating amount of 14 ml/m² by using a bar coater. Then, the film was conveyed for 10 seconds under a steam type far-IR heater manufactured by Noritake Co., Ltd., which was heated at 110° C. Subsequently, pure water was coated thereon in an amount of 3 ml/m² by using a bar coater in the same manner as above. Subsequently, the film was washed with water by a fountain coater and dewatered by an air knife, this process was repeated three times, and then the film was conveyed and dried in a drying zone at 70° C. for 10 seconds to manufacture a cellulose acylate film.
(Composition of Alkali Solution)

| | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

(Formation of Alignment Film)

An alignment film coating solution having the following composition was continuously coated onto the saponification-treated long cellulose acetate film as described above, by using a wire bar #14. The film was dried with warm air at 60° C. for 60 seconds and further with warm air at 100° C. for 120 seconds.

Composition of Alignment Film Coating Solution

| | |
|---|---|
| The following modified polyvinyl alcohol | 10 pars by mass |
| Water | 371 parts by mass |

| | |
|---|---|
| Methanol | 119 pars by mass |
| Glutaraldehyde | 0.5 parts by mass |
| Photopolymerization initiator (Irgacure 2959, manufactured by Ciba Japan Co., Ltd.) | 0.3 parts by mass |

Modified polyvinyl alcohol

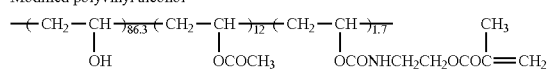

(Formation of Optically Anisotropic Layer Including Discotic Liquid Crystalline Compound)

The alignment film manufactured above was continuously subjected to rubbing treatment At this time, the longitudinal direction and the conveying direction of the long film, were parallel to each other, and the rotation axis of a rubbing roller was set to be at 45° in a clockwise direction with respect to the longitudinal direction of the film.

Coating Solution A including a discotic liquid crystal compound having the following composition was continuously coated on the alignment film manufactured above by using a wire bar #2.7. The conveying speed (V) of the film was set to 36 m/min. For the drying of the solvent of the coating solution and the alignment aging of the discotic liquid crystal compound, the film was heated with warm air at 80° C. for 90 seconds. Subsequently, the film was irradiated with UV light at 80° C. to fix the alignment of the liquid crystal compound, thereby forming an optically anisotropic layer to obtain Optical Film F1. The film thickness of the optically anisotropic layer of Optical Film F1 was 1.0 μm.

Composition of Optically Anisotropic Coating Solution (A)

The evaluation results of the manufactured optical film are shown in Table 2. Meanwhile, the angle formed by the slow axis direction and the rubbing direction was 90°. That is, the slow axis was at 45° in a clockwise direction with respect to the longitudinal direction of the support. Separately, a layer including a discotic liquid crystal compound was formed by using glass as a substrate instead of using a cellulose acetate film in a support, and Re (0), Re (40) and Re (−40) were measured by using KOBRA21 ABM, and found to be 142.3 nm, 128.9 nm and 128.7 nm, respectively. From these results, it can be confirmed that the average tilt angle of a disc plane of the discotic liquid crystalline molecules with respect to the film surface was 90°, and that the discotic liquid crystals were aligned vertically to the film surface.

Example 2

Optical film F2 was manufactured in the same manner as in the manufacture of Optical Film F1 in Example 1, except that with respect to the longitudinal direction of the film, the rotation axis of the rubbing roller was set to be at 43° in a counterclockwise direction, the heating temperature was set to 120° C. after coating the Coating solution A including the discotic liquid crystal compound, and then UV light was irradiated at 100° C.

The evaluation results of the manufactured optical film are shown in Table 2. The angle formed by the slow axis direction and the rubbing direction was 0°. That is, the slow-axis was at 45° in a clockwise direction with respect to the longitudinal direction of the support. In the same manner as in Example 1, it was confirmed that the average tilt angle of a disc plane of the discotic liquid crystalline molecules with respect to the

| | |
|---|---|
| The following discotic liquid crystal compound | 100 parts by mass |
| Photopolymerization initiator (Irgacure 907, manufactured by Ciba Japan Co., Ltd.) | 3 parts by mass |
| Sensitizer (KAYACURE DETX, manufactured by Nippon Kayaku Co., Ltd.) | 1 part by mass |
| The following pyridinium salt | 1 part by mass |
| The following fluorine-based polymer (FP1) | 0.4 parts by mass |
| Methyl ethyl ketone | 252 parts by mass |

Discotic liquid crystalline compound

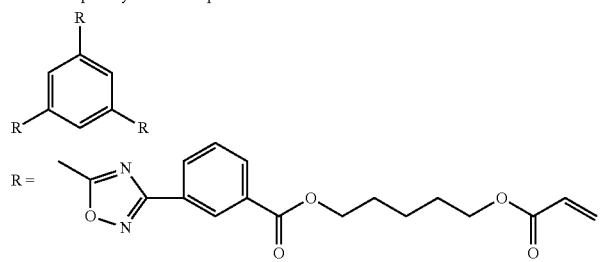

Pyridinium salt

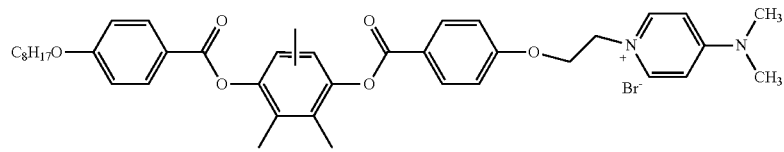

Fluorine-based polymer (FP1)

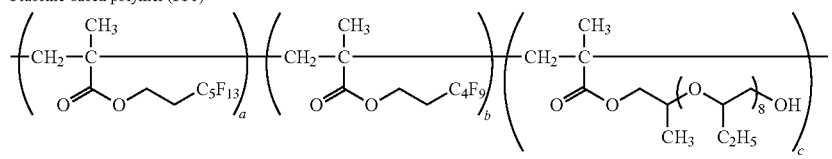

a/b/c = 20/20/60 wt %
Mw = 16,000 film surface was 90°, and the discotic liquid crystals were aligned vertically to the film surface.

Example 3

Cellulose Acetate Film T2 was manufactured in the same manner as in the manufacture of Cellulose Acetate Film T1 in Example 1, except that the film thickness of the film was changed. The thickness of Cellulose Acetate Film T2 was 60 µm, and Re and Rth at 550 nm were 6 nm and 60 nm, respectively.

The surface of Cellulose Acetate Film T2 was subjected to saponification treatment in the same manner as in Example 1, and an alignment film was also formed. The alignment film manufactured above was continuously subjected to rubbing treatment. At this time, the longitudinal direction and the conveying direction of the long film were parallel to each other, and the rotation axis of a rubbing roller was set to be at 45° in a counterclockwise direction with respect to the longitudinal direction of the film.

Coating Solution B including a discotic liquid crystal compound having the following composition was continuously coated on the alignment film manufactured above by using a wire bar #2.7. The conveying speed (V) of the film was set to 36 m/min. For the drying of the solvent of the coating solution and the alignment aging of the discotic liquid crystal compound, the film was heated with warm air at 120° C. for 90 seconds. Subsequently, the film was irradiated with UV light at 80° C. to fix the alignment of the liquid crystal compound, thereby forming an optically anisotropic layer to obtain Optical Film F3. The film thickness of the optically anisotropic layer of Optical Film F3 was 1.0 µm.

Composition of Optically Anisotropic Coating Solution (B)

| | |
|---|---|
| The following discotic liquid crystal compound | 100 parts by mass |
| Photopolymerization initiator (Irgacure 907, manufactured by Ciba Japan Co., Ltd.) | 3 parts by mass |
| Sensitizer (KAYACURE DETX, manufactured Nippon Kayaku Co., Ltd.) | 1 part by mass |
| The following pyridinium salt | 1 part by mass |
| The following fluorine-based polymer (FP2) | 0.4 parts by mass |
| Methyl ethyl ketone | 252 parts by mass |

The evaluation results of the manufactured optical film are shown in Table 2. The angle formed by the slow axis direction and the rubbing direction was 0°. That is, the slow axis was at 45° in a clockwise direction with respect to the longitudinal direction of the support in the same manner as in Example 1, it was confirmed that the average tilt angle of a disc plane of the discotic liquid crystalline molecules with respect to the film surface was 90°, and the discotic liquid crystals were aligned vertically to the film surface.

Comparative Example 1

(Preparation of Cellulose Acetate Solution)

The following composition was put into a mixing tank and stirred to dissolve each component, thereby preparing Cellulose Acetate Solution A.

Composition of Cellulose Acetate Solution A

| | |
|---|---|
| Cellulose acetate with an acetyl substitution degree of 2.94 | 100.0 parts by mass |
| Methylene chloride (first solvent) | 402.0 parts by mass |
| Methanol (second solvent) | 60.0 parts by mass |

(Preparation of Matting Agent Solution)

20 parts by mass of silica particles having an average particle diameter of 16 nm (AEROSIL R972, manufactured by Nippon Aerosil Co., Ltd.) and 80 parts by mass of methanol were stirred well and mixed for 30 minutes to prepare a dispersion liquid of silica particles. The dispersion liquid was put along with the following composition into a disperser, and the mixture was stirred for 30 minutes or more to dissolve each component, thereby preparing a matting agent solution.

Discotic liquid crystalline compound

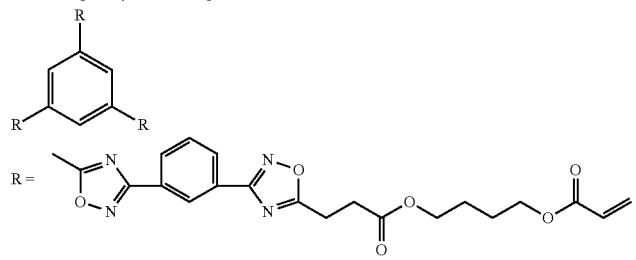

Pyridinium salt

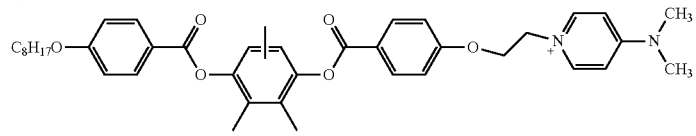

Fluorine-based polymer (FP2)

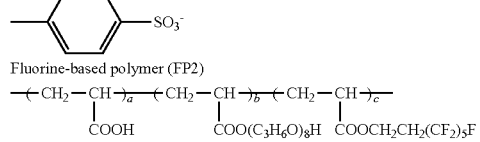

a/b/c = 5/55/40
Mw = 15000

Composition of Matting Agent Solution

| | |
|---|---|
| Dispersion liquid of silica particles having an average particle diameter of 16 nm | 10.0 parts by mass |
| Methylene chloride (first solvent) | 76.3 parts by mass |
| Methanol (second solvent) | 3.4 parts by mass |
| Cellulose Acetate Solution A | 10.3 parts by mass |

(Preparation of Additive Solution)

The following composition was put into a mixing tank and stirred while heating to dissolve each component, thereby preparing a cellulose acetate solution.

Composition of Additive Solution

| | |
|---|---|
| The following optical anisotropy decreasing agent | 49.3 parts by mass |
| The following wavelength dispersion adjusting agent | 4.9 parts by mass |
| Methylene chloride (first solvent) | 58.4 parts by mass |
| Methanol (second solvent) | 8.7 parts by mass |
| Cellulose Acetate Solution A | 12.8 parts by mass |

Optical anisotropy decreasing agent

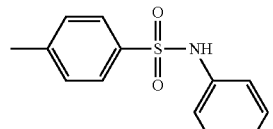

Wavelength dispersion adjusting agent

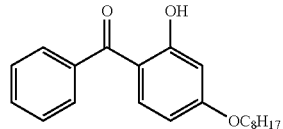

Each of 94.6 parts by mass of the Cellulose Acetate Solution A, 1.3 parts by mass of the matting agent solution, and 4.1 parts by mass of an additive solution was filtered and then mixed, and the mixture was cast by using a band casting machine. The mass ratios of the compound that decreases the optical anisotropy having the above-mentioned composition and the wavelength dispersion adjusting agent with respect to the cellulose acetate was 12% and 1.2%, respectively. The film was peeled off from the band with a residual solvent amount of 30% and dried at 140° C. for 40 minutes to prepare a long Cellulose Acetate Film T3 having a thickness of 80 μm.

The in-plane retardation (Re) and the retardation in a thickness direction (Rth) of the obtained Film T3 at 550 nm were 1 nm (the slow axis was in a direction vertical to the longitudinal direction of the film) and −1 nm, respectively.

The surface of Cellulose Acetate Film T3 was subjected to saponification treatment in the same manner as in Example 1, and an alignment film was also formed. The alignment film manufactured above was continuously subjected to rubbing treatment. At this time, the longitudinal direction and the conveying direction of the long film were parallel to each other, and the rotation axis of a rubbing roller was set to be at 45° in a counterclockwise direction with respect to the longitudinal direction of the film.

Coating Solution C including a discotic liquid crystal compound having the following composition was continuously coated on the alignment film manufactured above by using a wire bar #4.0. The conveying speed (V) of the film was set to 20 m/min. For the drying of the solvent of the coating solution and the alignment aging of the discotic liquid crystal compound, the film was heated with warm air at 100° C. for 30 seconds and with warm air at 130° C. for 90 seconds. Subsequently, the film was irradiated with UV light to fix the alignment of the liquid crystal compound, thereby forming an optically anisotropic layer to obtain Optical Film FH1. The angle formed by the slow axis direction and the rubbing direction was 0°. The film thickness of the optically anisotropic layer of Optical Film FH1 was 1.8 μm.

Composition of Optically Anisotropic Coating Solution (C)

| | |
|---|---|
| Tile following discotic liquid crystalline compound | 91 parts by mass |
| Ethylene oxide-modified trimethylolpropane triacrylate (V#360, manufactured by Osaka Organic Chemical Industry Ltd.) | 9 parts by mass |
| Photopolymerization initiator (Irgacure 907, manufactured by Ciba-Geigy Corporation) | 3 parts by mass |
| Sensitizer (KAYACURE DETX, manufactured by Nippon Kayaku Co., Ltd.) | 1 part by mass |
| The following pyridinium salt | 0.5 parts by mass |
| The above-metioned fluorine-based polymer (FP2) | 0.4 parts by mass |
| Methyl ethyl ketone | 195 parts by mass |

Discotic liquid crystalline compound

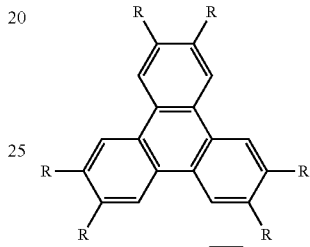

R = 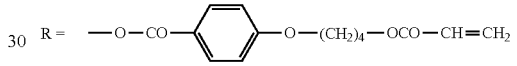

Pyridinium salt

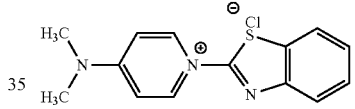

Comparative Example 2

On Film T3 manufactured in Comparative Example 1, an alignment film and an optically anisotropic layer were formed in the same manner as in Example 2, thereby obtaining Optical Film FH2.

The evaluation results of the manufactured optical film are shown in Table 2. The angle formed by the slow axis direction and the rubbing direction was 0°. That is, the slow axis was at 45° in a clockwise direction with respect to the longitudinal direction of the support. In the same manner as in Example 1, it was confirmed that the average tilt angle of a disc plane of the discotic liquid crystalline molecules with respect to the film surface was 90°, and the discotic liquid crystals were aligned vertically to the film surface.

Comparative Example 3

The cellulose acetate dope described in Example 1 was cast by using a band casting machine. After the temperature of film surface on the band reaches 40° C., the dope was dried for 1 minute to peel off a film, and the film was stretched by using a tenter with dry air at 140° C. by 15% in the width direction. Thereafter, the film was dried with dry air at 135° C. for 20 minutes, thereby manufacturing Cellulose Acetate Film T4 having a residual solvent amount of 0.3% by mass. The thickness of Cellulose Acetate Film T4 obtained was 80 μm. In addition, the in-plane retardation (Re) and the retardation in a thickness direction (Rth) of Film T4 at 550 nm were 1.0 nm and 130 nm, respectively.

The surface of Cellulose Acetate Film T4 was subjected to saponification treatment in the same manner as in Example 1, and an alignment film was also formed. The manufactured alignment film was continuously subjected to rubbing treatment. At this time, the longitudinal direction and the conveying direction of the long film were parallel to each other, and the rotation axis of a rubbing roller was set to be at 45° in a counterclockwise direction with respect to the longitudinal direction of the film.

In the same manner as in Example 3, Coating Solution B including the discotic liquid crystal compound was used to form an optically anisotropic layer, thereby obtaining Optical Film FH3.

Comparative Example 4

An alignment film and an optically anisotropic layer were formed on Optical Film T4 in the same manner as in Example 2 by changing the coated amount of Coating Solution A including the discotic liquid crystal compound in Example 1 such that the value of Re (0) measured by using KOBRA21 ADH becomes 100 nm, thereby obtaining Optical Film FH4. The film thickness of the optically anisotropic layer of Optical Film FH4 was 0.74 μm.

Comparative Example 5

An alignment film and an optically anisotropic layer were formed on Optical Film T4 in the same manner as in Example 2 by changing the coated amount of floating Solution A including the discotic liquid crystal compound in Example 1 such that the value of Re (0) measured by using KOBRA21 ADH becomes 80 nm, thereby obtaining Optical Film FH5. The film thickness of the optically anisotropic layer of Optical Film FH5 was 0.59 μm.

Comparative Example 6

An alignment film, and an optically anisotropic layer were formed on Optical Film T4 in the same manner as in Example 2 by changing the coated amount of Coating Solution A including the discotic liquid crystal compound in Example 1 such that the value of Re (0) measured by using KOBRA21 ADH becomes 210 nm, thereby obtaining Optical Film FH6. The film thickness of the optically anisotropic layer of Optical Film FH6 was 1.6 μm.

The evaluation results of the manufactured optical film are shown in Table 2. The angle formed by the slow axis direction and the rubbing direction, was 0°. That is, the slow axis was at 45° in a clockwise direction with respect to the longitudinal direction of the support. In the same manner as in Example 1, it was confirmed that the average tilt angle of a disc plane of the discotic liquid crystalline molecules with respect to the film surface was 90°, and the discotic liquid crystals were aligned vertically to the film surface.

Example 4

(Preparation of Coating Solution A for Hardcoat Layer)

The following composition was put into a mixing tank and stirred to prepare Coating Solution A for a hardcoat layer. 100 parts by mass of cyclohexanone, 750 parts by mass of partially caprolactone-modified polyfunctional acrylate (DPCA-20, manufactured by Nippon Kayaku Co., Ltd.), 200 parts by mass of a silica sol (MIBK-ST, manufactured by Nissan Chemical Industries, Ltd.) and 50 parts by mass of a photopolymerization initiator (Irgacure 184, manufactured by Ciba Specialty Chemicals Inc.) were added to 900 parts by mass of methyl ethyl ketone, and the mixture was stirred. The mixture was filtered through a polypropylene-made filter having a pore size of 0.4 μm to prepare Coating Solution A for a hardcoat layer.

(Preparation of Dispersion Liquid of Hollow Silica Particles)

30 parts by mass of acryloyloxypropyltrimethoxysilane and 1.51 parts by mass of diisopropoxyaluminum ethyl acetate were added to 500 parts by mass of a fine particle sol of hollow silica particles (isopropyl alcohol silica sol, CS60-IPA manufactured by Catalysts & Chemicals Industries Co., Ltd. average particle diameter 60 nm, thickness of shell 10 nm, silica concentration 20% by mass, refractive index of silica particle 1.31) and mixed, and then 9 parts by mass of ion-exchanged water was added thereto. After allowing the reaction to proceed at 60° C. for 8 hours, the reaction solution was cooled to room temperature, and 1.8 parts by mass of acetyl acetone was added to obtain a dispersion liquid. Thereafter, solvent replacement by reduced-pressure distillation was performed under a pressure of 30 Torr while adding cyclohexanone so as to keep the content rate of silica almost constant, and finally the concentration was adjusted to obtain Dispersion Liquid S having a solid content concentration of 18.2% by mass. The amount of IPA remaining in the obtained Dispersion Liquid IPA was analyzed by gas chromatography and found to be 0.5% or less.

(Preparation of Coating Solution for Low Refractive Index Layer)

Each component was mixed as described below, and dissolved in MEK to prepare a coating solution for a low refractive index layer in a solid content of 5% by mass.

Composition of Coating Solution for Low Refractive Index Layer

| | |
|---|---|
| The following perfluoroolefin copolymer | 15 parts by mass |
| DPHA (mixture of dipentaerythritol pentaacrylate and dipentaerythritol hexaacrylate, manufactured by Nippon Kayaku Co., Ltd.) | 7 parts by mass |
| Defenser MCF-323 (fluorine-based surfactant, manufactured by Dainippon Ink & Chemicals, Inc.) | 5 parts by mass |
| The following fluorine-containing polymerizable compound | 20 parts by mass |
| Dispersion liquid S of hollow silica particles (solid concentration: 18.2% by mass) | 50 parts by mass |
| Irgacure 127 (photopolymerization initator, manufactured by Ciba Japan Co., Ltd.) | 3 parts by mass |

Perfluluro olefin copolymer

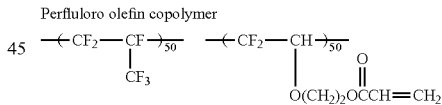

M.W. 50000

In the formula, 50:50 is represented in a molar ratio

Fluorine-containing polymerizable compound

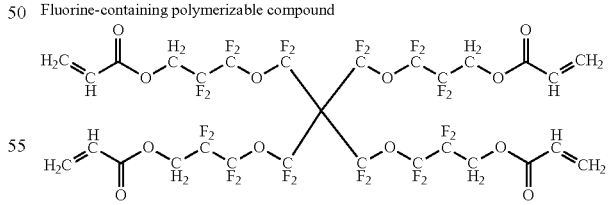

(Formation of Hardcoat Layer)

On the surface with the optically anisotropic layer of Optical Film F3 manufactured in Example 3 formed, Coating Solution A for a hardcoat layer was coated by using a gravure coater. The coated layer was dried at 100° C., and then was cured by irradiating air ultraviolet ray at an illuminance of 400 mW/cm$^2$ and an irradiation dose of 150 mJ/cm$^2$ by using an air-cooled metal halide lamp (manufactured by Eye Graphics Co., Ltd.) of 160 W/cm while purging the system with nitrogen so as to give an atmosphere having an oxygen concentration of 1.8% by volume or less, thereby forming Hardcoat Layer A having a thickness of 12 μm.

(Formation of Low Refractive Index Layer)

On Hardcoat Layer A, the above-mentioned coating solution for a low refractive index layer was coated by using a gravure coater. The drying conditions were set to 90° C. and 30 seconds, and the ultraviolet curing conditions were set to an illuminance of 600 mW/cm$^2$ and an irradiation dose of 600 mJ/cm$^2$ by using an air-cooled metal halide lamp (manufactured by Eye Graphics Co., Ltd.) of 240 W/cm while purging the system with nitrogen, so as to give an atmosphere having an oxygen concentration of 1.0% by volume or less. The refractive index and the film thickness of the low refractive index layer were 1.36 and 90 nm, respectively.

The process was performed as described above, thereby manufacturing Optical Film F4 with Hardcoat Layer A and a low refractive index layer stacked on Optical Film F3.

Example 5

(Preparation of Coating Solution B for Hardcoat Layer)

The following composition was put into a mixing tank and stirred to prepare Coating Solution B for a hardcoat layer. 100 parts by mass of cyclohexanone, 730 parts by mass of partially caprolactone-modified polyfunctional acrylate (DPCA-20, manufactured by Nippon Kayaku Co., Ltd.), 200 parts by mass of a silica sol (MIBK-ST, manufactured by Nissan Chemical Industries, Ltd.), 50 parts by mass of a photopolymerization initiator (Irgacure 819, manufactured by Ciba Japan Co., Ltd.) and 100 parts by mass of the following benzotriazole-based ultraviolet absorbent (TINUVIN 384-2, manufactured by Ciba Japan Co., Ltd.) were added to 900 parts by mass of methyl ethyl ketone, and the mixture was stirred. The mixture was filtered through a polypropylene-made filter having a pore size of 0.4 μm to prepare Coating Solution B for a hardcoat layer.

Ultraviolet Absorbent

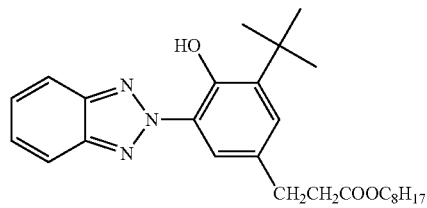

(Formation of Hardcoat Layer and Low Refractive Index Layer)

Optical Film F5 with Hardcoat Layer 8 and a low refractive index layer stacked, on Optical film F3 was manufactured in the same manner as in Example 4, except that Coating Solution B for a hardcoat layer was used instead of Coating solution A for a hardcoat layer.

Example 6

(Preparation of Coating Solution for Medium Refractive Index Layer)

A phosphorus-containing tin oxide (PTO) dispersion liquid (ELCOMJX-1001PTV manufactured by Catalysts & Chemicals Industries Co., Ltd.) and a mixture (DPHA) of dipentaerythritol pentaacrylate and dipentaerythritol hexaacrylate were appropriately mixed to prepare a coating solution for a medium refractive index layer having a refractive index adjusted.

(Preparation of Coating Solution for High Refractive Index Layer)

61.9 parts by mass of methyl ethyl ketone, 3.4 parts by mass of methyl isobutyl ketone and 1.1 parts by mass of cyclohexanone were added to 15.7 parts by mass of a ZrO$_2$ fine particle-containing hardcoat agent (DeSolite Z7404 [refractive index 1.72, solid content concentration: 60% by mass, content of zirconium oxide fine particles: 70% by mass (based on solid cement), average particle diameter of zirconium oxide fine particles: about 20 nm, solvent composition: methyl isobutyl ketone/methyl ethyl ketone=9/1, manufactured by JSR Corporation]), and the mixture was stirred. The mixture was filtered through a polypropylene-made filter having a pore size of 0.4 μm to prepare a coating solution for a high refractive index layer.

(Formation of Hardcoat Layer, Medium Refractive Index Layer, High Refractive Index Layer and Low Refractive Index Layer)

Hardcoat Layer B was stacked on Optical Film F3 in the same manner as in Example 5, On Hardcoat Layer 8, the coating solution for a medium refractive index layer was coated. The drying conditions were set to 90° C. and 30 seconds, and the ultraviolet curing conditions were set to an illuminance of 300 mW/cm$^2$ and an irradiation dose of 240 mJ/cm$^2$ by using an air-cooled metal halide lamp (manufactured by Eye Graphics Co., Ltd.) of 180 W/cm while purging the system with nitrogen so as to give an atmosphere having an oxygen concentration of 1.0% by volume or less. The refractive index and the film thickness of the medium refractive index layer were 1.62 and 60 nm, respectively.

Subsequently, the coating solution for a high refractive index layer was coated on the medium refractive index layer formed. The drying conditions were set to 90° C. and 30 seconds, and the ultraviolet curing conditions were set to an illuminance of 300 mW/cm$^2$ and an irradiation dose of 240 mJ/cm$^2$ by using an air-cooled metal halide lamp (manufactured by Eye Graphics Co., Ltd.) of 240 W/cm while purging the system with nitrogen so as to give an atmosphere having an oxygen, concentration of 1.0% by volume or less. The refractive index and the film thickness of the high refractive index layer were 1.72 and 110 nm, respectively.

Subsequently, a low refractive index layer was formed on the high refractive index layer formed in the same manner as in Example 4.

The process was performed as described above, thereby manufacturing Optical Film F6 with Hardcoat Layer B, a medium refractive index layer, a high refractive index layer and a low refractive index layer stacked in this order on Optical Film F3.

Example 7

[Manufacture of Cellulose Acylate Film T5]

(Preparation of Cellulose Acylate Solution A-1)

The following composition was put into a mixing tank and stirred while heating to dissolve each component, thereby preparing Cellulose Acylate Solution A-1. The acetyl substitution degree was measured in accordance with ASTM D-817-91. A viscosity average polymerization degree was measured by the extreme viscosity method of Uda et al. {Kazoo Uda and Hideo Saito, "Bulletin of The Society of Fiber Science and Technology, Japan", vol. 18, No. 1, pp. 105 to 120 (1962)}.

Composition of Cellulose Acylate Solution A-1

| | |
|---|---|
| Cellulose acylate (degree of acetyl substitution: 2.86, degree of viscosity average polymerization: 310) | 100 parts by mass |
| Polycondensed Ester P-8 (condensate of dicarboxylic acid and diol shown in the following Table 1) | 12 parts by mass |
| Methylene chloride | 384 parts by mass |
| Methanol | 69 parts by mass |
| Butanol | 9 parts by mass |

Polycondensed Ester P-8

TABLE 1

| Dicarboxylic acid | | | Diol | | | | Number |
|---|---|---|---|---|---|---|---|
| Aromatic dicarboxylic acid | Aliphatic dicarboxylic acid | Dicarboxylic acid ratio (mol %) | Aliphatic diol | Diol ratio (mol %) | Aliphatic diol average carbon number | Terminal | average molecular weight |
| Terephthalic acid | Succinic acid | 5/95 | Ethylene glycol | 100 | 20 | Acetyl ester residue | 1000 |

(Preparation of Matting Agent Dispersion Liquid B-1)

The following composition was put into a disperser and the mixture was stirred to dissolve each component, thereby preparing Matting Agent Dispersion Liquid B-1.

(Composition of Matting Agent Dispersion Liquid B-1)

| | |
|---|---|
| Dispersion liquid of silica particles (average particle diameter: 16 nm) "AEROSIL R972", manufactured by Nippon AEROSIL Co., Ltd. | 10.0 parts by mass |
| Methylene chloride | 72.8 parts by mass |
| Methanol | 3.9 parts by mass |
| Butanol | 0.5 parts by mass |
| Cellulose acylate solution A-1 | 10.3 parts by mass |

(Preparation of Ultraviolet Absorbent Solution C-1)

The following composition was put into another mixing tank and stirred while heating to dissolve each component, thereby preparing Ultraviolet Absorbent Solution C-1.

| (Preparation of ultraviolet Absorbent Solution C-1) | |
|---|---|
| Ultraviolet Absorbent (following UV-1) | 4.0 parts by mass |
| Ultraviolet Absorbent (following UV-2) | 8.0 parts by mass |
| Ultraviolet Absorbent (following UV-3) | 8.0 parts by mass |
| Methylene chloride | 55.7 parts by mass |
| Methanol | 10 parts by mass |
| Butanol | 1.3 parts by mass |
| Cellulose acylate solution A-1 | 12.9 parts by mass |

(UV-1)

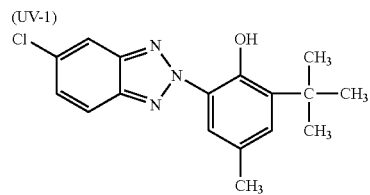

(UV-2)

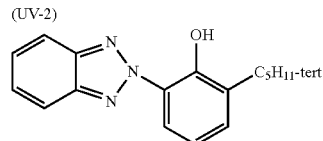

(UV-3)

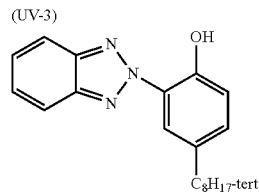

(Manufacture of Cellulose Acylate Film T5)

In order to give 0.4 past by mass of an ultraviolet absorbent (UV-2), 0.4 part by mass of ultraviolet absorbent (UV-3), 0.2 part by mass of an ultraviolet absorbent (UV-1) and 12 parts by mass of Polycondensed Ester P-8 per 100 parts by mass of cellulose acylate. Ultraviolet Absorbent Solution C-1 was added to a mixture of 94.6 parts by mass of Cellulose Acylate Solution A-1 and 1.3 parts by mass of Matt Agent Dispersion Liquid B-1 and sufficiently stirred while heating to dissolve each component, thereby preparing a dope. The obtained dope was warmed to 30° C., passed through a casting geeser, and cast on a specular stainless support which was a drum having a diameter of 3 m. The surface temperature of the support was set to −5° C., and the coating width thereof was set to 1,470 mm. The space temperature of the entire casting unit was set to 15° C. Moreover, the cellulose ester film which has been cast and rotated was peeled off from the drum at a position 50 cm immediately before a terminal portion of the casting unit, and then, clipped at both edges thereof with a pin tenter. The residual solvent amount of the cellulose acylate web immediately after being peeled off was 70% and the film surface temperature of the cellulose acylate web was 5° C.

The cellulose acylate web held with the pin tenter was conveyed to a drying zone. In the initial drying, dry air at 45° C. was sent thereto. Subsequently, the web was dried at 110° C. for 5 minutes and further at 140° C. for 10 minutes, trimmed at both edges (each 5% of the total width) immediately before being wound, and then subjected to thickness increasing processing (knurling) of 10 mm in width and 50 µm in height at both ends. Thereafter, 3,000 m of the web was wound in a roll shape. The width of the transparent film thus obtained was 1.45 m and Cellulose Acylate Film T5 having a thickness of 40 µm was manufactured. The in-plane retardation (Re) and the retardation (Rth) of Film T5 at 550 nm were 2 nm and 40 nm, respectively.

The surface of Cellulose Acetate Film T5 was subjected to saponification treatment in the same manner as in Example 1, and an alignment film was also formed. The manufactured alignment film was continuously subjected to rubbing treatment. At this time, the longitudinal direction and the conveying direction of the long film were parallel to each other, and the rotation axis of a rubbing roller was set to be at 45° in a counterclockwise direction with respect to the longitudinal direction of the film.

An alignment film and an optically anisotropic layer were formed on Optical Film T5 in the same manner as in Example 2 by changing the coated amount of Coating Solution A including the discotic liquid crystal compound in Example 1 such that the value of Re (0) measured by using KOBRA21 ADH becomes 125 nm, thereby obtaining Optical Film F7.

Example 8

[Manufacture of Cellulose Acylate Film T6]

(Preparation of Cellulose Acylate Solution A-2)

The following composition was put into a mixing tank and stirred while heating to dissolve each component, thereby preparing Cellulose Acylate Solution A-2.

Composition of Cellulose Acylate Solution A-2

| | |
|---|---|
| Cellulose acylate (degree of acetyl substitution: 2.86, degree of viscosity average polymerization: 310) | 100 parts by mass |
| Sugar Ester 1 | 9 parts by mass |
| Sugar Ester 2 | 3 parts by mass |
| Methylene chloride | 384 parts by mass |
| Methanol | 69 parts by mass |
| Butanol | 9 parts by mass |

Sugar ester 1: Ratio of average ester substitution of 71%

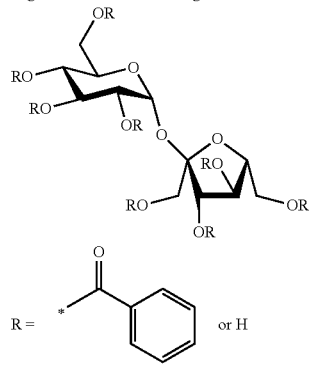

Sugar ester 2: Ratio of average ester substitution of 100%
(Single compound)

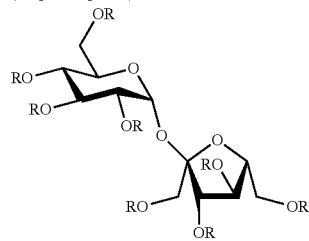

R = Acetyl group/i-Butyl group (2/6)

(Manufacture of Cellulose Acylate Film T6)

Cellulose Acylate Film T6 was manufactured using a dope prepared by adding Ultraviolet Absorbent Solution C-1 to a mixture of 94.6 parts by mass of Cellulose Acylate Solution A-2 and 1.3 parts by mass of Matting Agent Dispersion Liquid B-1 so as to give 0.4 part by mass of an ultraviolet absorbent (UV-2), 0.4 part by mass of ultraviolet absorbent (UV-3), 0.2 part by mass of an ultraviolet absorbent (UV-1), 9 parts by mass of Sugar Ester 1 and 3 parts by mass of Sugar Ester 2 per 100 parts by mass of cellulose acylate in the same manner as in Example 7, except that Cellulose Acylate Solution A-2 was used instead of using Cellulose Acylate Solution A-1 in the manufacture of Cellulose Acylate Film T5 in Example 7. The width and thickness of Cellulose Acylate Film T6 were 1.45 m and 40 μm, respectively, and the in-plane retardation (Re) and the retardation in a thickness direction (Rth) of Film thereof at 550 nm were 2 nm and 40 nm, respectively.

In the same manner as in Example 7, the surface of Cellulose Acetate Film T6 was subjected to saponification treatment, and an alignment film was formed and subjected to rubbing treatment to form an optically anisotropic layer, thereby obtaining Optical Film F8.

Comparative Example 7

TD80UL (manufactured by Fuji Photo Film Co., Ltd.) was used as the optical film.

<Evaluation of Optical Film>

(Measurement of Optical Anisotropy)

The optical anisotropy was measured by using KOBRA-21ADH (manufactured by Oji Scientific Instruments Co., Ltd.). Retardations were measured at a plurality of wavelengths, and approximated by using a Cauchy's equation to obtain Re450, Re550 and Re650. Furthermore, by using Retardation Re (0) measured from the normal direction and the slow axis defected by the apparatus as a rotation axis, the retaliation Re (±40) when the film was inclined by ±40° was measured to obtain Rth.

(Pencil Hardness)

A pencil hardness test was performed according to JIS K5400. The film was humidity-controlled at a temperature of 25° C. and a humidity of 60% RH for 2 hours, and then evaluated by rising a test pencil prescribed by JIS S6006. A value of 3H or more was defined as A, while a value less than 3H was defined as C.

(Steel Wool Scratch Resistance)

By using a rubbing tester, a rubbing test was performed under the following conditions, and may be used as an indicator of scratch resistance.

Evaluation environmental conditions: 25° C., 60% RH

Rubbing material: Steel wool (Grade No. 0000, manufactured by Nippon Steel Wool Co., Ltd.)

The film was wound on the rubbing tip (1 cm×1 cm) of the tester in contact with the sample, and fixed with a band.

Moving distance (one way): 13 cm,

Rubbing speed: 13 cm/sec,

Load: 500 g/cm$^2$,

Contact area at the tip: 1 cm×1 cm,

Number of rubbing: 10 reciprocations.

The damage at the rubbed portion was evaluated by painting an oily black ink on the hack side of the sample after the rubbing and observing the sample with the eyes with reflection light.

AA: Damage is hardly seen even when observed very carefully.

A: Weak damages are slightly seen when observed very carefully.

C: Damages are seen even when not observed carefully.

(Antireflection Property)

The antireflection property was evaluated by mounting an adapter ARV-474 on a spectrophotometer V-550 (manufactured by JASCO Corporation), measuring the specular reflectance for the outgoing angle of 5° at an incident angle of 5° in the wavelength region of 380 nm to 780 nm, and calculating the average reflectance at 450 nm to 650 nm. A reflectance less than 1% was defined as AA, a reflectance of 1% to 2% was defined as A, and a reflectance more than 2% was defined as C.

(Light Resistance)

The change in optical anisotropy (Re550) of the optical film was checked before and after a light resistance test for 25 hours was performed in accordance with JIS K 5600-7-5 under conditions an irradiance of 100±25 W/m$^2$ (wavelength of 310 nm to 400 nm), a test chamber internal temperature of 35±5° C., a black panel, temperature of 50±5° C., and a relative humidity of 65±15% by using a light resistance test device (Super Xenon Weather Meter SX120 type (Long-Life Xenon Lamp) manufactured by Suga Test Instruments Co., ltd.). A rate of change within 10% was defined as A, and a rate of change more than the value was defined as C. For Optical Films F1 to F4 and FH1 to FH6, the optical anisotropy even for light irradiation from any direction of the surface and back thereof was greatly decreased. Meanwhile, for F5 and F6, the rate of change in the optical anisotropy was small when light was irradiated on the low refractive index layer side. For F7 and F8 the rate of change in the optical anisotropy was small when light was irradiated on the support side.

(Manufacture of Polarizing Plate)

The manufactured, long optical films (F1 to F8, FH1 to FH6) and the surface of the support for the long TD80UL (manufactured by Fuji Photo Film Co., Ltd.) were subjected to alkali saponification treatment. The optical films were immersed, in 1.5 N aqueous sodium hydroxide solution at 55° C. for 2 minutes, washed in a water-washing bath at room temperature, and neutralized at 30° C. by using 0.1 N sulfuric acid. The films were washed again in the water-washing bath at room temperature, and dried with warm, air at 100° C.

Subsequently, a polyvinyl, alcohol film having a thickness of 80 μm in a roil shape was continuously stretched 5-fold in an iodine aqueous solution and dried to obtain a long polarising film having a thickness of 20 μm. By using a 3% aqueous solution of polyvinyl alcohol (PVA-117H manufactured by Kuraray Co, Ltd.) as an adhesive, each film subjected to the above-mentioned alkali saponification treatment and a long phase difference film for VA (manufactured by FUJI Photo Film Co., Ltd., Re/Rth at 550 nm=50/125) subjected to alkali saponification treatment in the same manner were prepared, and a polarizing film was sandwiched and adhered between the both films such that these saponification-treated surfaces face the polarizing film, thereby manufacturing long polarizing plates, in which the optical film and the phase difference film for VA function as the protective films of the polarizing film. At this time, an angle formed by the slow axis of the optical film and the absorption axis of the polarizer was adjusted to be 45°.

(Mounting)

TV: A polarizing plate on the viewing side of a TV (UN46C7000 (3D-TV) manufactured by SAMSUNG Corporation) was peeled off, and the phase difference film for VA of the polarizing plate manufactured above was adhered on the LC cell with an adhesive to manufacture a stereoscopic display device.

LC shutter spectacles: A polarising plate of SSG-2100AB (LC shutter spectacles) manufactured by SAMSUNG Corporation on the side opposite to the eye (panel side) was peeled off, and the support side of the optical film manufactured above (film which was the same as the optical film included in the polarizing plate adhered on the TV side) was adhered thereon with an adhesive to prepare LC shutter spectacles. Here, the slow axis of the optical film adhered on the spectacles was set to be orthogonal to the slow axis of the optical film included in the polarizing plate adhered on the TV.

(Evaluation of Display Device: 3D Display Performance)

A 3D image was viewed while the LC shutter spectacles manufactured above were worn in a room with a fluorescent lamp under an environment that illuminance on the panel surface was approximately 100 lux. 3D-TVs including the Optical Films F1 to F6 of the present invention have little crosstalk (double image) when, viewed, with the face inclined or when viewed from an inclined direction, and also have little change in display tint. The optical film having an Nz which was close to 0.5 was particularly excellent, 3D-TVs including FH1 to FH6 in the Comparative Examples have great crosstalk or change in display tint, compared to the cases of including the optical films of the present invention. Meanwhile, when the optical films of the present invention and the Comparative Examples were not included, the crosstalk was significantly seen even when the face was slightly inclined.

AA; There is almost no crosstalk when viewed with the face inclined or when viewed in an inclined direction, and there is also little change in display tint.

A; There is negligible crosstalk or change in display tint when viewed with the face inclined or when viewed in an inclined direction.

B; The crosstalk or change in display tint is observed when viewed with the face inclined or when viewed in an inclined direction.

C; The crosstalk is significantly seen even when the face is slightly inclined.

TABLE 2

| | Optical film | Support | Coating solution of optically anisotropic layer | Film thickness of optically anisotropic layer | Re550 | Nz | Re450/Re550 | Re650/Re550 | 3D display performance | Pencil hardnsss | Scratch resistance | Anti-reflection property | Light resistance |
|---|---|---|---|---|---|---|---|---|---|---|---|---|---|
| Example1 | F1 | T1 | (A) | 1.0 μm | 142 nm | 0.71 | 1.09 | 0.96 | A | C | C | C | C |
| Example2 | F2 | T1 | (A) | 1.0 μm | 135 nm | 0.78 | 1.10 | 0.95 | A | C | C | C | C |
| Example3 | F3 | T2 | (B) | 1.0 μm | 145 nm | 0.53 | 1.10 | 0.95 | AA | C | C | C | C |
| Example4 | F4 | T2 | (B) | 1.0 μm | 145 nm | 0.53 | 1.10 | 0.95 | AA | A | A | A | C |
| Example5 | F5 | T2 | (B) | 1.0 μm | 145 nm | 0.53 | 1.10 | 0.95 | AA | A | A | A | A |
| Example6 | F6 | T2 | (B) | 1.0 μm | 145 nm | 0.53 | 1.10 | 0.95 | AA | A | A | AA | A |
| Example7 | F7 | T5 | (A) | 0.93 μm | 125 nm | 0.32 | 1.10 | 0.95 | AA | C | C | C | A |
| Example8 | F8 | T6 | (A) | 0.93 μm | 125 nm | 0.32 | 1.10 | 0.95 | AA | C | C | C | A |
| Comparative Example1 | FH1 | T3 | (C) | 1.8 μm | 135 nm | −0.01 | 1.20 | 0.91 | B | C | C | C | C |
| Comparative Example2 | FH2 | T3 | (A) | 1.0 μm | 135 nm | 0.00 | 1.10 | 0.95 | B | C | C | C | C |
| Comparative Example3 | FH3 | T4 | (B) | 1.0 μm | 135 nm | 0.97 | 1.10 | 0.95 | B | C | C | C | C |
| Comparative Example4 | FH4 | T4 | (A) | 0.74 μm | 100 nm | 1.30 | 1.10 | 0.95 | C | C | C | C | C |
| Comparative Example5 | FH5 | T4 | (A) | 0.59 μm | 80 nm | 1.64 | 1.10 | 0.95 | C | C | C | C | C |
| Comparative Example6 | FH6 | T4 | (A) | 1.6 μm | 210 nm | 0.62 | 1.10 | 0.95 | C | C | C | C | C |
| Comparative Example7 | TD80UL | — | — | | 2 nm | 20 | — | — | C | C | C | C | A |

INDUSTRIAL APPLICABILITY

According to the present invention, it is possible to provide an optical film which may be used as a λ/4 plate and may provide a display device which has specific optical characteristics, may be manufactured with high productivity and has an excellent 3D-display performance.

Although the present invention has been described. In detail with reference to specific embodiments thereof, it is obvious to those skilled in the art that various changes or modifications may be made without departing from the spirit and scope of the present invention.

The present application is based on Japanese Patent Application filed on Jun. 10, 2010 (Patent Application No. 2010-133006) and Japanese Patent Application (Patent Application No. 2011-120560) filed on Jun. 9, 2011, the contents of which are herein incorporated by reference.

The invention claimed is:

1. A stereoscopic image display device comprising an optical film being disposed on an outermost surface of the stereoscopic image display device, the optical film comprising an optically anisotropic layer,
wherein an in-plane retardation Re at an arbitrary wavelength in a visible light region is 80 nm to 200 nm,
an Nz value represented by the following equation is 0.1 to 0.9, and
when the in-plane retardations at wavelengths of 450 nm, 550 nm and 650 nm are referred to as Re450, Re550 and Re650, respectively, Re450/Re550 is 1.18 or less and Re650/Re550 is 0.93 or more:

$$Nz=0.5+Rth/Re$$

wherein Rth represents a retardation in a thickness direction.

2. The stereoscopic image display device according to claim 1, further comprising a support,
wherein the optically anisotropic layer is stacked on the support and contains at least one liquid crystalline compound.

3. The stereoscopic image display device according to claim 2,
wherein the liquid crystalline compound is a discotic liquid crystalline compound, and
the discotic liquid crystalline compound is fixed in order that an alignment state of the discotic liquid crystalline compound is substantially vertical to a plane of the optically anisotropic layer.

4. The stereoscopic image display device according to claim 3,
wherein the optically anisotropic layer is formed from a composition containing at least one of discotic liquid crystalline compounds represented by the following Formula (I):

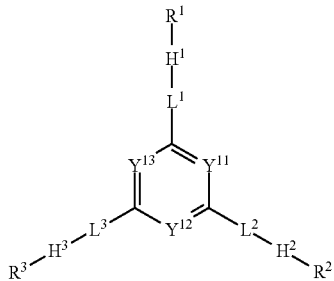

Formula (I)

wherein in the formula, each of $Y^{11}$, $Y^{12}$ and $Y^{13}$ independently represents a methine which may be substituted, or a nitrogen atom;

each of $L^1$, $L^2$ and $L^3$ independently represents a single bond or a divalent linking group; and
each of $H^1$, $H^2$ and $H^3$ independently represents Formula (I-A) or Formula (I-B):

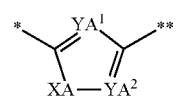

Formula (I-A)

wherein in Formula (I-A), each of $YA^1$ and $YA^2$ independently represents a methine which may have a substituent, or a nitrogen atom;
XA represents an oxygen atom, a sulfur atom, and methylene or imino;
* represents a position bonding to a side of $L^1$ to $L^3$ in Formula (I); and
** represents a position bonding to a side of $R^1$ to $R^3$ in Formula (I):

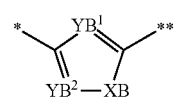

Formula (I-B)

wherein in Formula (I-B), each of $YB^1$ and $YB^2$ independently represents a methane which may have a substituent, or a nitrogen atom;
XB represents an oxygen atom, a sulfur atom, and methylene or imino;
* represents a position bonding to a side of $L^1$ to $L^3$ in Formula (I);
** represents a position bonding to a side of $R^1$ to $R^3$ in Formula (I)); and
each or $R^1$, $R^2$ and $R^3$ independently represents the following Formula (I-R):

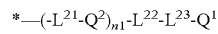

Formula (I-R)

wherein in Formula (I-R), * represents a position bonding to a side of $H^1$ to $H^3$ in Formula (I);
$L^{21}$ represents a single bond or a divalent linking group;
$Q^2$ represents a divalent group having at least one cyclic structure;
n1 represents an integer of 0 to 4,
$L^{22}$ represents —O—, —O—CO—, —CO—O—, —O—CO—O—, —S—, —N($R^{101}$)—, —SO$_2$—, —CH$_2$—, —CH=CH— or —C≡C—,
$R^{101}$ represents an alkyl group having 1 to 5 carbon atoms, and
** represents a position bonding to a $Q^2$ side;
$L^{23}$ represents a divalent linking group selected from the group consisting of —O—, —S—, —C(=O)—, —SO$_2$—, —NH—, —CH$_2$—, —CH=CH—, —C≡C— and a combination thereof; and
$Q^1$ represents a polymerizable group or a hydrogen atom.

5. The stereoscopic image display device according to claim 2,
wherein the optically anisotropic layer is a layer continuously formed on a long support, and
an angle formed by a slow axis of the optically anisotropic layer and a longer side of the support is 5° to 85°.

6. The stereoscopic image display device according to claim 5, further comprising an alignment film provided on the support,
 wherein the optically anisotropic layer is a layer formed after performing a rubbing treatment on the alignment film provided on the support, and
 an angle formed by the slow axis of the optically anisotropic layer and a rubbing direction is substantially 90°.

7. The stereoscopic image display device according to claim 5, further comprising an alignment film provided on the support,
 wherein the optically anisotropic layer is a layer formed after performing a rubbing treatment on the alignment film provided on the support, and
 an angle formed by the slow axis of the optically anisotropic layer and a rubbing direction is substantially 0°.

8. The stereoscopic image display device according to claim 2, further comprising a hardcoat layer and an optical interference layer,
 wherein at least one layer of the support, the optically anisotropic layer, the hardcoat layer and the optical interference layer contains an ultraviolet absorbent.

* * * * *